United States Patent
Hreha

(10) Patent No.: US 10,122,456 B2
(45) Date of Patent: Nov. 6, 2018

(54) GROUND BASED SUBSYSTEMS, FOR INCLUSION IN OPTICAL GATEWAY, AND THAT INTERFACE WITH OPTICAL NETWORKS EXTERNAL TO OPTICAL GATEWAY

(71) Applicant: Space Systems/Loral, LLC, Palo Alto, CA (US)

(72) Inventor: William Hreha, San Jose, CA (US)

(73) Assignee: SPACE SYSTEMS/LORAL, LLC, Palo Alto, CA (US)

( * ) Notice: Subject to any disclaimer, the term of this patent is extended or adjusted under 35 U.S.C. 154(b) by 0 days.

(21) Appl. No.: 15/461,381

(22) Filed: Mar. 16, 2017

(65) Prior Publication Data

US 2018/0227054 A1 Aug. 9, 2018

Related U.S. Application Data

(60) Provisional application No. 62/454,532, filed on Feb. 3, 2017.

(51) Int. Cl.
*H04B 10/118* (2013.01)
*H04B 7/185* (2006.01)
*H04J 14/02* (2006.01)

(52) U.S. Cl.
CPC ....... *H04B 10/118* (2013.01); *H04B 7/18513* (2013.01); *H04J 14/02* (2013.01)

(58) Field of Classification Search
CPC ..... H04B 10/118; H04B 7/18513; H04J 14/02
(Continued)

(56) References Cited

U.S. PATENT DOCUMENTS 6,271,953 B1 * 8/2001 Dishman .............. H04B 10/118
 398/129
6,462,847 B2 * 10/2002 Willebrand ........ H04B 10/1125
 398/139

(Continued)

OTHER PUBLICATIONS

Mato-Calvo et al., "Optical Feeder Links for Very High Throughput Satellites—System Perspectives", Proceeding of the Ka and Broadband Communications, Navigation and Earth Observation Conference 2015, Ka Conference 2015, Oct. 12-14, 2015, Bologna, Italy.

*Primary Examiner* — Dalzid Singh
(74) *Attorney, Agent, or Firm* — Vierra Magen Marcus LLP

(57) ABSTRACT

Described herein is a ground based subsystem for inclusion in an optical gateway and for use in transmitting an optical feeder uplink beam to a satellite. The subsystem can include a wavelength-division multiplexing (WDM) multiplexer configured to receive optical data signals from optical network(s) external to the ground based optical gateway, and configured to combine the optical data signals into a wavelength division multiplexed optical signal. The subsystem can also include an optical amplifier to amplify the wavelength division multiplexed optical signal, and transmitter optics to receive the amplified wavelength division multiplexed optical signal and transmit an optical feeder uplink beam to the satellite in dependence thereon. In certain embodiments, the ground based optical gateway does not perform any modulation or demodulation of the optical data signals received from the optical network(s) external to the ground based optical gateway before they are provided to the WDM multiplexer.

13 Claims, 26 Drawing Sheets

(58) Field of Classification Search
 USPC .......................................................... 398/96
 See application file for complete search history.

(56) References Cited

U.S. PATENT DOCUMENTS

| | | | |
|---|---|---|---|
| 6,895,185 B1* | 5/2005 | Chung | H04B 10/272 398/115 |
| 6,912,075 B1* | 6/2005 | Ionov | H04B 10/118 398/121 |
| 2004/0264970 A1* | 12/2004 | Valley | H04B 10/118 398/121 |
| 2005/0019034 A1* | 1/2005 | Aoki | H04J 14/0204 398/59 |
| 2005/0100339 A1 | 5/2005 | Tegge, Jr. | |
| 2008/0002981 A1* | 1/2008 | Valley | H04B 7/18521 398/121 |

* cited by examiner

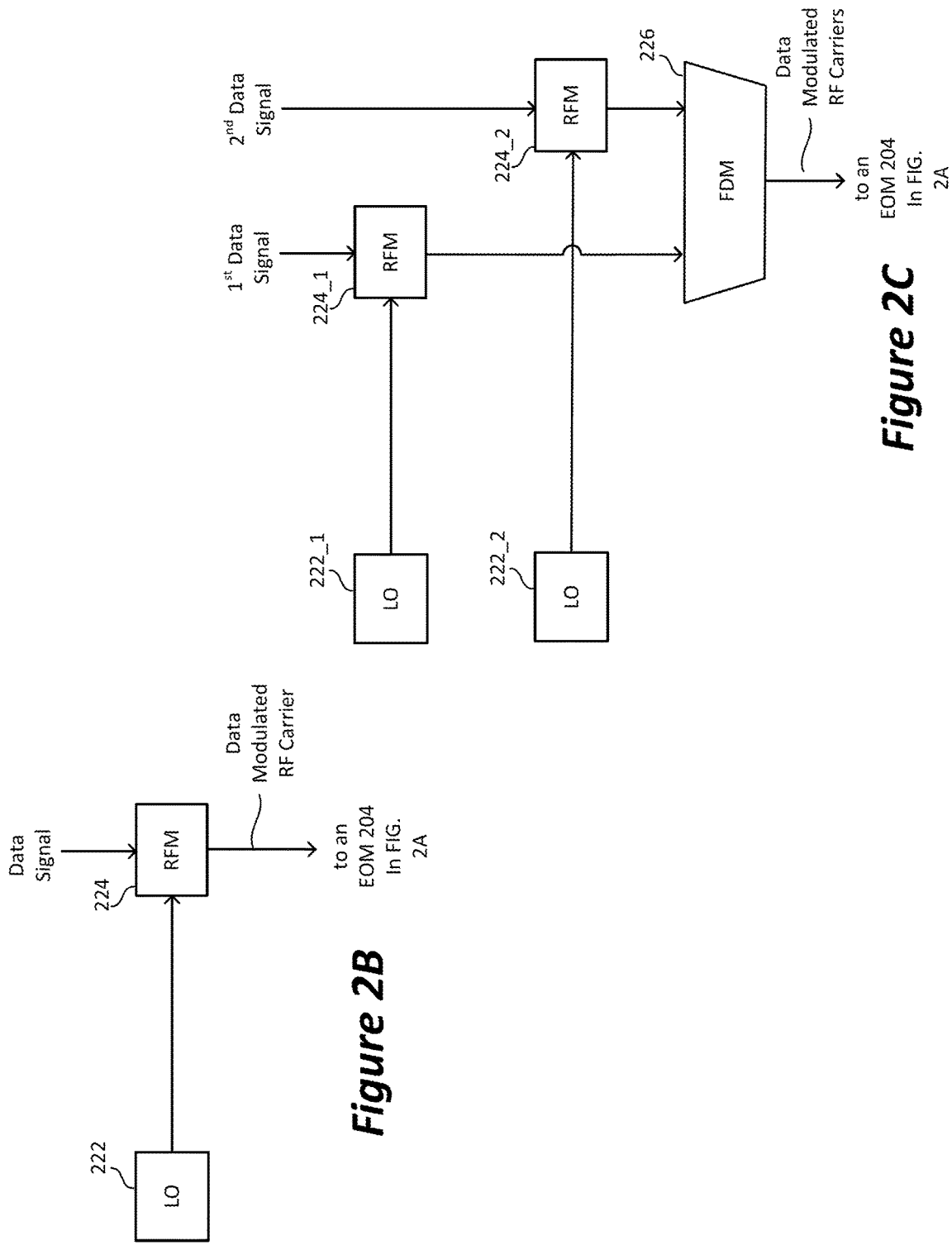

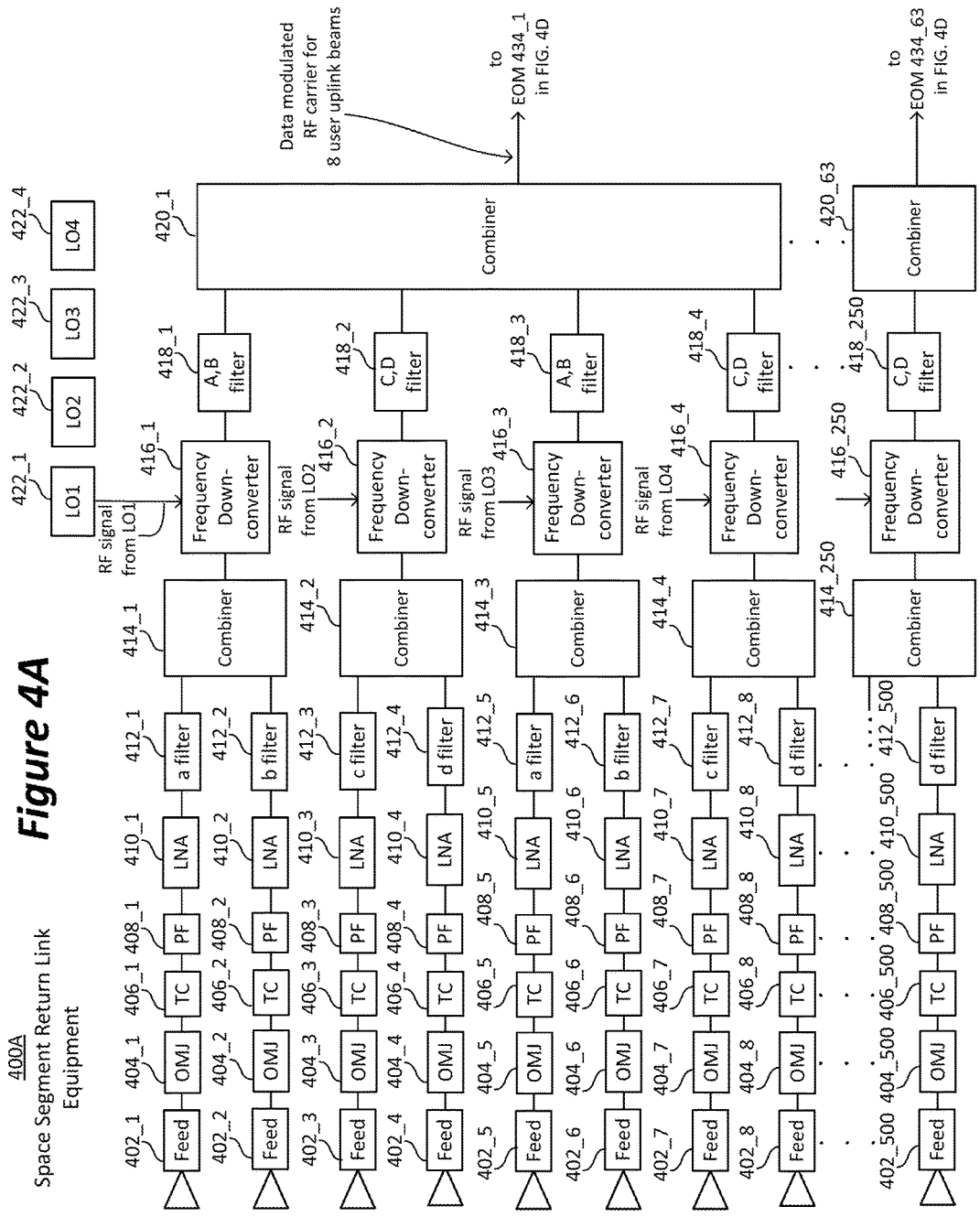

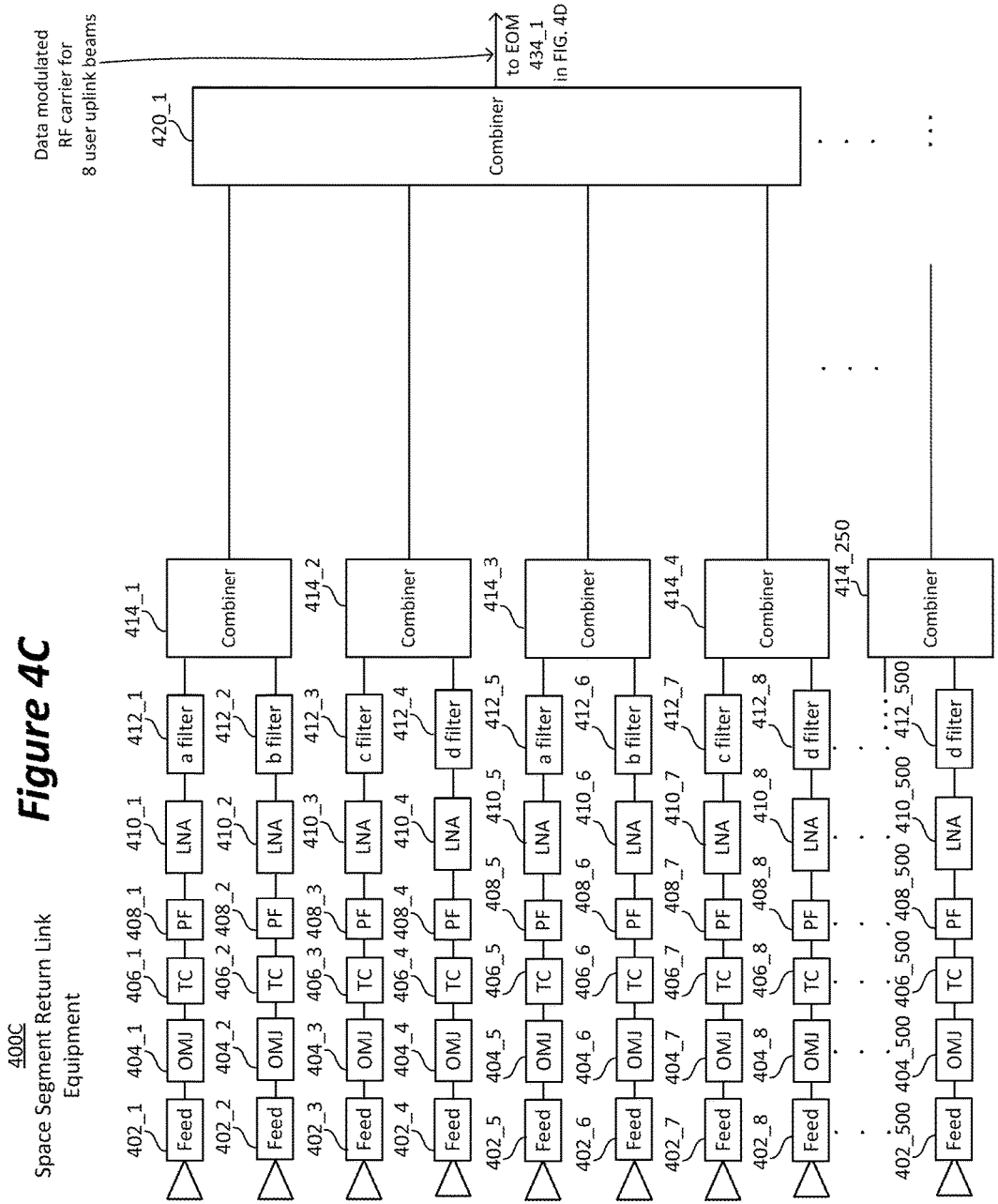

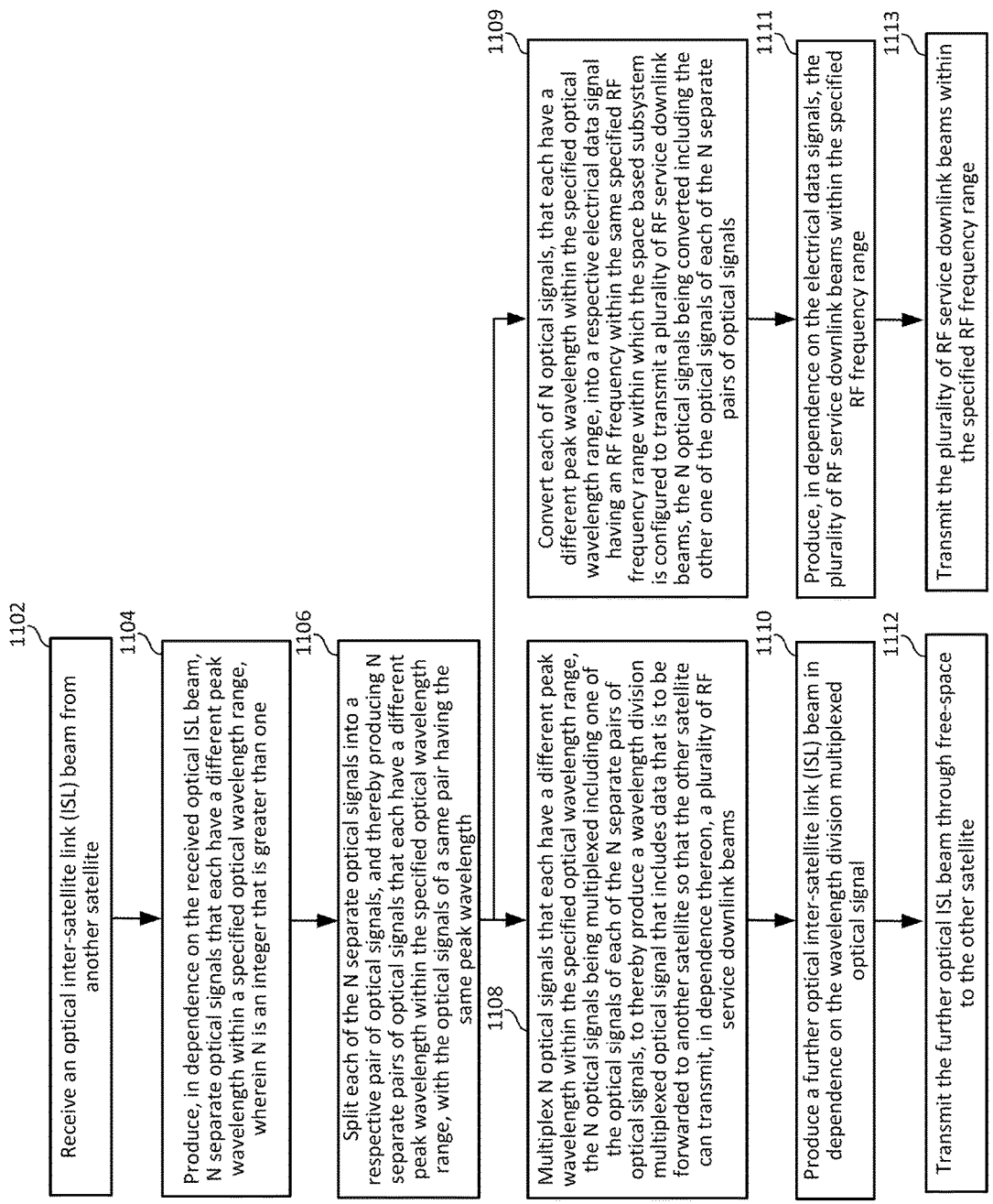

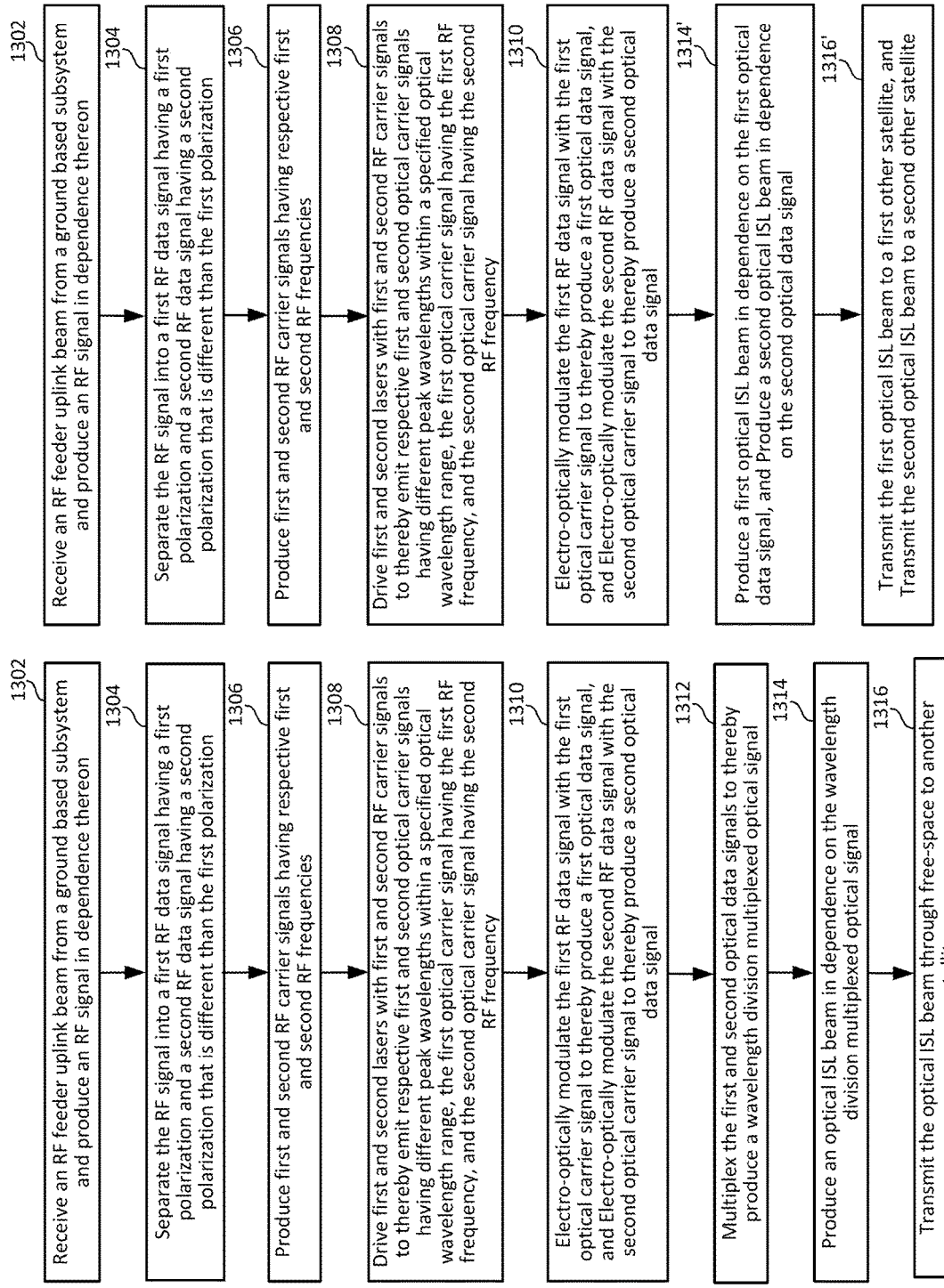

US 10,122,456 B2

GROUND BASED SUBSYSTEMS, FOR INCLUSION IN OPTICAL GATEWAY, AND THAT INTERFACE WITH OPTICAL NETWORKS EXTERNAL TO OPTICAL GATEWAY

PRIORITY CLAIM

This application claims priority to U.S. Provisional Patent Application No. 62/454,532, filed Feb. 3, 2017, which is incorporated by reference herein.

BACKGROUND

There is increasing need for large amounts of bandwidth to be routed between a ground based gateway and a spaced based satellite, as well as between space based satellites. With the recent announcement of planned Ka band and Ku band satellite constellations, it would be beneficial if such frequency band satellite constellations can be used to help satisfy the aforementioned increasing need for large amounts of bandwidth to be routed between a ground based gateway and spaced based satellites, as well as between space based satellites.

BRIEF DESCRIPTION OF THE DRAWINGS

FIG. 2B depicts components that can be used to produce data modulated RF carriers introduced in FIG. 2A, according to an embodiment of the present technology.

FIG. 2C depicts components that can be used to produce data modulated RF carriers introduced in FIG. 2A, according to another embodiment of the present technology.

FIGS. 4A and 4B depicts a portion of space segment return link equipment, according to alternative embodiments of the present technology.

FIG. 4C depicts a portion of space segment return link equipment, according to another embodiment of the present technology.

FIG. 11A is a high level flow diagram that is used to summarize methods for enabling a space based subsystem to produce to an optical inter-satellite link (ISL) beam and RF service downlink beams, based on an optical ISL beam received from another satellite, according to an embodiment of the present technology.

FIG. 13A is a high level flow diagram that is used to summarize methods for enabling a space based subsystem to receive an RF feeder uplink beam and produce to an optical inter-satellite link (ISL) beam therefrom, according to an embodiment of the present technology.

FIG. 13B is a high level flow diagram that is used to summarize methods for enabling a space based subsystem to receive an RF feeder uplink beam and produce to two optical inter-satellite link (ISL) beams therefrom, according to an embodiment of the present technology.

DETAILED DESCRIPTION

Certain embodiments of the present technology described herein relate to system and subsystem architectures for high throughput satellites (HTS), very high throughput satellites (VHTS) and very very high throughput satellites (VVHTS), which are also known as ultra high throughput satellites (UHTS), all of which can be collectively referred to as HTS. Specific embodiments of the present technology described herein relate to space based subsystems that can receive optical feeder uplink beams from a ground based gateway and in dependence thereon produce optical inter-satellite link (ISL) beams and RF service downlink beams. Other embodiments of the present technology described herein relate to space based subsystems that can receive modulated RF carriers from RF feeder uplink beams from a ground based gateway and in dependence thereon produce optical inter-satellite link (ISL) beams. An ISL beam may additionally or alternatively be produced by a spaced based subsystem (e.g., an ISL subsystem on a satellite) in dependence on one or more service uplink beams received from one or more service terminals STs. An ISL beam may additionally or alternatively be produced by a spaced based subsystem (e.g., an ISL subsystem on a satellite) in dependence on one or more signals received from another subsystem (e.g., a non ISL subsystem) on the satellite. Because of spectrum availability, if feeder links between gateway (GW) sites and satellites are at optical frequencies, then the number of GW sites can be drastically reduced compared to if the feeder links are at RF frequencies, which leads to significant cost savings in the space and ground segments.

Prior to describing details of specific embodiments of the present technology, it is first useful to describe an exemplary wireless communication system with which embodiments of the present technology would be useful. An example of such a wireless communication system will now be described with reference to FIG. 1.

Figure 1:
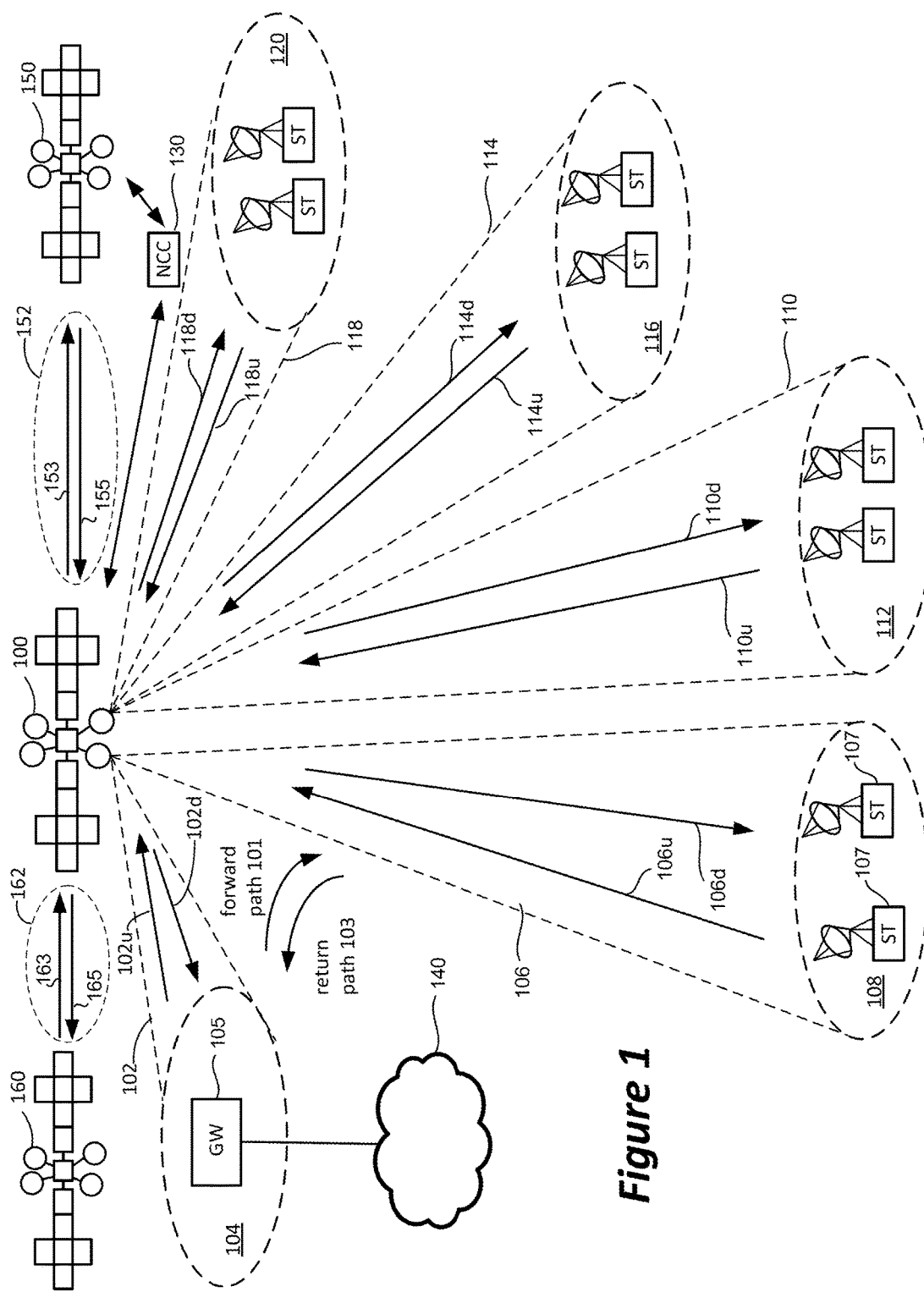
FIG. 1 is a block diagram describing a wireless communication system, which may be a satellite communication system.

FIG. 1 depicts a block diagram of a wireless communications system that includes a communication platform 100, which may be a satellite located, for example, at a geostationary or non-geostationary orbital location. Where a satellite is in a non-geostationary orbit, the satellite may be a low earth orbit (LEO) satellite. In other embodiments, other platforms may be used such as an unmanned aerial vehicle (UAV) or balloon, or even a ship for submerged subscribers. In yet another embodiment, the subscribers may be air vehicles and the platform may be a ship or a truck where the "uplink" and "downlink" in the following paragraphs are reversed in geometric relations. Platform 100 may be communicatively coupled to at least one gateway (GW) 105 and a plurality of subscriber terminals ST (including subscriber terminals 107). The term subscriber terminals may be used to refer to a single subscriber terminal or multiple subscriber terminals. A subscriber terminal ST is adapted for communication with the wireless communication platform 100, which as noted above, may be a satellite. Subscriber terminals may include fixed and mobile subscriber terminals including, but not limited to, a cellular telephone, a wireless handset, a wireless modem, a data transceiver, a paging or position determination receiver, or mobile radio-telephone, or a headend of an isolated local network. A subscriber terminal may be hand-held, portable (including vehicle-mounted installations for cars, trucks, boats, trains, planes, etc.) or fixed as desired. A subscriber terminal may be referred to as a wireless communication device, a mobile station, a mobile wireless unit, a user, a subscriber, or a mobile. Where the communication platform of a wireless communication system is a satellite, the wireless communication system can be referred to more specifically as a satellite communication system. For the remainder of this description, unless stated otherwise, it is assumed that the communication platform 100 is a satellite. Accordingly, platform 100 will often be referred to as satellite 100, and the wireless communication system will often be referred to as a satellite communication system. In accordance with certain embodiments, it is possible that a subscriber terminal with which one satellite wirelessly communicates is on a platform of or on another satellite.

In one embodiment, satellite 100 comprises a bus (e.g., spacecraft) and one or more payloads (e.g., the communication payload, an imaging payload, etc.). The satellite will also include a command and data handling system and multiple power sources, such as batteries, solar panels, and one or more propulsion systems, for operating the bus and the payload. The command and data handling system can be used, e.g., to control aspects of a payload and/or a propulsion system, but is not limited thereto.

The at least one gateway 105 may be coupled to a network 140 such as, for example, the Internet, terrestrial public switched telephone network, mobile telephone network, or a private server network, etc. Gateway 105 and the satellite (or platform) 100 communicate over a feeder beam 102, which has both a feeder uplink 102u and a feeder downlink 102d. In one embodiment, feeder beam 102 is a spot beam to illuminate a region 104 on the Earth's surface (or another surface). Gateway 105 is located in region 104 and communicates with satellite 100 via feeder beam 102. Although a single gateway is shown, some implementations will include many gateways, such as five, ten, or more. One embodiment includes only one gateway. Each gateway may utilize its own feeder beam, although more than one gateway can be positioned within a feeder beam. In one embodiment, a gateway is located in the same spot beam as one or more subscriber terminals. In certain embodiments the feeder uplink 102u is an optical beam. In other embodiments the feeder uplink 102u is an RF beam. Similarly, it is possible that the feeder downlink 102d is an optical beam or an RF beam, depending upon the embodiment.

Subscriber terminals ST and satellite 100 communicate over service beams, which are also known as user beams. For example, FIG. 1 shows service beams 106, 110, 114 and 118 for illuminating regions 108, 112, 116 and 120, respectively. In many embodiments, the communication system will include more than four service beams (e.g., sixty, one hundred, etc.). Each of the service beams have an uplink (106u, 110u, 114u, 118u) and a downlink (106d, 110d, 114d, 118d) for communication between subscriber terminals ST and satellite 100. Although FIG. 1 only shows two subscriber terminals within each region 108, 112, 116 and 120, a typical system may have thousands of subscriber terminals within each region. In the embodiments described herein, it is assumed that the service beams (both downlink and uplink) are RF beams, as opposed to optical beams.

In one embodiment, communication within the system of FIG. 1 follows a nominal roundtrip direction whereby data is received by gateway 105 from network 140 (e.g., the Internet) and transmitted over the forward path 101 to a set of subscriber terminals ST. In one example, communication over the forward path 101 comprises transmitting the data from gateway 105 to satellite 100 via uplink 102u of feeder beam 102, through a first signal path on satellite 100, and from satellite 100 to one or more subscriber terminals ST via downlink 106*d* of service beam 106. An uplink (e.g., 102*u*) of a feeder beam (e.g., 102) can also be referred to more succinctly as a feeder uplink beam, and the downlink (e.g., 106*d*) of a service beam (e.g., a 106) can also be referred to more succinctly as a service downlink beam. Although the above example mentions service beam 106, the example could have used other service beams.

Data can also be sent from the subscriber terminals STs over the return path 103 to gateway 105. In one example, communication over the return path comprises transmitting the data from a subscriber terminal (e.g., subscriber terminal 107 in service beam 106) to satellite 100 via uplink 106*u* of service beam 106, through a second signal path on satellite 100, and from satellite 100 to gateway 105 via downlink 102*d* of feeder beam 102. An uplink (e.g., 106*u*) of a service beam (e.g., 106) can also be referred to more succinctly as a service uplink beam, and the downlink 102*d* of feeder beam 102 can also be referred to more succinctly as a feeder downlink beam. Although the above example uses service beam 106, the example could have used any service beam.

FIG. 1 also shows that the satellite 100 can communicate with other satellites 150 and 160 over respective inter-satellite link (ISL) beams 152 and 162. For example, the satellite 100 can send data to the satellite 150 over a path 153 of the ISL beam 152, and can receive data from the satellite 150 over a path 155 of the ISL beam 152. Communication over a forward path can comprise, for example, transmitting data from the gateway 105 to the satellite 100 via the feeder uplink beam 102*u*, through a signal path on satellite 100, and from the satellite 100 to the satellite 150 via the path 153 of the ISL beam 152, through a signal path on the satellite 150, and then to one or more subscriber terminals ST via a service downlink beam. Communication over a return path can comprise, for example, transmitting data from a subscriber terminal to the satellite 150 via a service uplink beam, through a signal path on the satellite 150, and from the satellite 150 to the satellite 100 via the path 155 of the ISL beam 152, and from the satellite 100 to the gateway 105 via feeder downlink beam 102*d*. In still another example, the satellite 100 can receive data over a path 163 of the ISL beam 162 from the satellite 160, and can send data over a path 153 of the ISL beam 152 to the satellite 150. These are just a few examples of how a ground based gateway can communicate with satellites, satellites can communicate with one another, and how satellites can communicate with service terminals STs, which examples not intended to be all encompassing. All of the satellites 100, 150 and 160 shown in FIG. 1 can be in a geostationary orbit. Alternatively, all of the satellites 100, 150 and 160 shown in FIG. 1 can be in a non-geostationary orbital, e.g., in a low earth orbit (LEO), and such satellites may only send an optical ISL beam from one satellite to another when the other satellite comes into the view of the optical coverage area of the satellite. It is also possible that one or more of the satellites 100, 150 and 160 shown in FIG. 1 can be in a geostationary orbit, while one or more of the other satellites is within a non-geostationary orbital, e.g., in a low earth orbit (LEO). In this latter case, a geostationary satellite and a non-geostationary satellite (e.g., an LEO satellite) may only be able to send an optical ISL beam therebetween when one of the satellites comes into the view of the optical coverage area of the other satellite. More generally, satellites that are in different types of orbits can send optical ISLs to one another using embodiments of the present technology described herein. This enables satellites to operate as optical repeaters without needing to demodulate and remodulate optical signals being forwarded to another satellite. Instead, a satellite that is acting as an optical repeater may only need to amplify an optical ISL before it is passed onto another satellite, which can greatly simply the equipment onboard the satellite.

FIG. 1 also shows a Network Control Center (NCC) 130, which can include an antenna and modem for communicating with satellites 100, 150 and 160, as well as one or more processors and data storage units. Network Control Center 130 provides commands to control and operate satellites 100, 150 and 160. Network Control Center 130 may also provide commands to any of the gateways and/or subscriber terminals. It is also possible that the NCC includes transmitter and/or receiver optics for optically communicating with satellites 100, 150 and 160 or communicates with satellites 100, 150, and 160 through the optical gateway links such as beam 102.

In one embodiment, communication platform 100 implements the technology described below. In other embodiments, the technology described below is implemented on a different platform (or different type of satellite) in a different communication system. For examples, the communication platform can alternatively be a UAV or balloon, but is not limited thereto.

The architecture of FIG. 1 is provided by way of example and not limitation. Embodiments of the disclosed technology may be practiced using numerous alternative implementations.

Conventionally, a gateway (e.g., gateway 105) communicates with a satellite (e.g., satellite 100) using an antenna on the ground that transmits and receives RF (radiofrequency) signals to and from an antenna on the satellite. Certain embodiments of the present technology utilize optical components instead of antennas to transmit and receive optical signals between a gateway and a satellite or between satellites, as will be described in additional details below.

Certain embodiments of the present technology involve the use of analog-over free-space optical signals, which leads to an elegant architecture for a satellite repeater. Certain embodiments allow for the aggregation of multiple user links without requiring extra hardware associated with an onboard demodulator and remodulator, and thus reduce the mass, power and cost of the satellite, perhaps making the difference between being able to launch or not being able to launch the satellite. In addition, in accordance with specific embodiments where the uplink and downlink communication signals are modulated at transmit (forward) and receive (return) RF frequencies, no frequency conversion in the forward link is required on the satellite, thereby further simplifying the payload design. By contrast, previously envisioned free-space optical spacecraft architectures proposed demodulation of the optical signal, followed by routing to user link pathways and remodulation of the signal on user link RF frequencies.

Block diagrams for the communications subsystems for the ground and space segments, according to certain embodiments of the present technology, are described below with reference to FIGS. 2A, 3, 4A, 4B, 4C, 4D and 5. Certain embodiments use analog modulation and demodulation on the satellite, thus enabling optical feeder links without onboard processing.

Figure 2A:
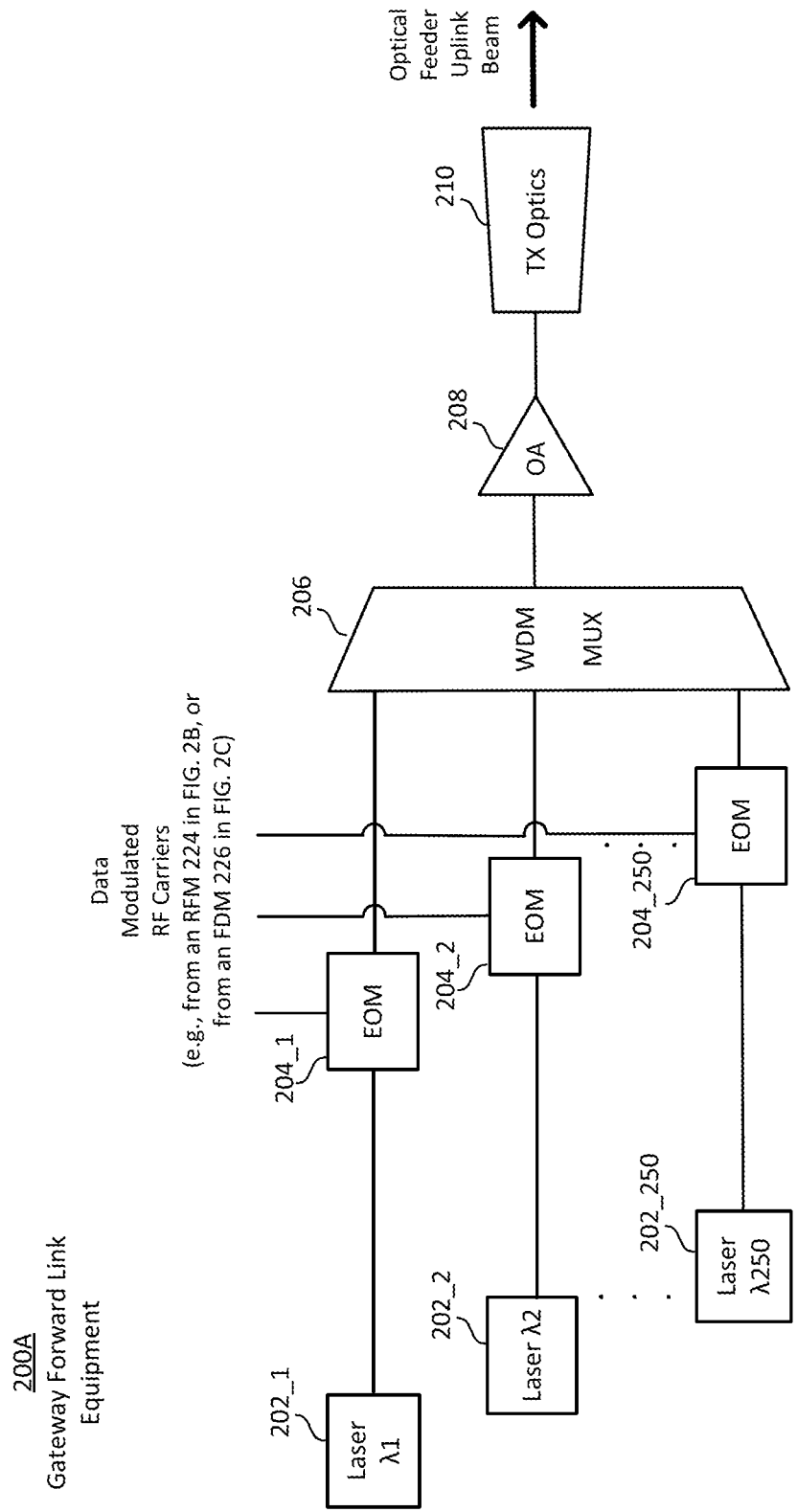
FIG. 2A depicts gateway forward link equipment, according to an embodiment of the present technology.
Figure 3:
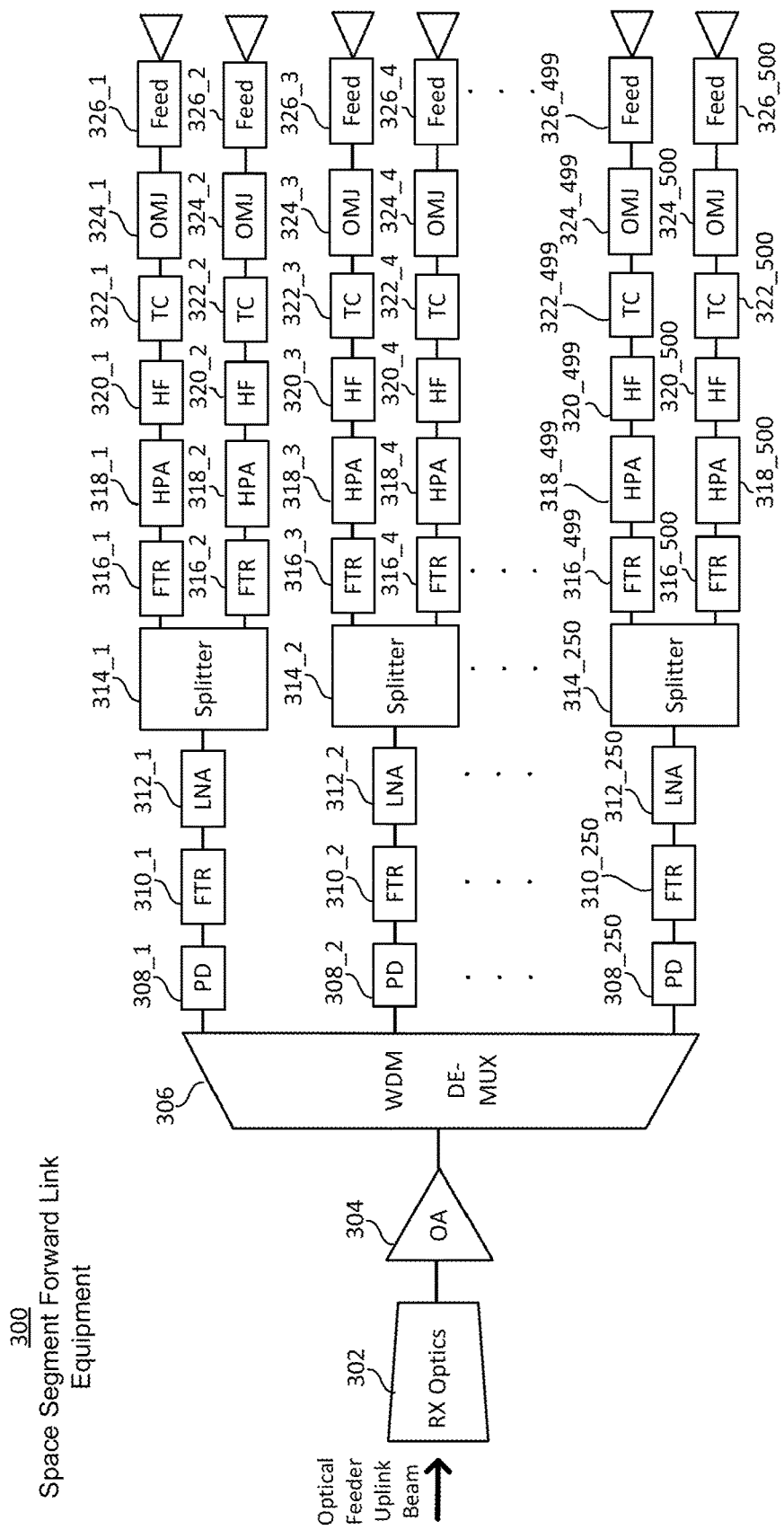
FIG. 3 depicts space segment forward link equipment, according to an embodiment of the present technology.

FIGS. 2A-2C will first be used to describe gateway forward link equipment according to certain embodiments of the present technology. FIG. 3 will then be used to describe space segment forward link equipment according to an embodiment of the present technology. In specific embodiments, 250 laser wavelengths are combined at a single gateway (which can be referred to as an optical gateway) and sent to the satellite, which has 500 user beams (also known as service beams) operating at Ka band frequencies. In accordance with an embodiment, each wavelength carries 2.5 GHz so that a total of 625 GHz is sent from the gateway on the ground to the satellite. At a modest spectral efficiency of 2 bps/Hz, this leads to a 1.25 Tb/s satellite design. In accordance with another embodiment, each wavelength carries 2.9 GHz so that a total of 725 GHz is sent from the gateway on the ground to the satellite. At a modest spectral efficiency of 2 bps/Hz, this leads to a 1.45 Tb/s satellite design. FIGS. 4A-4C and 5 will thereafter be used to depict return link equipment for a satellite and a gateway.

Gateway Forward Link Equipment

FIG. 2A will now be used to describe gateway forward link equipment 200A, according to an embodiment of the present technology. Such gateway forward link equipment 200A can also be referred to as an optical gateway forward link subsystem 200A, or more generally, as an optical communication subsystem. Referring to FIG. 2A, the optical gateway forward link subsystem 200A is shown as including two hundred and fifty lasers 202_1 to 202_250, two hundred and fifty electro-optical modulator (EOMs) 204_1 to 204_250, a wavelength-division multiplexing (WDM) multiplexer (MUX) 206, an optical amplifier (OA) 208 and transmitter optics 210. Each of these elements are described below.

The two hundred and fifty separate lasers 202_1 to 202_250 each emit light of a different wavelength within a specified wavelength range that is for use in producing the optical feeder uplink beam (e.g., 102u). The lasers can be referred to individually as a laser 202, or collectively as the lasers 202. Where the specified wavelength range is, for example, from 1510 nanometers (nm) to 1560 nm, then the laser 202_1 may emit light having a peak wavelength of 1510 nm, the laser 202_2 may emit light having a peak wavelength of 1510.2 nm, the laser 202_3 (not shown) may emit light having a peak wavelength of 1510.4 nm, . . . the laser 202_249 (not shown) may emit light having a peak wavelength of 1559.8 nm, and the laser 202_250 may emit light having a peak wavelength of 1660 nm. In other words, the peak wavelengths emitted by the lasers 202 can occur at 0.2 nm intervals from 1510 nm to 1560 nm. The wavelength range from 1510 nm to 1560 nm, which is within the infrared (IR) spectrum, is practical to use because IR lasers for use in communications are readily available. However, wider or narrow wavelength ranges, within the same or other parts of the optical spectrum, may alternatively be used. For example, it would also be possible to utilize a wavelength range within the 400 nm-700 nm visible spectrum. It is also possible that the wavelength range that is specified for use in producing the optical feeder uplink beam (e.g., 102u) is non-contiguous. For example, the wavelength range that is for use in producing the optical feeder uplink beam can be from 1510 nm to 1534.8 nm and from 1540.2 nm to 1564.8 m. Further, it is also possible that gateway forward link equipment can alternatively include more or less than two hundred and fifty lasers (that each emit light of a different peak wavelength within a specified contiguous or non-contiguous wavelength range). Additionally, it is noted that the gateway forward link equipment may include two or more of each of the lasers (that each emit light of a different peak wavelength within a specified contiguous or non-contiguous wavelength range) to provide for redundancy or backup. Each of the lasers 202 can be, for example, a diode-pumped infrared neodymium laser, although the use of other types of lasers are also within the scope of the embodiments described herein.

To reduce and preferably avoid interference, the wavelength range that is for use in producing the optical feeder uplink beam (e.g., 102u) should be different than the wavelength range that is for use in producing the optical feeder downlink beam (e.g., 102d). For example, if the wavelength range that is for use in producing the optical feeder uplink beam 102u is from 1510 nm to 1560 nm, then the wavelength range that is for use in producing the optical feeder downlink beam 102d can be from 1560.2 nm to 1575 nm. For another example, if the wavelength range that is for use in producing the optical feeder uplink beam 102u is from 1510 nm to 1534.8 nm and from 1540.2 nm to 1564.8 m, then the wavelength range that is for use in producing the optical feeder downlink beam 102d can be from 1535 nm to 1540 nm and from 1565 nm to 1575 nm. These are just a few examples, which are not intended to be all encompassing. Details of how an optical feeder downlink beam (e.g., 102d) can be produced in accordance with an embodiment of the present technology are provided below in the discussion of FIGS. 4A, 4B and 4C.

Still referring to FIG. 2A, the light emitted by each of the two hundred and fifty lasers 202, which can be referred to as an optical carrier signal, is provided (e.g., via a respective optical fiber) to a respective one of the two hundred and fifty separate EOMs 204_1 to 204_250. The EOMs can be referred to individually as an EOM 204, or collectively as the EOMs 204. Each of the EOMs is an optical device in which a signal-controlled element exhibiting an electro-optic effect is used to modulate a respective beam of light. The modulation performed by the EOMs 204 may be imposed on the phase, frequency, amplitude, or polarization of a beam of light, or any combination thereof. In accordance with a specific embodiment, each of the EOMs 204 is a phase modulating EOM that is used as an amplitude modulator by using a Mach-Zehnder interferometer. In other words, each of the EOMs 204 can be implemented as a Mach-Zehnder modulator (MZM), which can be a Lithium Niobate Mach-Zehnder modulator, but is not limited thereto. In accordance with specific embodiments, each of the EOMs 204 is implemented as an MZM that produces an amplitude modulated (AM) optical waveform with a modulation index between 10% and 80% in order to maintain fidelity of an RF waveform (modulated therein) without too much distortion. The optical signal that is output by each of the EOMs 204 can be referred to as an optical data signal. The modulation scheme that is implemented by the EOMs 204 can result in double- or vestigial-sidebands, including both an upper sideband (USB) and a lower sideband (LSB). Alternatively single-sideband modulation (SSB) can be utilized to increase bandwidth and transmission power efficiency.

The two hundred and fifty separate optical data signals that are output by the two hundred and fifty EOMs 204 are provided to the WDM MUX 206, which can also be referred to as a dense wavelength division multiplexing (DWDM) MUX. The WMD MUX 206 multiplexes (i.e., combines) the two hundred and fifty optical data signals, received from the two hundred and fifty EOMs 204, onto a single optical fiber, with each of the two hundred and fifty separate optical data signals being carried at the same time on its own separate optical wavelength within the range from 1510 nm to 1560 nm. For example, as explained above, the two hundred and fifty separate optical data signals can have peak wavelengths of 1510 nm, 1510.2 nm, 1510.4 nm . . . 1559.8 nm and 1560 nm. In accordance with certain embodiments, one or more of the optical signals that is/are provided to the WDM MUX 206 may come directly from an optical fiber of or attached to an optical network, such as, but not limited to, a local area network (LAN), metropolitan area network (MAN) or wide area network (WAN).

The signal that is output by the WMD MUX 206, which can be referred to as a wavelength division multiplexed optical signal, is provided to the optical amplifier (OA) 208. The OA 208 amplifies the wavelength division multiplexed optical signal so that the wavelength division multiplexed optical signal has sufficient power to enable transmission thereof from the ground to the satellite 100 in space. An exemplary type of OA 208 that can be used is an erbium-doped fiber amplifier (EDFA). However embodiments of the present technology are not limited to use with an EDFA. The output of the OA 208 can be referred to as an optically amplified wavelength division multiplexed optical signal.

The optically amplified wavelength division multiplexed optical signal, which is output by the OA 208, is provided (e.g., via an optical fiber) to the transmitter optics 210. The transmitter optics 210, which can also be referred to as a telescope, can includes optical elements such as lenses, mirrors, reflectors, filters and/or the like. The transmitter optics 210 outputs a collimated optical feeder uplink beam that is aimed at a satellite. A gimbal, and/or the like, can be used to control the steering of the transmitter optics 210. In accordance with an embodiment, the collimated optical feeder uplink beam has an aperture of about 100 cm, and a half beam divergence of about 0.0000004 radians, wherein the term "about" as used herein means +/−10 percent of a specified value. The use of other apertures and half beam divergence values are also within the scope of the embodiments described herein. The collimated optical feeder uplink beam, which is output by the transmitter optics 210, is transmitted in free-space to receiver optics on a satellite. The term "free-space" means air, outer space, vacuum, or something similar (which is in contrast to using solids such as optical fiber cable, an optical waveguide or an optical transmission line). Reception and processing of the optical feeder uplink beam received at the satellite will be described in additional detail below. However, before describing the reception and processing of the optical feeder uplink beam received at the satellite, additional details of the gateway forward link equipment, according to certain embodiments of the present technology, will first be provided.

Referring again to the EOMs 204, in accordance with certain embodiments of the present technology, each of the EOMs 204 modulates the optical signal it receives (e.g., via an optical fiber from a respective laser 202) with a separate RF signal that has already been modulated to include user data. In order to eliminate the need for RF frequency down-converters in the forward link equipment onboard the satellite, the carrier frequencies of the RF signals that are used to modulate each of the two hundred and fifty lasers 202 on the ground (e.g., in gateway 105) correspond to the desired user downlink frequency band within the Ka band (or some other allotted band). As a result, the satellite repeater is greatly simplified.

For example, a portion of the Ka band that may be desirable to use for transmitting service downlink beams (also referred to as downlink user beams) from satellite 100 to service terminals ST can be from 17.7-20.2 GHz, and thus, includes a 2.5 GHz bandwidth. In such a case, each of the EOMs 204 could modulate the optical signal it receives (e.g., via an optical fiber from a respective laser 202) with a separate RF signal having a frequency within the range from 17.7-20.2 GHz. Further, since each of the two hundred and fifty optical data signals (produced by the two hundred and fifty EOMs) has a bandwidth of 2.5 GHz, the bandwidth of the optical feeder uplink beam that is sent from the ground to the satellite is 625 GHz (i.e., 2.5 GHz*250=625 GHz).

For another example, a portion of the Ka band that may be desirable to use for transmitting service downlink beams (also referred to as downlink user beams) from satellite 100 to service terminals ST can be from 17.3-20.2 GHz, and thus, includes a 2.9 GHz bandwidth. In such a case, each of the EOMs 204 could modulate the optical signal it receives (e.g., via an optical fiber from a respective laser 202) with a separate RF signal having a frequency within the range from 17.3-20.2 GHz. Further, since each of the two hundred and fifty optical data signals (produced by the two hundred and fifty EOMs) has a bandwidth of 2.9 GHz, the bandwidth of the optical feeder uplink beam that is sent from the ground to the satellite is 725 GHz (i.e., 2.9 GHz*250=725 GHz).

Where there is a desire or requirement that satellite 100 transmits five hundred separate service downlink beams, then the portion of the optical feeder uplink beam that is produced by each of the two hundred and fifty lasers 202 needs to be modulated to carry the data for two of the five hundred service downlink beams. In other words, each of the optical signals produced by each of the two hundred and fifty lasers 202 needs to be modulated to carry the data for two of the five hundred service downlink beams. This can be achieved by using half of the available portion of the Ka band for carrying the data for one service downlink beam, and the other half of the available portion of the Ka band for carrying the data for another service downlink beam. For example, where the portion of the Ka band that is available for transmitting service downlink beams (also referred to as downlink user beams) is from 17.7-20.2 GHz, then 17.7-18.95 GHz can be used for carrying the data for one service downlink beam, and 18.95-20.2 GHz can be used for carrying the data for another service downlink beam. For another example, where the portion of the Ka band that is available for transmitting service downlink beams (also referred to as downlink user beams) is from 17.3-20.2 GHz, then 17.3-18.75 GHz can be used for carrying the data for one service downlink beam, and 18.75-20.2 GHz can be used for carrying the data for another service downlink beam.

FIG. 2B depicts components that can be used to produce one of the data modulated RF carriers introduced in FIG. 2A, according to an embodiment of the present technology. The components shown in FIG. 2B would be useful where each of the optical data signals produced by each of the EOMs 204 carries the data for one service downlink beam (e.g., for one of the two hundred and fifty service downlink beams). Referring to FIG. 2B, shown therein is a local oscillator (LO) 222 that produces an RF carrier signal within the portion of the Ka band that is available for transmitting service downlink beams (also referred to as downlink user beams). For example, the LO 222 may produce an RF carrier within the RF frequency range from 17.7-20.2 GHz (e.g., at 18.95 GHz, but not limited thereto). For another example, the LO 222 may produce an RF carrier within the RF frequency range from 17.3-20.2 GHz (e.g., at 18.75 GHz, but not limited thereto). The RF carrier signal that is output by the LO 222 is provided to an RF modulator (RFM) 224, which also receives a data signal. The RFM 224 modulates that data signal onto the RF carrier signal to produce a data modulated RF carrier signal, which is provided to one of the EOMs 204 shown in FIG. 2A. Where two hundred and fifty data modulated RF carrier signals are produced (each of which is provided to a different one of the EOMs 204), the components shown in FIG. 2B can be duplicated two hundred and fifty times. Alternatively, the two hundred and fifty RFMs 224 can receive the same carrier signal from a common LO 222, with each of the RFMs 224 receiving a separate data signal.

FIG. 2C depicts components that can be used to produce one of the data modulated RF carriers introduced in FIG. 2A, according to an alternative embodiment of the present technology. The components shown in FIG. 2C would be useful where each of the optical data signals produced by each of the EOMs 204 carries the data for two of the service downlink beams (e.g., for two of the five hundred service downlink beams). Referring to FIG. 2C, shown therein is a first LO 222_1 and a second LO 222_2, a first RFM 224_1 and a second RFM 224_2, and a frequency division multiplexer (FDM) 226. The LO 222_1 and the LO 222_2 each produces a different RF carrier signal within the portion of the Ka band that is available for transmitting service downlink beams (also referred to as downlink user beams). For example, the LO 222_1 may produce an RF carrier within the RF frequency range from 17.7-18.95 GHz (e.g., at 18.325 GHz, but not limited thereto), and the LO 222_2 may produce an RF carrier within the RF frequency range from 18.95-20.2 GHz (e.g., at 19.575, but not limited thereto). For another example, the LO 222_1 may produce an RF carrier within the RF frequency range from 17.3-18.75 GHz (e.g., at 18.025 GHz, but not limited thereto), and the LO 222_2 may produce an RF carrier within the RF frequency range from 18.75-20.2 GHz (e.g., at 19.475, but not limited thereto). The RFM 224_1 modulates a first data signal onto the RF carrier signal produced by the LO 222_1 to thereby produce a first data modulated RF carrier signal. The RFM 224_2 modulates a second data signal onto the RF carrier signal produced by the LO 222_2 to thereby produce a second data modulated RF carrier signal. The first and second data modulated RF carrier signals, which are produced by the RFMs 224_1 and 224_2, are provided to the FDM 226. The FDM 226 frequency multiplexes the first and second data modulated RF carrier signals, received from the two RFMs 224_1 and 224_2, onto a single carrier medium (e.g., cable, wire or trace), with each of the two data modulated RF carrier signals being carried at the same time at its own separate frequency sub-band. The output of the FDM 226 is provided to one of the EOMs 204 shown in FIG. 2A. Where two hundred and fifty data modulated RF carrier signals are produced (each of which is provided to a different one of the EOMs 204), the components shown in FIG. 2C can be duplicated two hundred and fifty times. Alternatively, two hundred and fifty of the RFMs 224 can receive the same carrier signal from a common LO 222_1, and another two hundred and fifty RFMs 224 can receive the same carrier signal from a common LO 222_2, with each of the RFMs 224 receiving a separate data signal. Other variations are also possible, and within the scope of an embodiment of the present technology.

The RFMs 224 can perform various different types of RF modulation, depending upon implementation and other factors such channel conditions. For example, the RFMs 224 can perform Amplitude-shift keying (ASK), Phase-shift keying (PSK), or Amplitude and phase-shift keying (APSK) types of modulation (e.g., 16-, 128- or 256-APSK), just to name a few. In accordance with certain embodiments, the modulation scheme performed by the RFMs 224 and EOMs 204 cause the signals that are transmitted from the ground to a satellite to be in conformance with the Digital Video Broadcasting-Satellite-Second Generation (DVB-S2) standard, or the related DVB-S2X standard (which is an extension of the DVB-S2 standard).

Referring again to FIG. 2A, in order to wavelength division multiplex two hundred and fifty wavelengths produced by the two hundred and fifty lasers 202_1 to 202_250, a combination of C band optical frequencies (from 1530 m to 1565 nm) and L band optical frequencies (from 1565 nm to 1625 nm) may be used, in order to keep the separation of the wavelengths to be at least 20-25 GHz in order to reduce and preferably minimize inter-wavelength interference that may occur in an optical fiber due to non-linearities. If fewer wavelengths are used (e.g., at C band alone), and higher bandwidth is available at Ka band per user beam (e.g., if 2.9 GHz is available as it is in certain ITU Regions), the overall throughput still remains of the order of several hundred GHz, which lets the capacity reach the Tb/s range. If instead each wavelength carries more than the Ka band user bandwidth, fewer wavelengths can be used, but some amount of frequency conversion would be needed in the space segment forward link equipment.

A data modulated RF carrier signal (including data for one service downlink beam) can be provided to one EOM 204, and the optical data signal output from that EOM 204 (and provided to the WDM MUX 206) can include data for the one service downlink beam, as can be appreciated from FIGS. 2A and 2B. Alternatively, two data modulated RF carrier signals (including data for two service downlink beams) can be provided to the same EOM 204, and the optical data signal output from that EOM 204 (and provided to the WDM MUX 206) can include data for the two service downlink beams, as can be appreciated from FIGS. 2A and 2C. In still other embodiments, two or more data modulated RF carrier signals (including data for the same service downlink beam) can be provided to one EOM 204, and the optical data signal output from the EOM 204 (and provided to the WDM MUX 206) can include data (of the two or more data modulated RF carrier signals) to be included in the one service downlink beam. Other variations are also possible, and within the scope of the embodiments disclosed herein.

Figure 2D:
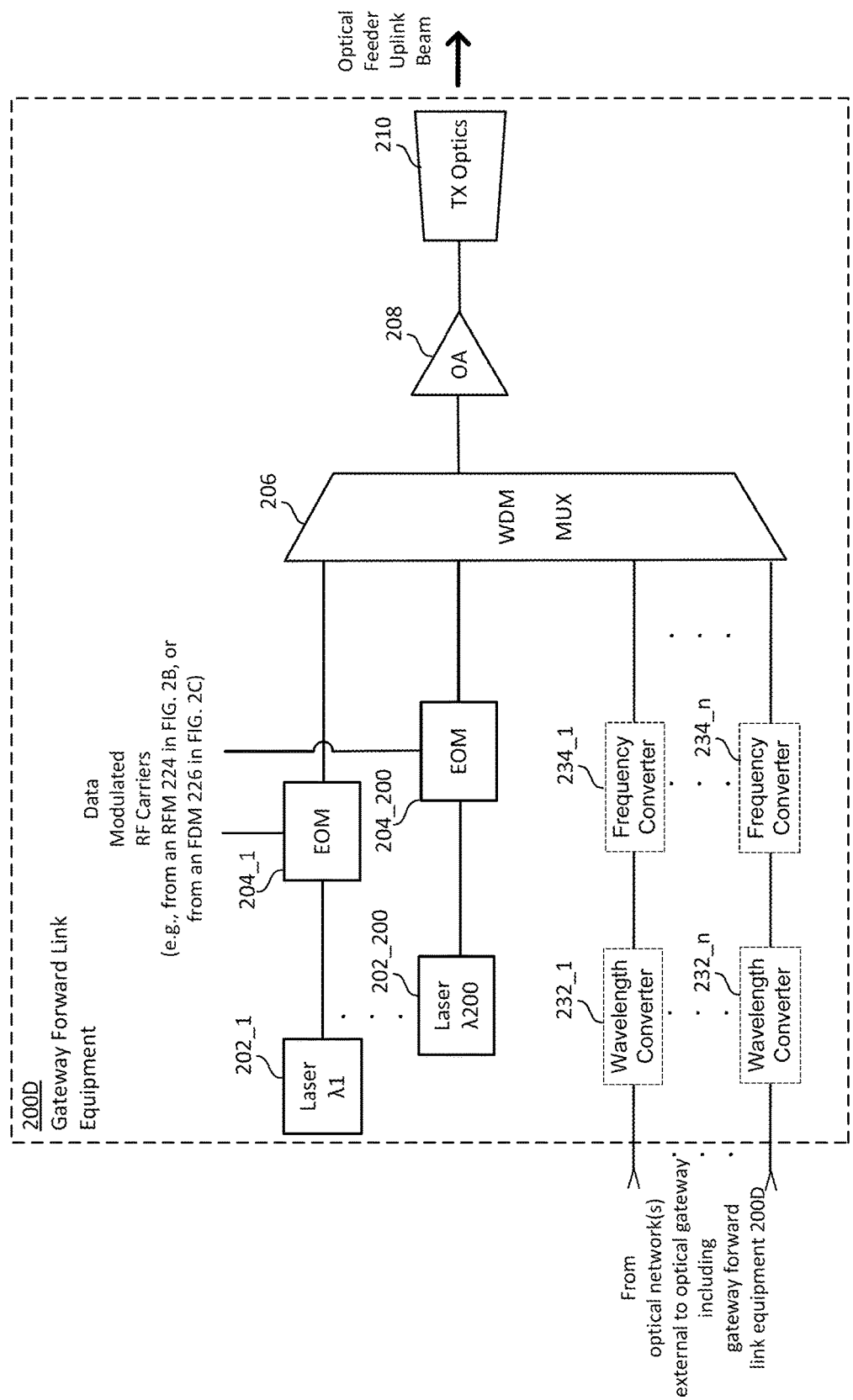
FIG. 2D depicts one or more optical networks, which are external to the gateway forward link equipment introduced in FIG. 2A, providing optical signals to the gateway forward equipment.

As noted above, in accordance with certain embodiments, one or more of the optical signals that is/are provided to the WDM MUX 206 may come from an optical fiber of or attached to an optical network, such as, but not limited to, a local area network (LAN), metropolitan area network (MAN) or wide area network (WAN). Such an optical network can be external to the gateway in which the gateway forward link equipment is located. An example of such an embodiment is shown in FIG. 2D. More specifically, FIG. 2D depicts one or more optical networks, which are external to the gateway that includes gateway forward link equipment 200D, providing optical signals to the gateway forward equipment 200D so that the data included in the optical signals (received from the external optical networks) can be included in the optical feeder uplink beam that is transmitted from the gateway through free-space to a satellite. Although not specifically shown in FIG. 2D, each optical signal path that provides an optical signal from an optical network external to the gateway to the WDM MUX 206 may include a filter to remove unwanted frequencies and/or an optical amplifier (OA) to amplify the signal before it is provided to the WDM MUX 206. Exemplary details of such filters and OAs have been described herein, and thus, need not be repeated. Since each of the optical signals provided to the WDM MUX 206 should have a different optical wavelength, to enable wavelength divisional multiplexing to be performed, the optical signal received from the external optical networks should have an appropriate optical wavelength that differs from other wavelengths being provided to the WDM MUX 206, or alternatively, can be converted to an appropriate optical wavelength that differs from other wavelengths being provided to the WDM MUX 206. One or more optical wavelength converters, within or external to the optical gateway, can be used to perform such wavelength conversions. The embodiments described with reference to FIG. 2D (as well as FIG. 5B, discussed below) can provide enhanced end-to-end security, e.g., for military and/or other government data, because the gateway does not need any knowledge of the modulation and/or encryption schemes used on the optical signals that are being received from and/or forwarded to the optical network(s) that is/are external to the optical gateway.

In accordance with certain embodiments, the gateway forward link equipment 200D can optionally include wavelength converters 232, wherein each of the wavelength converters 232 is configured to convert a peak optical wavelength of one of the one or more optical data signals, received from the one or more optical networks that are external to the ground based optical gateway (that includes the gateway forward link equipment 200D), to a different peak optical wavelength so that no two optical signals received at different inputs of the WDM multiplexer 206 have a same peak optical wavelength. Additionally, or alternatively, the gateway forward link equipment 200D can optionally include one or more frequency converters 234, wherein each of the frequency converters 234 is configured to up-convert or down-convert a frequency of a different one of the optical signals being provided to the WDM multiplexer 206 (from one of the one or more optical networks that are external to the ground based optical gateway that includes the gateway forward link equipment 200D), to thereby eliminate any need for frequency conversion to be performed on the satellite to which the optical feeder uplink beam is being transmitted. Wavelength conversion can be performed prior to the frequency conversion, as shown in FIG. 2D, or alternatively, frequency conversion can be performed prior to the wavelength conversion. For example, the relative positions of the wavelength converters 232 and the frequency converters 234 in FIG. 2D can be swapped.

Referring again to FIG. 2C, it is also possible that an FDM 226 receives more two data modulated RF carrier signals, e.g., from more than two RFMs 224. This can enable, among other things, one service downlink beam to include more than two data modulated RF carriers.

Space Segment Forward Link Equipment

FIG. 3 will now be used to describe space segment forward link equipment 300 according to an embodiment of the present technology. Such space segment forward link equipment 300, which can also be referred to as a forward link satellite subsystem 300, or more generally, as an optical communication subsystem, is configured to receive the optical signal that is transmitted from the ground based optical gateway subsystem 200A or 200D to the satellite that is carrying the space segment forward link equipment 300. The space segment forward link equipment 300 is also configured to convert the optical signal that it receives (from the ground based optical gateway subsystem 200A or 200D) into electrical signals, and to produce service beams therefrom, wherein the service beams are for transmission from the satellite to service terminals STs.

Referring to FIG. 3, the forward link satellite subsystem 300 is shown as including receiver optics 302, an optical amplifier (OA) 304, a wavelength-division multiplexing (WDM) demultiplexer (DEMUX) 306, two hundred and fifty photodetectors (PDs) 308_1 to 308_250, two hundred and fifty filters 310_1 to 310_250, two hundred and fifty low noise amplifiers (LNAs) 312_1 to 312_250, and two hundred and fifty splitters 314_1 to 314_250. The forward link satellite subsystem 300 is also shown as including five hundred filters 316_1 to 316_500, high power amplifiers (HPAs) 318_1 to 318_500, harmonic filters (HFs) 320_1 to 320_500, test couplers (TCs) 322_1 to 322_500, orthomode junctions (OMJs) 324_1 to 324_500, and feed horns 326_1 to 326_500. The PDs 308_1 to 308_250 can be referred to individually as a PD 308, or collectively as the PDs 308. The filters 310_1 to 310 250 can be referred to individually as a filter 310, or collectively as the filters 310. The LNAs 312_1 to 312_250 can be referred to individually as an LNA 312, or collectively as the LNAs 312. The filters 316_1 to 316_500 can be referred to individually as a filter 316, or collectively as the filters 316. The HPAs 318_1 to 318_500 can be referred to individually as an HPA 318, or collectively as the HPAs 318. The HFs 320_1 to 320_500 can be referred to individually as an HF 320, or collectively as the HFs 320. The TCs 322_1 to 322_500 can be referred to individually as a TC 322, or collectively as the TCs 322. The OMJs 324_1 to 324_500 can be referred to individually as an OMJ 324, or collectively as the OMJs 324. The feed horns 326_1 to 326_500 can be referred to individually as a feed horn 326, or collectively as the feed horns 326.

The receiver optics 302, which can also be referred to as a telescope, can includes optical elements such as mirrors, reflectors, filters and/or the like. The receiver optics 302 receives the optical feeder uplink beam that is transmitted through free-space to the satellite by the ground based optical gateway forward link subsystem 200A or 200D, and provides the received optical feeder uplink beam (e.g., via an optical fiber) to the OA 304. A gimbal, and/or the like, can be used to control the steering of the receiver optics 302. When the optical feeder uplink beam reaches the satellite, the power of the optical feeder uplink beam is significantly attenuated compared to when it was transmitted by the ground based optical gateway subsystem 200A or 200D. Accordingly, the OA 304 is used to amplify the received optical feeder uplink beam before it is provided to the WDM DEMUX 306. The OA 304 can be, e.g., an erbium-doped fiber amplifier (EDFA), but is not limited thereto. The output of the OA 304 can be referred to as an optically amplified received optical feeder uplink beam. The WDM DEMUX 306 demultiplexes (i.e., separates) the received optical feeder uplink beam (after it has been optically amplified) into two hundred and fifty separate optical signals, each of which is provided to a separate photodetector (PD) 308. Each PD 308 converts the optical signal it receives from the WDM DEMUX 306 to a respective RF electrical signal. The RF electrical signal produced by each PD 308 is provided to a respective filter (FTR) 310 (e.g., a bandpass filter) to remove unwanted frequency components and/or enhance desired frequency components. For an example, each filter 310 can pass frequencies within the range of 17.7-20.2 GHz, or within the range of 17.3-20.2 GHz, but are not limited thereto. The filtered RF electrical signal, which is output by each filter 310, is provided to a respective low noise amplifier (LNA) 312. Each LNA 312 amplifies the relatively low-power RF signal it receives from a respective filter 310 without significantly degrading the signals signal-to-noise ratio. The amplified RF signal that is output by each LNA 312 is provided to an optional respective splitter 314.

The splitter 314 splits the amplified RF signal it receives into two copies, each of which has half the power of the amplified RF signal that is provided to the input of the splitter 314. Each splitter 314 can be implemented by a hybrid, but is not limited thereto. In accordance with certain embodiments of the present technology, one of the RF signals that is output by a splitter 314 is used to produce one service beam, and the other RF signal that is output by the same splitter 314 is used to produce another service beam. Each of the copies of the RF signal that is output by the splitter 314 is provided to a respective filter 316. For example, the splitter 314_1 provides one copy of the RF signal it receives to the filter 316_1, and provides another copy of the RF signal it receives to the filter 316_2. In accordance with certain embodiments, the pair of filters 316 that receive RF signals from the same splitter 314 have pass bands that differ from one another. For example, the filter 316_1 may have a passband of 17.7-18.95 GHz and the filter 316_2 may have a passband of 18.95-20.2 GHz. For another example, the filter 316 1 may have a passband of 17.3-18.75 GHz and the filter 316_2 may have a passband of 18.75-20.2 GHz. This enables each splitter 314 and pair of filters 316, which are fed by the splitter 314, to separate a signal received by the splitter into two separate RF signals corresponding to two separate user beams. The use of other passbands are possible and within the scope of an embodiment of the present technology.

Each HPA 318 amplifies the RF signal it receives so that the RF signal has sufficient power to enable transmission thereof from the satellite 100 in space to an ST, which may be on the ground. Each HPA 318 can be, e.g., a liner traveling wave tube high power amplifier, but is not limited thereto. The signal that is output by each of the HPAs 318 can be referred to as an amplified RF signal. Each HF 320 is used to reduce and preferably remove any distortion in the amplified RF signal that was caused by a respective HPA 318. Each HF 320 can be, e.g., an RLC circuit built from resistive (R), inductive (L) and capacitive (C) elements, but is not limited thereto. Each test coupler TC 322 can be used for power monitoring, payload testing and/or performing calibrations based on signals passing therethrough. Each OMJ 324 adds either right hand circular polarization (RHCP) or left hand circular polarization (LHCP) to the RF signal that is passed through the OMJ. This allows for color reuse frequency band allocation, wherein each color represents a unique combination of a frequency band and an antenna polarization. This way a pair of feeder beams that illuminate adjacent regions can utilize a same RF frequency band, so long as they have orthogonal polarizations. Alternatively, each OMJ 324 adds either horizontal linear polarization or vertical linear polarization to the RF signal that is passed through the OMJ. Each feed horn 326 converts the RF signal it receives, from a respective OMJ 324, to radio waves and feeds them to the rest of the antenna system (not shown) to focus the signal into a service downlink beam. A feed horn 326 and the rest of an antenna can be collectively referred to as the antenna. In other words, an antenna, as the term is used herein, can include a feed horn. All or some of the feed horns 326 can share a common reflector. Such reflector(s) is/are not shown in the Figures, to simply the Figures.

Space Segment Return Link Equipment

FIG. 4A will now be used to describe a portion of space segment return link equipment 400A, according to an embodiment of the present technology. Such space segment return link equipment 400A, which can also be referred to as a satellite return link subsystem 400A, or more generally, as an optical communication subsystem, is configured to receive the RF signals that are transmitted by service terminals STs to the satellite (e.g., 100) that is carrying the space segment return link equipment 400A. The space segment return link equipment 400A, together with the space segment return link equipment 400D in FIG. 4D, is also configured to convert the RF signals that it receives (from the service terminals STs) into optical signals, and to produce optical return feeder beams, wherein the optical return feeder beams are for transmission from the satellite (e.g., 100) to a ground based gateway (e.g., 105).

Referring to FIG. 4A, the portion of the space segment return link equipment 400A shown therein includes feed horns 402_1 to 402_500 (which can be referred to individually as a feed horn 402, or collectively as the feed horns 402), orthomode junctions (OMJs) 404 1 to 404_500 (which can be referred to individually as an OMJ 404, or collectively as the OMJs 404), test couplers (TCs) 406_1 to 406_500 (which can be referred to individually as a TC 406, or collectively as the TCs 406), pre-select filters (PFs) 408_1 to 408_500 (which can be referred to individually as a PF 408, or collectively as the PFs 408), low noise amplifiers (LNAs) 410_1 to 410_500 (which can be referred to individually as an LNA 410, or collectively as the LNAs 410), and filters 412_1 to 412_500 (which can be referred to individually as a filter 412, or collectively as the filters 412). The portion of the space segment return link equipment 400A shown in FIG. 4A also includes optional combiners 414_1 to 414_250 (which can be referred to individually as a combiner 414, or collectively as the combiners 414), frequency down-converters 416_1 to 416_250 (which can be referred to individually as a frequency down-converter 416, or collectively as the frequency down-converters 416), filters 418_1 to 418_250 (which can be referred to individually as a filter 418, or collectively as the filters 418), and local oscillators (LOs) 422_1 to 422_4 (which can be referred to individually as an LO 422, or collectively as the LOs 422). The portion of the space segment return link equipment 400A shown in FIG. 4A also includes combiners 420_1 to 420_125 (which can be referred to individually as a combiner 420, or collectively as the combiners 420).

Each feed horn 402 gathers and focuses radio waves of a service uplink beam (e.g., 106u) and converts them to an RF signal that is provided to a respective OMJ 404. A feed horn 402 and the rest of an antenna can be collectively referred to as the antenna or antenna system. In other words, an antenna, as the term is used herein, can include a feed horn. All or some of the feed horns 402 can share a common reflector. Such reflector(s) is/are not shown in the Figures, to simply the Figures. Each OMJ 404 either passes through a right hand circular polarization (RHCP) or a left hand circular polarization (LHCP) RF signal. Each OMJ 404 can alternatively pass through either a horizontal or a vertical linear polarization RF signal. Each test coupler TC 406 can be used for power monitoring, payload testing and/or performing calibrations based on signals passing therethrough. Each pre-select filter (PF) 408 (e.g., a bandpass filter) is used to remove unwanted frequency components and/or enhance desired frequency components. For an example, each PF 408 can pass frequencies within the range of 29.5-30.0 GHz, but is not limited thereto. Each LNA 410 amplifies the relatively low-power RF signal it receives from a respective PF 408 without significantly degrading the signals signal-to-noise ratio. The amplified RF signal that is output by each LNA 410 is provided to a respective filter 412.

Each filter 412 allows frequencies to pass within one of the colors a, b, c or d. For example, the filter 412_1 passes frequencies within the color a, the filter 412_2 passes the frequencies within the color b, the filter 412_3 passes frequencies within the color c, and the filter 412_4 passes frequencies within the color d. In accordance with an embodiment: color 'a' represents a first sub-band (e.g., 29.50-29.75 GHz) of an allocated uplink frequency band (e.g., 29.50-30.00 GHz) with a right-hand circular polarization (RHCP); color 'b' represents a second sub-band (29.75-30.00 GHz) of the allocated uplink frequency band with RHCP; color 'c' represents the first sub-band (e.g., 29.50-29.75 GHz) of the allocated uplink frequency band with a left-hand circular polarization (LHCP); and color 'd' represents the second sub-band (29.75-30.00 GHz) of the allocated uplink frequency band with LHCP. In other embodiments, the colors may include other allocations of the frequency band and polarization.

Each pair of the filters 412 provide their outputs to a combiner 414. For example, the filters 412_1 and 412_2 provide their outputs to the combiner 414_1, and the filters 414_3 and 414_4 provide their outputs to the combiner 414_2. Each optional combiner 414 functions as a directional coupler that combines two RF signals into one. For example, the combiner 414_1 combines RF signal having the color a (received from the filter 412_1) and the RF signal having the color b (received from the filter 412_2) into a single RF signal that is provided to the frequency down-converter 416_1. Similarly, the combiner 414_3 combines RF signal having the color c (received from the filter 412_3) and the RF signal having the color d (received from the filter 412_4) into a single RF signal that is provided to the frequency down-converter 416_2. Each combiner 414 can be implemented by a hybrid, but is not limited thereto.

Each frequency down-converter 416 receives an RF signal from a combiner 414 (which RF signal includes data from two service uplink beams, and thus, can be referred to as an RF data signal) and an RF signal from an LO 422 (which can be referred to as an LO signal), and uses the LO signal to down-convert the RF data signal to a frequency range (e.g., 6.70-7.2 GHz, or 6.3-7.2 GHz, or some other frequency range within the 6-12 GHz band) that can be used for transmitting feeder downlink signals (e.g., 102d) to a gateway (e.g., 105). The output of each frequency down-converter 416 is provided to a filter 418. For example, the frequency down-converter 416_1 provides its output to the A,B filter 418_1, and the frequency down-converter 416_1 provides its output to the C,D filter 418_2. The A,B filter 418_1 is a bandpass filter that allows frequencies to pass within the bands associated with colors A and B. The C,D filter 418_2 is a bandpass filter that allows frequencies to pass within the bands associated with colors C and D. In accordance with an embodiment: color 'A' represents a first sub-band (e.g., 6.7-6.95 GHz) of an allocated downlink frequency band (e.g., 6.7-7.2 GHz) with right-hand circular polarization (RHCP); color 'B' represents a second sub-band (e.g., 6.95-7.2 GHz) of the allocated downlink frequency band with RHCP; color 'C' represents the first sub-band (e.g., 6.7-7.95 GHz) of the allocated downlink frequency band with a left-hand circular polarization (LHCP); and color 'D' represents the second sub-band (e.g., 6.95-7.2 GHz) of the allocated uplink frequency band with LHCP. For another example: color 'A' represents a first sub-band (e.g., 6.3-6.75 GHz) of an allocated downlink frequency band (e.g., 6.3-7.2 GHz) with right-hand circular polarization (RHCP); color 'B' represents a second sub-band (e.g., 6.75-7.2 GHz) of the allocated downlink frequency band with RHCP; color 'C' represents the first sub-band (e.g., 6.3-7.75 GHz) of the allocated downlink frequency band with a left-hand circular polarization (LHCP); and color 'D' represents the second sub-band (e.g., 6.75-7.2 GHz) of the allocated uplink frequency band with LHCP. In other embodiments, the colors may include other allocations of a frequency band and polarization.

Figure 4B:
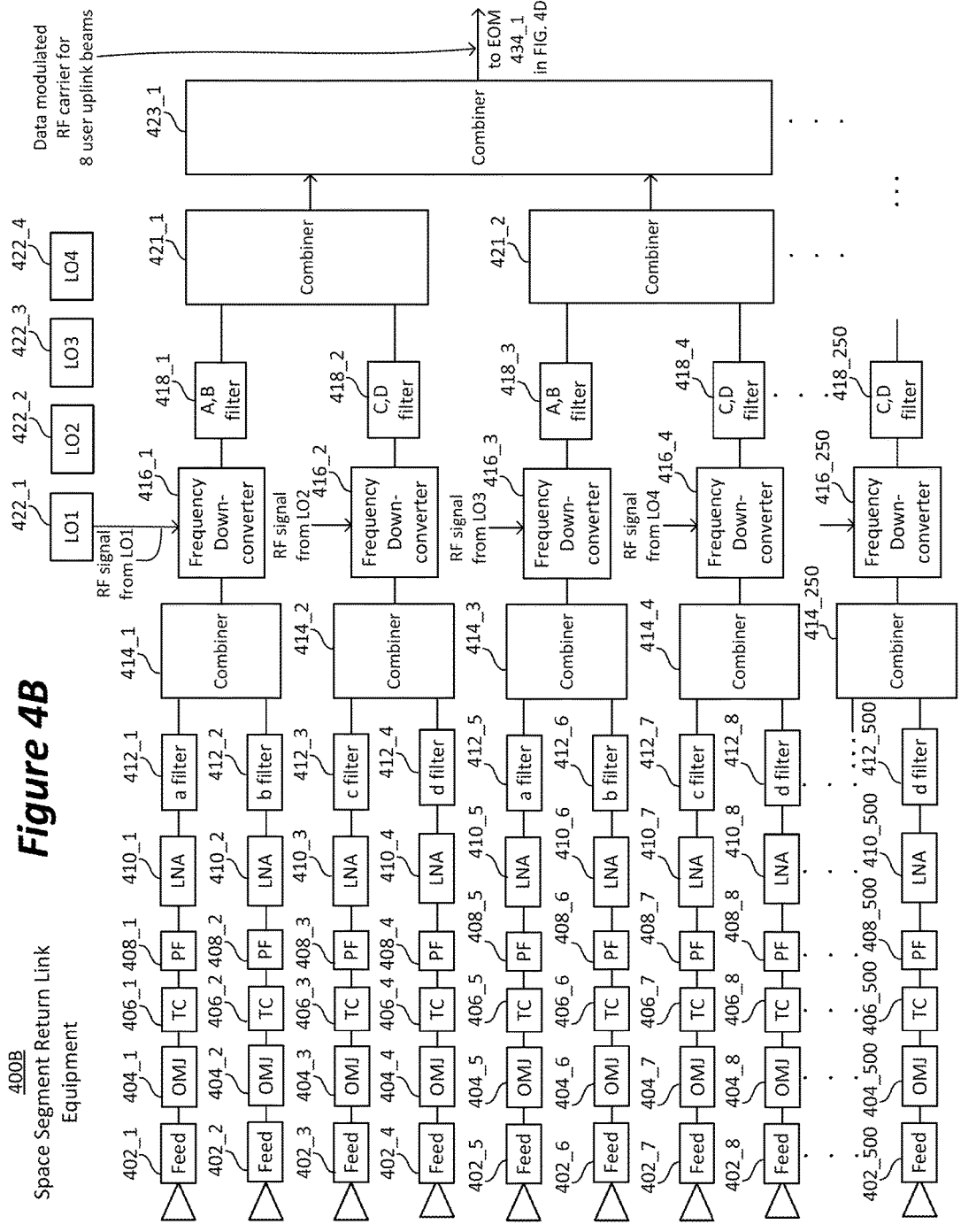
Figure 4D:
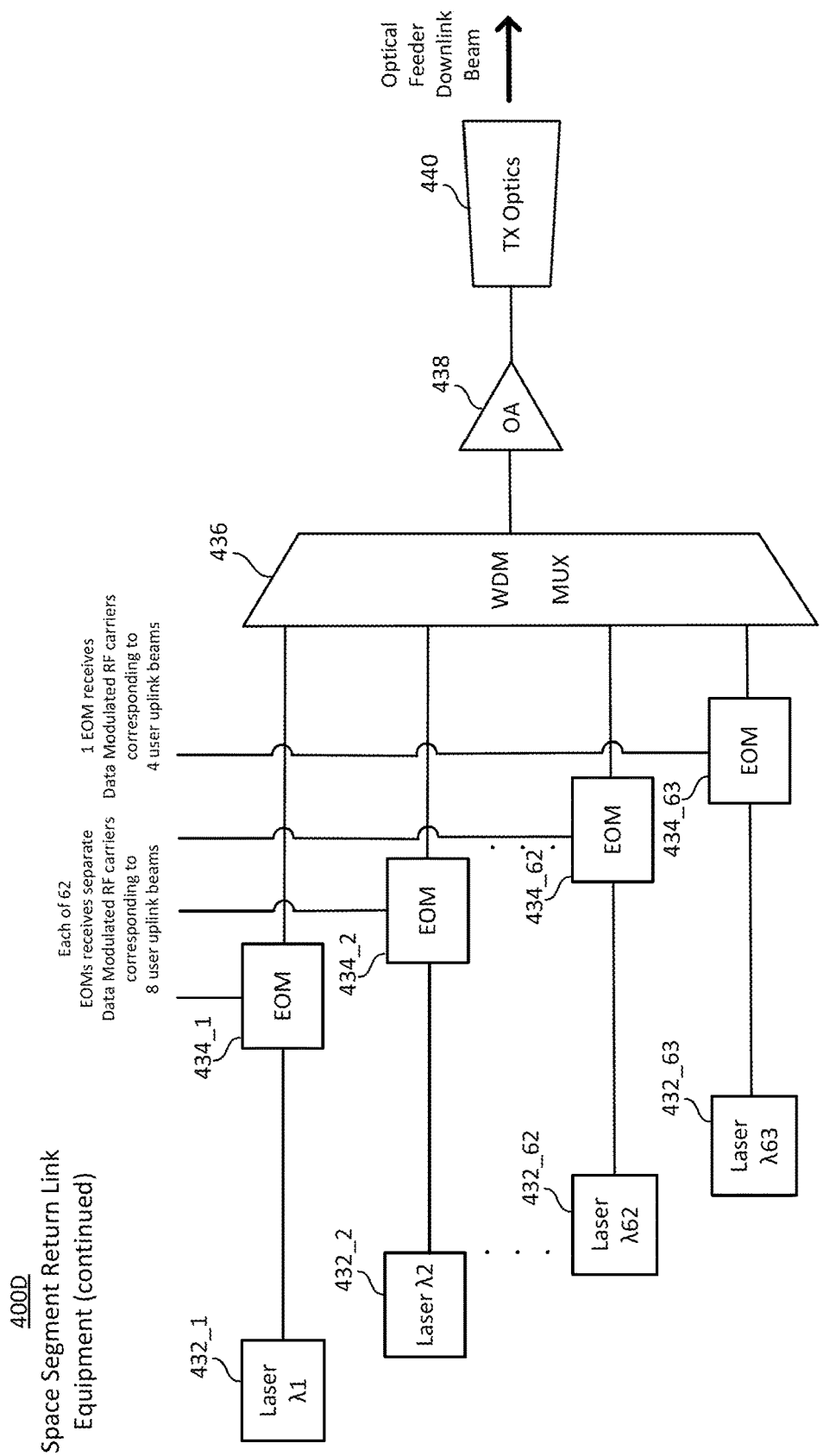
FIG. 4D depicts a further portion of space segment return link equipment, according to an embodiment of the present technology.

In the embodiment of FIG. 4A, the outputs of four filters 418 are provided to a combiner 420. For example, the outputs of filters 418_1, 418_2, 418_3 and 418_4 are provided the combiner 420_1. Each combiner 420 combines the four down-converted and filtered signals it receives into a combined signal that includes data modulated RF carriers for eight service uplink beams. In other words, the output of each combiner 420 includes data received from eight service uplink beams associated with at least eight service terminals STs. The output of each combiner 420 is provided to a separate EOM 434, as will be discussed below with reference to FIG. 4D. However, prior to discussing FIG. 4D, FIGS. 4B and 4C will first be used to describe alternative ways in which data modulated RF carriers are produced from multiple (e.g., eight) service uplink beams.

FIG. 4B depicts a portion of space segment return link equipment 400B, according to an embodiment of the present technology. FIG. 4B is similar to FIG. 4A, except that instead of combining the outputs of four filters 418 using a single combiner 420, the outputs of two filters 418 are combined into one signal using a combiner 421, and the outputs of two combiners 421 are combined using a combiner 423. For example, the outputs of filters 418_1, 418_2 are combined using the combiner 421_1, and the outputs of filter 418_3 and 418_4 are combined by the combiner 421_2, and the outputs of the combiners 421_1 and 421_2 are combined by the combiner 423_1. Similar to the case in FIG. 4A, the output of the combiner 423_1 is a combined signal that includes data modulated RF carriers for eight service uplink beams. In other words, the output of each combiner 420 includes data for eight service uplink beams associated with multiple (e.g., eight) service terminals STs. The output of each combiner 423 is provided to a separate EOM 434, as will be discussed below with reference to FIG. 4D.

In the embodiments shown and described with reference to FIGS. 4A and 4B, the frequency down-converters 416 were shown and described as being used to perform frequency conversions within the space segment return link equipment 400A and 400B. In alternative embodiments of the present technology, the frequency down-converters 416 (and the filters 418) are eliminated, in which case the space segment return link equipment 400A and 400B perform no frequency conversions thereby simplifying the space segment return link equipment. In such alternative embodiments, the outputs of the combiners 414 can be provided directly to the combiners 420 (in FIG. 4A) or the combiners 421 (in FIG. 4B). Such alternative embodiments, which eliminate frequency conversion on the return link, provide for less bandwidth on the return link than the embodiments of FIGS. 4A and 4B. Less bandwidth on the return link should typically be acceptable, since a return link typically needs to handle much less bandwidth than a forward link since service terminals STs typically download much more data than they upload. An example of such an alternative embodiment, is shown in FIG. 4C. In the embodiment of FIG. 4C, the outputs of two of the filters 412 are provided to a combiner 414, and the outputs of four of the combiners 414 is provided to a combiner 420. In another embodiment, the outputs of eight of the filters 412 (e.g., the filters 412_1 to 412_8) are all provided directly to a same combiner (e.g., the combiner 420_1). In other words, there can be less cascading of combiners. In still another embodiment, there can be additional cascading of combiners, e.g., in a similar manner as was shown in FIG. 4B.

FIGS. 4A, 4B and 4C were used to described portions of space segment return link equipment (400A or 400B) that produce a data modulated RF carrier for multiple (e.g., eight) service uplink beams associate with multiple (e.g., eight or more) service terminals STs. FIG. 4D will now be used to describe a further portion of the space segment return link equipment 400D that is used to convert the data modulated RF carrier signals into a collimated optical downlink feeder beam that is aimed at a gateway. Referring to FIG. 4D, the portion of the space segment return link equipment 400D is shown as including sixty three lasers 432_1 to 432_63, sixty three electro-optical modulator (EOMs) 434_1 to 434_63, a wavelength-division multiplexing (WDM) multiplexer (MUX) 436, an optical amplifier (OA) 438 and transmitter optics 440. Each of these elements are described below.

The sixty three separate lasers 432_1 to 432_63 each emit light of a different wavelength within a specified wavelength range. The lasers can be referred to individually as a laser 432, or collectively as the lasers 432. Where the specified wavelength range is, for example, from 1560.2 nm to 1575 nm, then the laser 432_1 may emit light having a peak wavelength of 1560.2 nm, the laser 432_2 may emit light having a peak wavelength of 1560.4 nm, the laser 432_3 (not shown) may emit light having a peak wavelength of 1560.6 nm, . . . the laser 432_62 may emit light having a peak wavelength of 1672.6 nm, and the laser 432_63 may emit light having a peak wavelength of 1672.8 nm. In other words, the peak wavelengths emitted by the lasers 432 can occur at 0.2 nm intervals from 1560.2 nm to 1572.8 nm. The wavelength range from 1560.2 nm to 1575 nm, which is within the IR spectrum, is practical to use because IR lasers for use in communications are readily available. However, wider or narrow wavelength ranges, within the same or other parts of the optical spectrum, may alternatively be used. For example, it would also be possible to utilize a wavelength range within the 400 nm-700 nm visible spectrum. It is also possible that the wavelength range that is specified for use in producing the optical feeder downlink beam (e.g., 102d) is non-contiguous. For example, the wavelength range that is for use in producing the optical feeder downlink beam can be from 1535 nm to 1540 nm and from 1565 nm to 1575 nm. These are just a few examples, which are not intended to be all encompassing. Further, it is also possible that space segment return link equipment can alternatively include more or less than sixty three lasers (that each emit light of a different peak wavelength within a specified contiguous or non-contiguous wavelength range). Additionally, it is noted that the space segment return link equipment may include two or more of each of the lasers (that each emit light of a different peak wavelength within a specified contiguous or non-contiguous wavelength range) to provide for redundancy or backup. Each of the lasers 432 can be, for example, a diode-pumped infrared neodymium laser, although the use of other types of lasers are also within the scope of the embodiments described herein.

In accordance with certain embodiments, the space segment return link equipment 400D includes less lasers (e.g., sixty three lasers 432) for use in generating the optical feeder downlink beam that is aimed from the satellite 100 to the gateway 105, than the gateway forward link equipment 200A or 200D includes (e.g., five hundred lasers 202) for generating the optical feeder uplink beam that is aimed from the gateway 105 to the satellite 100. This is made possible due to current asymmetric capacity requirements between the forward and return feeder links. More specifically, a feeder downlink beam (e.g., 102d) carries significantly less data than a feeder uplink beam (e.g., 102u), because service terminals STs typically download much more data than they upload.

On the return link, given the current asymmetric capacity requirements between the forward and return links, the space segment return link equipment can be implemented to handle less demand that the ground based forward link equipment. As an example, if each RF service uplink beam is assumed to have only 320 MHz per beam, then a total of 160 GHz needs to be sent from a satellite to a gateway on the optical feeder downlink beam. Several beams' frequencies can be grouped together to create a 4 GHz bandwidth which is then transmitted on each of sixty three laser wavelengths that are multiplexed together and transmitted to the ground. An alternative implementation would be to aggregate the 4 GHz spectrum with filtering post LNA to eliminate the RF frequency conversion and as above directly modulate the RF spectrum on each of the sixty three laser wavelengths. An alternative implementation would be to use only RF LNAs for each feed, modulate each 320 MHz segment of bandwidth onto a single laser and combine two hundred and fifty laser wavelengths together, thus eliminating the need for RF frequency converters. Depending on the number of service beams and feeder beams required, one or the other configuration can be selected to provide the lowest mass solution.

The light emitted by each of the sixty three lasers 432, which can be referred to as an optical carrier signal, is provided (e.g., via a respective optical fiber) to a respective one of the sixty three separate EOMs 434_1 to 434_63. The EOMs can be referred to individually as an EOM 434, or collectively as the EOMs 434. Each of the EOMs 434 is an optical device in which a signal-controlled element exhibiting an electro-optic effect is used to modulate a respective beam of light. The modulation performed by the EOMs 434 may be imposed on the phase, frequency, amplitude, or polarization of a beam of light, or any combination thereof. In accordance with a specific embodiment, each of the EOMs 434 is a phase modulating EOM that is used as an amplitude modulator by using a Mach-Zehnder interferometer. In other words, each of the EOMs 434 can be implemented as a Mach-Zehnder modulator (MZM), which can be a Lithium Niobate Mach-Zehnder modulator, but is not limited thereto. In accordance with specific embodiments, each of the EOMs 434 is implemented as an MZM that produces an amplitude modulated (AM) optical waveform with a modulation index between 10% and 80% in order to maintain fidelity of an RF waveform (modulated therein) without too much distortion. The optical signal that is output by each of the EOMs 434 can be referred to as an optical data signal. The modulation scheme that is implemented by the EOMs 434 can result in double- or vestigial-sidebands, including both an upper sideband (USB) and a lower sideband (LSB). Alternatively single-sideband modulation (SSB) can be utilized to increase bandwidth and transmission power efficiency.

The sixty three separate optical data signals that are output by the sixty three EOMs 434 are provided to the WDM MUX 436, which can also be referred to as a dense wavelength division multiplexing (DWDM) MUX. The WMD MUX 436 multiplexes (i.e., combines) the sixty three optical data signals, received from the sixty three EOMs 434, onto a single optical fiber, with each of the sixty three separate optical data signals being carried at the same time on its own separate optical wavelength within a specified contiguous wavelength range (e.g., from 1560 nm to 1575 nm) or non-contiguous wavelength range (e.g., from 1510 nm to 1534.8 nm, and from 1540.2 nm to 1564.8 m). For example, as explained above, the sixty three optical data signals can have peak wavelengths that occur at 0.2 nm intervals from 1560 nm to 1572.8 nm.

The signal that is output by the WMD MUX 436, which can be referred to as a wavelength division multiplexed optical signal, is provided to the optical amplifier (OA) 438. The OA 438 amplifies the wavelength division multiplexed optical signal so that the wavelength division multiplexed optical signal has sufficient power to enable transmission thereof from the satellite 100 in free-space to the gateway 105. The OA 438 can be an erbium-doped fiber amplifier (EDFA), but is not limited thereto. The output of the OA 438 can be referred to as an optically amplified wavelength division multiplexed optical signal.

The optically amplified wavelength division multiplexed optical signal, which is output by the OA 438, is provided (e.g., via an optical fiber) to the transmitter optics 440. The transmitter optics 440, which can also be referred to as a telescope, can includes optical elements such as lenses, mirrors, reflectors, filters and/or the like. The transmitter optics 440 outputs a collimated optical feeder downlink beam that is aimed at a ground based optical gateway (e.g., 105). A gimbal, and/or the like, can be used to control the steering of the transmitter optics 440. In accordance with an embodiment, the collimated optical feeder downlink beam has an aperture of about 40 cm, and a half beam divergence of about 0.0000012 radians, wherein the term "about" as used herein means +/−10 percent of a specified value. The use of other apertures and half beam divergence values are also within the scope of the embodiments described herein. The collimated optical feeder downlink beam, which is output by the transmitter optics 440, is transmitted in free-space to receiver optics in the gateway 105.

A space segment (e.g., a satellite 100) can have different optics that are used for transmitting an optical feeder downlink beam (e.g., 102*d*) to a gateway, than the optics that are used for receiving an optical feeder uplink beam (e.g., 102*u*) from a gateway. Alternatively, and preferably, to reduce the weight that needs to be carried by the space segment (e.g., a satellite 100), the same optics can be used for both transmitting an optical feeder downlink beam (e.g., 102*d*) to a gateway and for receiving an optical feeder uplink beam (e.g., 102*u*) from a gateway. More specifically, the TX optics 440 shown in FIG. 4D can be the same as the RX optics 302 shown in FIG. 3. Additional and/or alternative components can be shared between the space segment forward link equipment shown in FIG. 3 and the space segment return link equipment shown in FIGS. 4A, 4B and 4D. For example, the feed horns 326 in FIG. 3 can be the same as the feed horns 402 shown in FIGS. 4A and 4B. For another example, the OMJs 324 in FIG. 3 can be the same as the OMJs 404 in FIGS. 4A and 4B, if the OMJs are implement as a three-port device. These are just a few example, which are not intended to be all encompassing.

Referring again to the EOMs 434 in FIG. 4D, in accordance with certain embodiments of the present technology, each of the EOMs 434 modulates the optical signal it receives (e.g., via an optical fiber from a respective laser 432) with a separate RF signal that has already been modulated to include user data. For example, the EOM 434_1 modulates the optical signal it receives from the laser 431 1 with a data modulated RF carrier signal it receives from the combiner 420_1 (in FIG. 4A) or from the combiner 423_1 (in FIG. 4B). The data modulated RF carrier signal that the EOM 434_1 receives from a combiner (420_1 in FIG. 4A, or 423_1 in FIG. 4B) can include data corresponding to eight service uplink beams received from service terminals STs. Similarly, the EOMs 434_2 to 434_62 can each receive a different data modulated RF carrier signal, from a different combiner 420 or 423, with each data modulated RF carrier signal corresponding to a different group of eight service uplink beams received from service terminals STs. The EOM 434_63 can receive a data modulated RF carrier signal, from a combiner 420 or 423, wherein the data modulated RF carrier signal corresponds to four service uplink beams received from service terminals STs. In this manner, the EOMs 434 can be collectively provided with data modulated RF carrier signals corresponding to five hundred service uplink beams (i.e., 62*8+1*4=500).

Figure 4E:
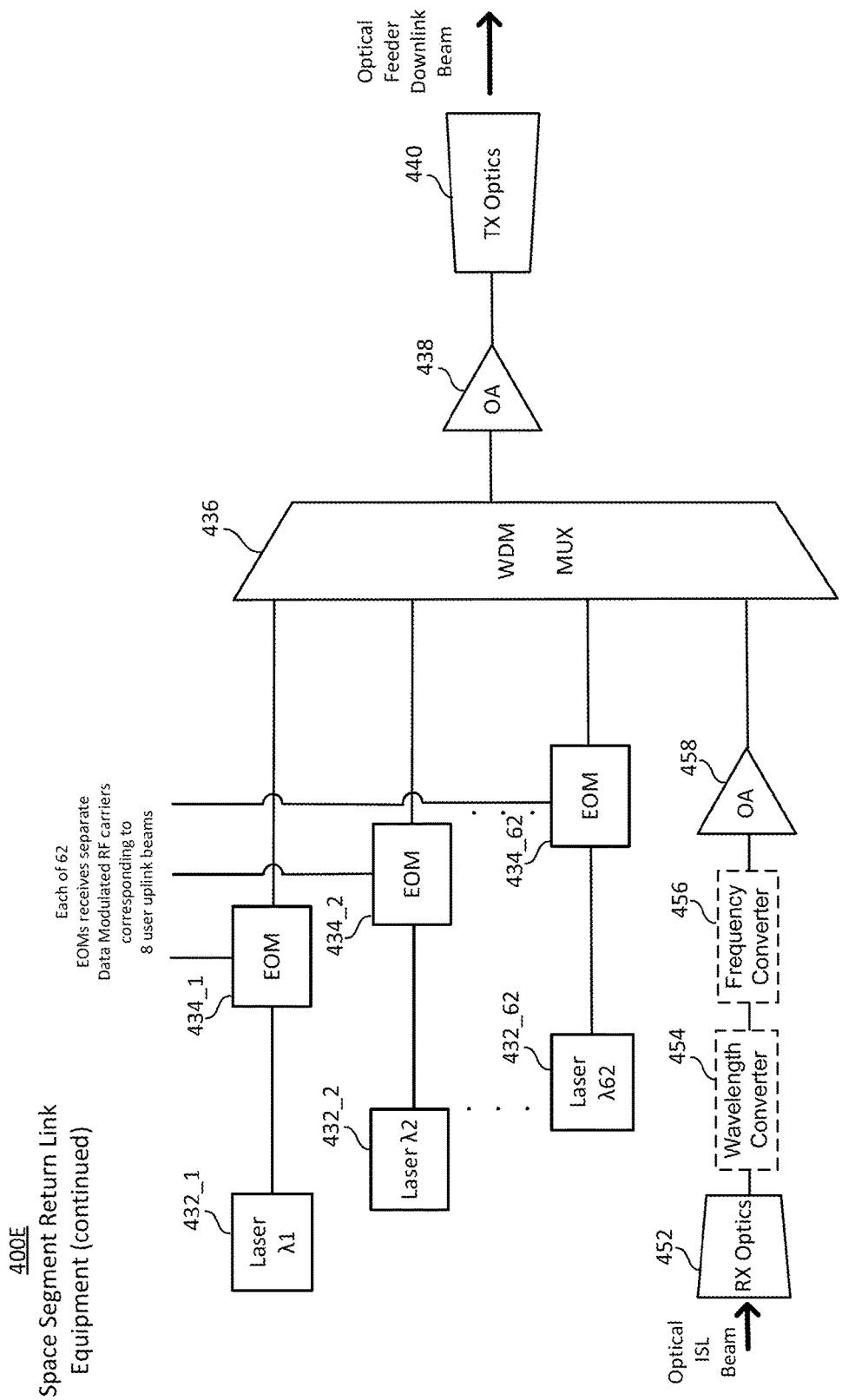
FIG. 4E depicts a portion of space segment return link equipment, according to another embodiment of the present technology.

In the embodiments described above with reference to FIGS. 4A-4D, the collimated optical feeder downlink beam (that is output by the transmitter optics 440 and provided to a ground based optical gateway, e.g., 105) was shown and described as including data corresponding to a plurality of (e.g., five hundred) service uplink beams received from a plurality of service terminals STs. In alternative embodiments, the collimated optical feeder downlink beam (that is output by the transmitter optics 440 and provided to a ground based optical gateway, e.g., 105) includes data corresponding to a plurality service uplink beams received from a plurality service terminals STs, as well as data corresponding to one or more ISL beams received from one or more other satellites. For example, as shown in FIG. 4E, in addition to receiving optical signals output by a plurality (e.g., sixty two) EOMs 434, the WDM MUX 436 is also shown as receiving an amplified optical ISL signal produced by receiver optics 452 and an optical amplifier (OA) 458. More specifically, the receiver optics 452 of space segment return link equipment 400E is configured to receive an optical ISL beam that is transmitted through free-space by transmitter optics of another satellite, and the receiver optics 452 provides an optical ISL signal output therefrom (e.g., via an optical fiber) to the OA 458. The receiver optics 452, which can also be referred to as a telescope, can includes optical elements such as mirrors, reflectors, filters and/or the like, as was the case with the receiver optics 302. A gimbal, and/or the like, can be used to control the steering of the receiver optics 452, as was the case with the receiver optics 302. Both the receiver optics 302 (used to receive an optical feeder uplink beam) and the receiver optics 452 (used to receiver an optical ISL beam) can be included in the same satellite. It would also be possible to use the same receiver optics (e.g., 302) to receive an optical feeder uplink beams during certain periods of time, and to receive an optical ISL beam during other periods of time. The same receiver optics (e.g., 302) cannot be used to receive an optical feeder uplink beam and an optical ISL beam at the same time, because the receiver optics would need to be aimed differently to receive the optical ISL beam from another satellite than it would need to be aimed to receive the optical feeder uplink beam from a ground based optical gateway. Accordingly, in order to receive an optical feeder uplink beam and an optical ISL beam at the same time a satellite should include first receiver optics for use in receiving an optical feeder uplink beam, and second receiver optics for use in receiving an optical ISL beam. Third receiver optics can also be included on the satellite for use as a backup which can be used to backup either the first or second receiver optics, if one of those were to fail. Additional backup receiver optics may also be included on a satellite. Further receiver optics can be added if there was a desire to receive optical ISL beams from more than one other satellite at the same time, in which the WDM MUX 436 can receive two or more optical ISL signals at the same time, and can multiple those ISL signals with optical signals (including data corresponding to a plurality of service uplink beams received from a plurality of service terminals STs) into a single collimated optical feeder downlink beam (that is output by the transmitter optics 440 and provided to a ground based optical gateway, e.g., 105). However, it should be noted that it may be beneficial to limit the amount of receiver optics included on a satellite to limit the weight of the satellite. Optionally, a wavelength converter 454 and/or a frequency converter 456 can be located between the receiver optics 452 and the optical amplifier 458, or alternatively between the optical amplifier 458 and the WDM MUX 436. The function and benefits of a wavelength and a frequency converter are described above, and thus, need not be repeated.

Gateway Return Link Equipment

Figure 5A:
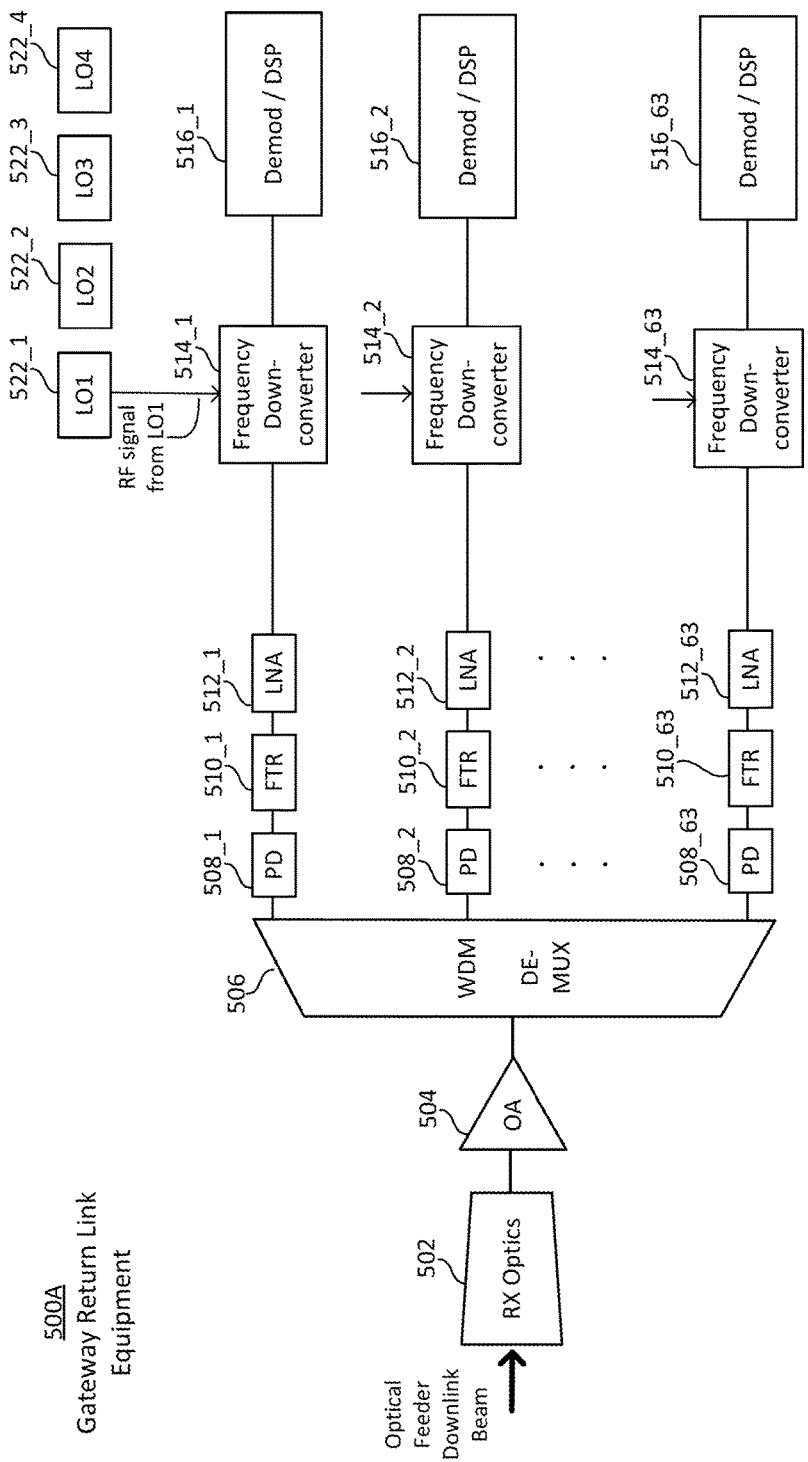
FIG. 5A depicts gateway return link equipment, according to an embodiment of the present technology.

FIG. 5A will now be used to describe gateway return link equipment 500A, according to an embodiment of the present technology. Such gateway return link equipment 500A can also be referred to as an optical gateway return link subsystem 500A, or more generally, as an optical communication subsystem. Referring to FIG. 5A, the optical gateway return link subsystem 500A is shown as including receiver optics 502, an optical amplifier (OA) 504, a wavelength-division multiplexing (WDM) demultiplexer (DEMUX) 506, sixty three photodetectors (PDs) 508_1 to 508_63, sixty three filters 510_1 to 510_63, sixty three low noise amplifiers (LNAs) 512_1 to 512_63, and sixty three frequency down-converters 514_1 to 514_63. The optical gateway return link subsystem 500A is also shown as including sixty three demodulator and digital signal processor (DSP) blocks 516_1 to 516_63, and four local oscillators (LOs) 522_1 to 522_4 (which can be referred to individually as an LO 522, or collectively as the LOs 522).

The receiver optics 502, which can also be referred to as a telescope, can includes optical elements such as mirrors, reflectors, filters and/or the like. The receiver optics 502 receives the optical feeder downlink beam (e.g., 102d) that is transmitted through free-space from a space segment (e.g., a satellite 100), by the space based return link subsystem 400C (or 400A or 400B) and 400D, and provides the received optical feeder downlink beam (e.g., via an optical fiber) to the OA 504. A gimbal, and/or the like, can be used to control the steering of the receiver optics 502. When the optical feeder downlink beam reaches the gateway, the power of the optical feeder downlink beam is significantly attenuated compared to when it was transmitted by the space based return link subsystem. Accordingly, the OA 504 is used to amplify the received optical feeder downlink beam before it is provided to the WDM DEMUX 506. The OA 504 can be, e.g., an erbium-doped fiber amplifier (EDFA), but is not limited thereto. The output of the OA 504 can be referred to as an optically amplified received optical feeder downlink beam. The WDM DEMUX 506 demultiplexes (i.e., separates) the received optical feeder uplink beam (after it has been optically amplified) into sixty three separate optical signals, each of which is provided to a separate photodetector (PD) 508. Each PD 508 converts the optical signal it receives from the WDM DEMUX 506 to a respective RF electrical signal. The RF electrical signal produced by each PD 508 is provided to a respective filter (FTR) 510 (e.g., a bandpass filter) to remove unwanted frequency components and/or enhance desired frequency components. For an example, where frequency down-conversions were performed on the satellite (by the space segment return link equipment 400A or 400B), each filter 510 can pass frequencies within the range of 6.70-7.2 GHz, or within the range of 6.3-7.2 GHz, but are not limited thereto. For another example, where frequency down-conversions were not performed on the satellite (e.g., by the space segment return link equipment 400C), each filter 510 can pass frequencies within the range of 29.5-30 GHz, but are not limited thereto. The filtered RF electrical signal, which is output by each filter 408, is provided to a respective low noise amplifier (LNA) 512. Each LNA 512 amplifies the relatively low-power RF signal it receives from a respective filter 510 without significantly degrading the signals signal-to-noise ratio. The amplified RF signal that is output by each LNA 512 is provided to a respective frequency down-converter 514, the output of which is provided to a respective demodulator and DSP block 516.

Each frequency down-converter 514 receives an RF signal from an LNA 512 (which RF signal includes data from subscriber terminals STs, and thus, can be referred to as an RF data signal) and an RF signal from an LO 452 (which can be referred to as an LO signal), and uses the LO signal to down-convert the RF data signal to baseband. The baseband data signal output by each frequency down-converter 514 is provided to a respective demodulator and DSP block 516. Each demodulator and DSP block 516 demodulates the baseband data signal it receives, and performs digital signal processing thereon. Such a demodulated data signal can be used to provide data to, or request data from, a server, client and/or the like that is coupled to a network (e.g., the network 140 in FIG. 1).

A gateway (e.g., 105) can have different optics that are used for transmitting an optical feeder uplink beam (e.g., 102u) to a space segment (e.g., satellite 100), than the optics that are used for receiving an optical feeder downlink beam (e.g., 102d) from a space segment. Alternatively, a gateway can use the same optics for both transmitting an optical feeder uplink beam (e.g., 102u) to a space segment and for receiving an optical feeder downlink beam (e.g., 102d) from a space segment. More specifically, the RX optics 502 shown in FIG. 5A can be the same as the TX optics 210 shown in FIG. 2A.

Figure 5B:
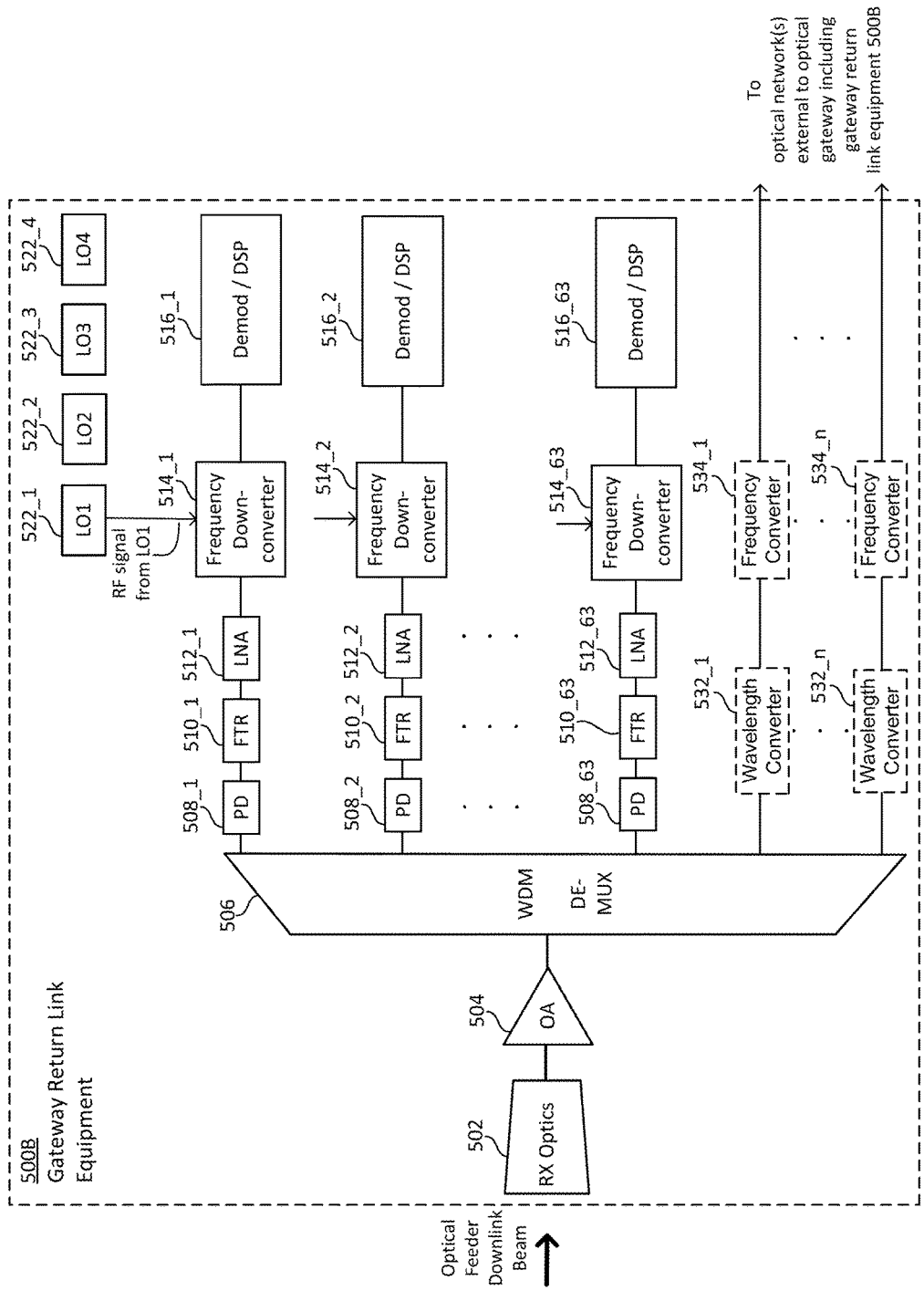
FIG. 5B depicts gateway return link equipment, according to another embodiment of the present technology.

FIG. 5B depicts gateway return link equipment 500B according to another embodiment of the present technology, wherein the gateway return link equipment 500B provides one or more optical signals to one or more optical networks that are external to the optical gateway that includes the gateway return link equipment 500B. More specifically, FIG. 5B shows that one or more of the optical signals that are output from WDM DEMUX 506 may be provided to optical fiber(s) of or attached to optical network(s) (such as, but not limited to, LAN, MAN or WAN) external to the optical gateway in which the gateway return link equipment 500B is located. This embodiment enables, for example, a payload on a satellite to communicate end-to-end with an optical network, external to the gateway, without the gateway needing to perform any demodulation or decryption of signals being provided from the payload on the satellite to a ground based optical network external to the ground based gateway. Although not specifically shown in FIG. 5B, each optical signal path that provides an optical signal from the WDM DEMUX 506 to an optical network external to the optical gateway may include a filter to remove unwanted frequencies and/or an optical amplifier (OA) to amplify the optical signal before it is provided to the external optical network. Exemplary details of such filters and OAs have been described herein, and thus, need not be repeated. Since each of the optical signals output from the WDM DEMUX 506 will have a different optical wavelength, the optical signals provided to the external optical networks will have an optical wavelength that differs from the wavelengths of the other signals output by the WDM DEMUX 506. Optionally, the wavelength of optical signals being provided to an external optical network can be converted to another optical wavelength, before the optical signal is provided to the external optical network. One or more optical wavelength converters, within or external to the optical gateway, can be used to perform such wavelength conversions. The embodiments described with reference to FIG. 5B (as well as FIG. 2D, discussed above) can provide enhanced end-to-end security, e.g., for military and/or other government data, because the gateway does not need any knowledge of the modulation and/or encryption schemes used on the optical signals that are being received from and/or forwarded to the optical network(s) that is/are external to the optical gateway.

In accordance with certain embodiments, the gateway return link equipment 500B can optionally include wavelength converters 532, wherein each of the wavelength converters 532 is configured to convert a peak optical wavelength of one of the one or more optical data signals, that is being provided to one of the one or more optical networks that are external to the ground based optical gateway (that includes the gateway return link equipment 500B), to a different peak optical wavelength before the one of the one or more optical data signals is provided to the one of the one or more optical networks that are external to the ground based optical gateway. Additionally, or alternatively, the gateway return link equipment 500B can optionally include one or more frequency converters 534, wherein each of the frequency converters 534 is configured to up-convert or down-convert a frequency of at least one of the one or more optical data signals, that is being provided to one of the one or more optical networks that are external to the ground based optical gateway (that includes the gateway return link equipment 500B), before optical data signal(s) is/are provided to the optical network(s) that are external to the ground based optical gateway. Wavelength conversion can be performed prior to the frequency conversion, as shown in FIG. 5B, or alternatively, frequency conversion can be performed prior to the wavelength conversion. For example, the relative positions of the wavelength converters 532 and the frequency converters 534 in FIG. 5B can be swapped. Additionally, optical amplification (using an optical amplifier similar to the optical amplifier 504) and/or optical filtering can be done downstream of the WDM DE-MUX 506 before one or more of the optical outputs of the WDM DE-MUX 506 is/are provided to the optical network(s) that are external to the ground based optical gateway.

Methods to Produce and Transmit an Optical Feeder Uplink Beam

Figures 6, 7:
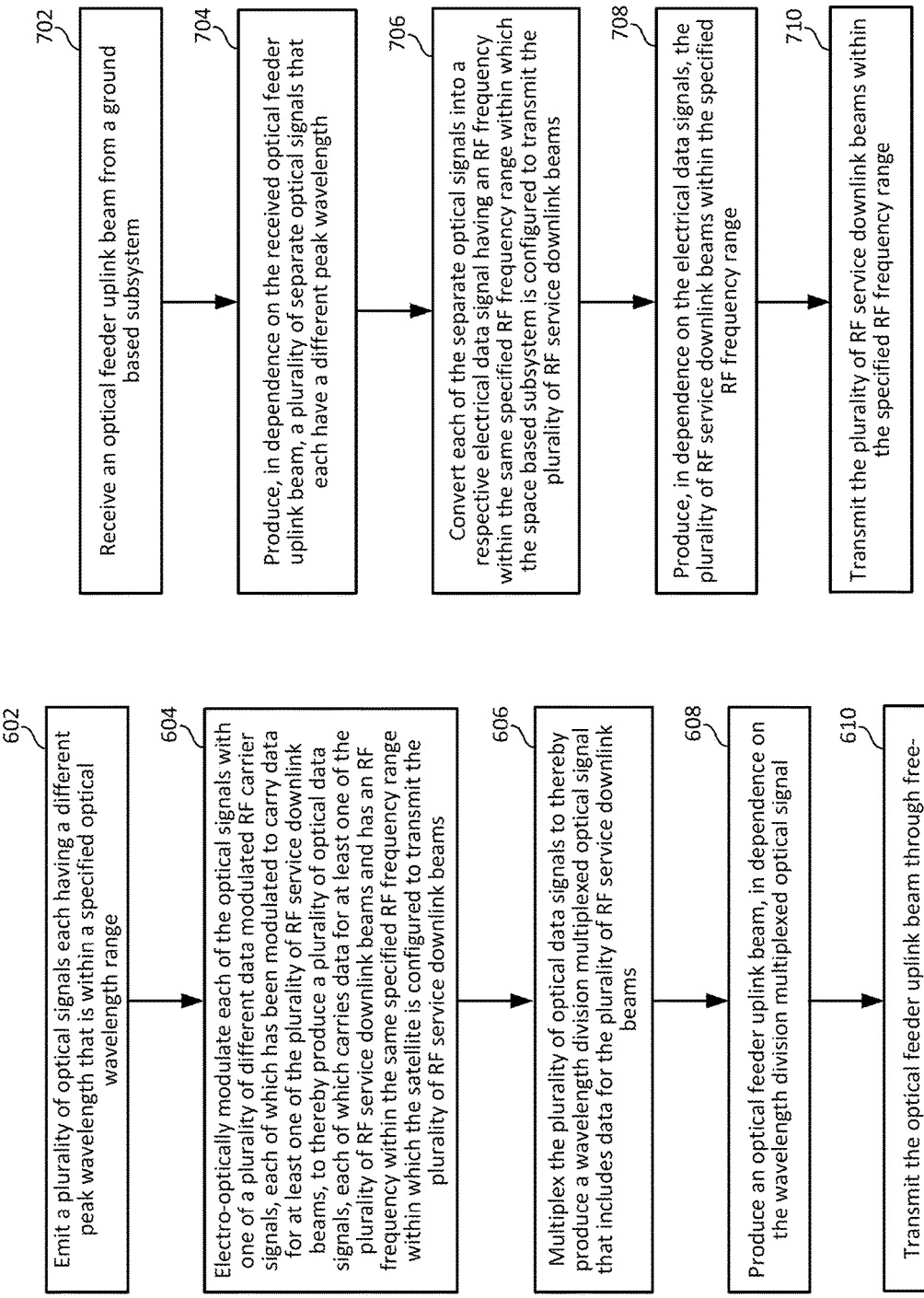
FIG. 6 is a high level flow diagram that is used to summarize methods for enabling a ground based subsystem to produce and transmit an optical feeder uplink beam to a satellite, according to certain embodiments of the present technology.
FIG. 7 is a high level flow diagram that is used to summarize methods for enabling a space based subsystem of a satellite to produce and transmit a plurality of RF service downlink beams within a specified RF frequency range to service terminals, according to certain embodiments of the present technology.

FIG. 6 will now be used to summarize methods for enabling a ground based subsystem (e.g., the gateway forward link equipment 200 in FIG. 2A) to produce and transmit an optical feeder uplink beam (e.g., 102u in FIG. 1) to a satellite (e.g., 100 in FIG. 1) that is configured to receive the optical feeder uplink beam and in dependence thereon produce and transmit a plurality of RF service downlink beams (e.g., 106d, 110d, 114d and 118d in FIG. 1) within a specified RF frequency range to service terminals STs. In accordance with certain embodiments, the specified RF frequency range within which the satellite is configured to produce and transmit a plurality of RF service downlink beams is a downlink portion of the Ka band. The downlink portion of the Ka band can be from 17.7 GHz to 20.2 GHz, and thus, have a bandwidth of 2.5 GHz. Alternatively, the downlink portion of the Ka band can be from 17.3 GHz to 20.2 GHz, and thus, have a bandwidth of 2.9 GHz. These are just a few examples, which are not intended to be all encompassing.

Referring to FIG. 6, step 602 involves emitting a plurality of optical signals (e.g., two hundred and fifty optical signals) each having a different peak wavelength that is within a specified optical wavelength range. Step 602 can be performed using the lasers 202 discussed above with reference to FIG. 2A. The specified optical wavelength range may be within the C-band and/or L-band optical wavelengths, as explained above. Further, as explained above, the specified optical wavelength range can be a contiguous optical wavelength range within an IR spectrum, or a non-contiguous optical wavelength range within the IR spectrum. As noted above, visible and/or other optical wavelengths may alternatively be used.

Step 604 involves electro-optically modulating each of the optical signals with one of a plurality of different data modulated RF carrier signals, each of which has been modulated to carry data for at least one of the plurality of RF service downlink beams, to thereby produce a plurality of optical data signals, each of which carries data for at least one of the plurality of RF service downlink beams and has an RF frequency within the same specified RF frequency range within which the satellite is configured to transmit the plurality of RF service downlink beams. Step 604 can be performed using the EOMs 204 discussed above with reference to FIG. 2A.

Step 606 involves multiplexing the plurality of optical data signals to thereby produce a wavelength division multiplexed optical signal that includes data for the plurality of RF service downlink beams. Step 606 can be performed using the WDM MUX 206 discussed above with reference to FIG. 2A.

Step 608 involves producing an optical feeder uplink beam, in dependence on the wavelength division multiplexed optical signal, and step 610 involves transmitting the optical feeder uplink beam through free-space to the satellite. Steps 608 and 610 can be performed by the transmitter optics 210 discussed above with reference to FIG. 2A. The optical amplifier (OA) 208 discussed above with reference to FIG. 2A can also be used to perform step 608.

Beneficially, because the RF frequencies of the optical data signals produced during the electro-optically modulating step 604 are within the same specified RF frequency range within which the satellite is configured to transmit the plurality of RF service downlink beams, there is an elimination of any need for the satellite to perform any frequency conversions when producing the plurality of RF service downlink beams in dependence on the optical feeder uplink beam. In other words, the space segment forward link equipment 300 in FIG. 3 beneficially does not need any frequency down-converters or any other type of frequency conversion equipment.

A method can also include receiving a plurality of RF carrier signals each of which has a different RF frequency within the same specified RF frequency range within which the satellite is configured to transmit the plurality of RF service downlink beams, and producing the modulated RF signals, which are electro-optically modulated with the optical signals, in dependence on the plurality of RF carrier signals. The RF carrier signals can be produce by one or more local oscillators 222 discussed above with reference to FIG. 2B. The modulated RF signals can be produced by RFMs 224 discussed above with reference to FIG. 2B.

Further details of the methods described with reference to FIG. 6 can be appreciated from the above description of FIGS. 1-5.

Methods to Produce and Transmit RF Service Downlink Beams

FIG. 7 will now be used to summarize methods for enabling a space based subsystem (e.g., the space segment forward link equipment 300 of FIG. 3) of a satellite (e.g., 100) to produce and transmit a plurality of RF service downlink beams (e.g., 106d, 110d, 114d and 118d in FIG. 1) within a specified RF frequency range to service terminals STs. In accordance with certain embodiments, the specified RF frequency range within which the satellite is configured to produce and transmit a plurality of RF service downlink beams is a downlink portion of the Ka band. The downlink portion of the Ka band can be from 17.7 GHz to 20.2 GHz, and thus, have a bandwidth of 2.5 GHz. Alternatively, the downlink portion of the Ka band can be from 17.3 GHz to 20.2 GHz, and thus, have a bandwidth of 2.9 GHz. These are just a few examples, which are not intended to be all encompassing.

Referring to FIG. 7, step 702 involves receiving an optical feeder uplink beam (e.g., 102u) from a ground based subsystem (e.g., the gateway forward link equipment 200 in FIG. 2A). Step 702 can be performed by the receiver optics 302 described above with reference to FIG. 3.

Step 704 involves producing, in dependence on the received optical feeder uplink beam, a plurality of (e.g., two hundred and fifty) separate optical signals that each have a different peak wavelength. Step 704 can be performed by the WDM-DEMUX 306 described above with reference to FIG. 3.

Step 706 involves converting each of the separate optical signals into a respective electrical data signal having an RF frequency within the same specified RF frequency range within which the space based subsystem is configured to transmit the plurality of RF service downlink beams. Step 706 can be performed by the PDs 308 discussed above with reference to FIG. 3.

Step 708 involves producing, in dependence on the electrical data signals, the plurality of RF service downlink beams within the specified RF frequency range. Step 708 can be performed, e.g., by the filters 310, LNAs 312, splitters 314, HPAs 318, HFs 320, OMJs 324, and feed horns 326 discussed above with reference to FIG. 3.

Step 710 involves transmitting the plurality of RF service downlink beams within the specified RF frequency range. Step 710 can be performed by the feed horns 326 discussed above with reference to FIG. 3, and more generally, antenna systems.

Beneficially, because the RF frequencies of the electrical data signals resulting from the converting step 706 are within the same specified RF frequency range within which the space based subsystem is configured to transmit the plurality of RF service downlink beams, there is an elimination of any need for the space based subsystem (e.g., the space segment forward link equipment 300 in FIG. 3) to perform any frequency conversions when producing the plurality of RF service downlink beams in dependence on the optical feeder uplink beam. In other words, beneficially the space segment forward link equipment 300 in FIG. 3 does not need any frequency down-converters or any other type of frequency conversion equipment. Further details of the methods described with reference to FIG. 7 can be appreciated from the above description of FIGS. 1-5.

Methods to Produce and Transmit Optical Feeder Downlink Beams

Figure 8:
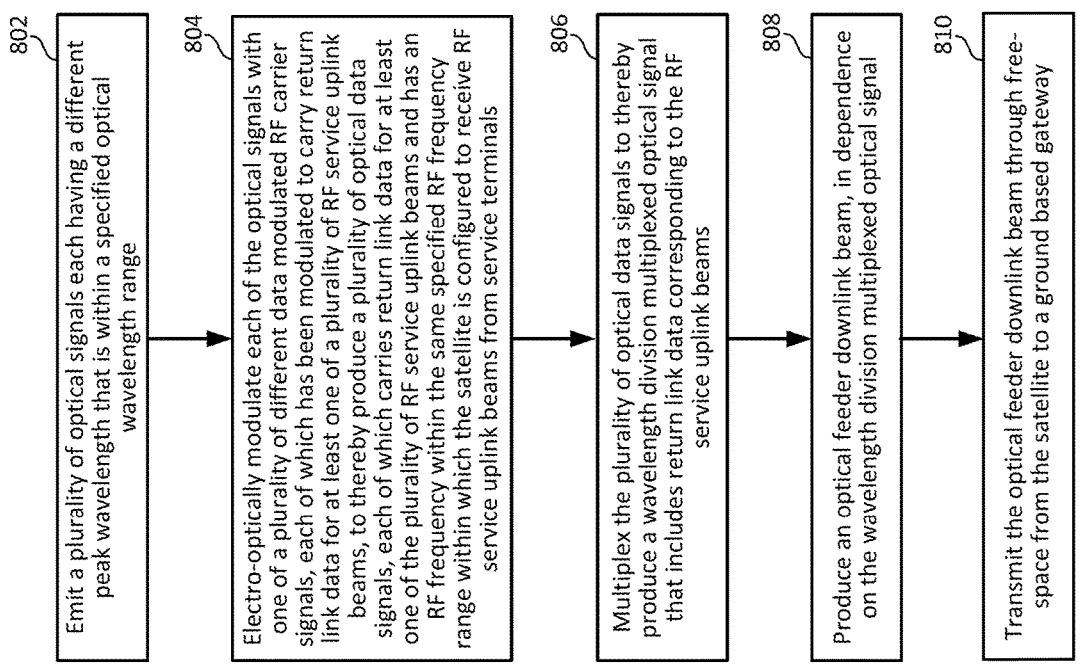
FIG. 8 is a high level flow diagram that is used to summarize methods for enabling a space based subsystem of a satellite to produce and transmit an optical feeder downlink beam, according to certain embodiments of the present technology.

FIG. 8 is a high level flow diagram that is used to summarize methods for enabling a space based subsystem of a satellite to produce and transmit an optical feeder downlink beam (e.g., 102d) within a specified optical wavelength range, according to certain embodiments of the present technology. More specifically, certain methods described with reference to FIG. 8 enable a space based subsystem of a satellite (e.g., 100) to produce and transmit an optical feeder downlink beam in dependence on RF service uplink beams received from service terminals within a specified RF frequency range. The specified optical wavelength range may be within the C-band and/or L-band optical wavelengths, but are not limited thereto. Further, as explained above, the specified optical wavelength range can be a contiguous optical wavelength range within an IR spectrum, or a non-contiguous optical wavelength range within the IR spectrum. As noted above, visible and/or other optical wavelengths may alternatively be used.

Referring to FIG. 8, step 802 involves emitting a plurality of optical signals (e.g., sixty three optical signal) each having a different peak wavelength that is within a specified optical wavelength range. Step 802 can be performed by the lasers 432 discussed above with reference to FIG. 4D.

Step 804 involves electro-optically modulating each of the optical signals with one of a plurality of different data modulated RF carrier signals, each of which has been modulated to carry return link data for at least one of a plurality of RF service uplink beams, to thereby produce a plurality of optical data signals, each of which carries return link data for at least one of the plurality of RF service uplink beams and has an RF frequency within the same specified RF frequency range within which the satellite is configured to receive RF service uplink beams from service terminals. Step 804 can be performed by the EOMs 434 discussed above with reference to FIG. 4D.

Step 806 involves multiplexing the plurality of optical data signals to thereby produce a wavelength division multiplexed optical signal that includes return link data corresponding to the RF service uplink beams. Step 806 can be performed by the WDM multiplexer 436 discussed above with reference to FIG. 4D.

Step 808 involves producing an optical feeder downlink beam, in dependence on the wavelength division multiplexed optical signal, and step 810 involves transmitting the optical feeder downlink beam through free-space from the satellite to a ground based gateway. Steps 808 and 810 can be performed by the transmitter optics 440 discussed above with reference to FIG. 4D.

In accordance with certain embodiments, where RF frequencies of the optical data signals produced during the electro-optically modulating are within the same specified RF frequency range within which the satellite is configured to receive RF service uplink beams from service terminals, there is an elimination of any need for the satellite to perform any frequency conversions when producing the optical feeder downlink beam in dependence on the RF service uplink beams. In other words, in such embodiments, the space segment return link equipment beneficially does not need any frequency down-converters or any other type of frequency conversion equipment. The space segment return link equipment 400C (in FIG. 4C) and 400D (in FIG. 4D), for example, can be used to producing an optical feeder downlink beam without the need for the satellite to perform any frequency conversions. In accordance with certain embodiments, the specified RF frequency range within which the satellite is configured to receive RF service uplink beams from service terminals is an uplink portion of the Ka band. The uplink portion of the Ka band can be from 29.5-30 GHz, and thus, have a bandwidth of 0.5 GHz. This is just an example, which are not intended to be all encompassing.

A method can also include receiving a plurality of RF service uplink beams, and producing the plurality of data modulated RF carrier signals that have been modulated to carry the return link data corresponding to the RF service uplink beams received from the service terminals. Further details of the methods described with reference to FIG. 8 can be appreciated from the above description of FIGS. 1-5.

Space Segment Forward Inter-Satellite Link Equipment

Figure 9A:
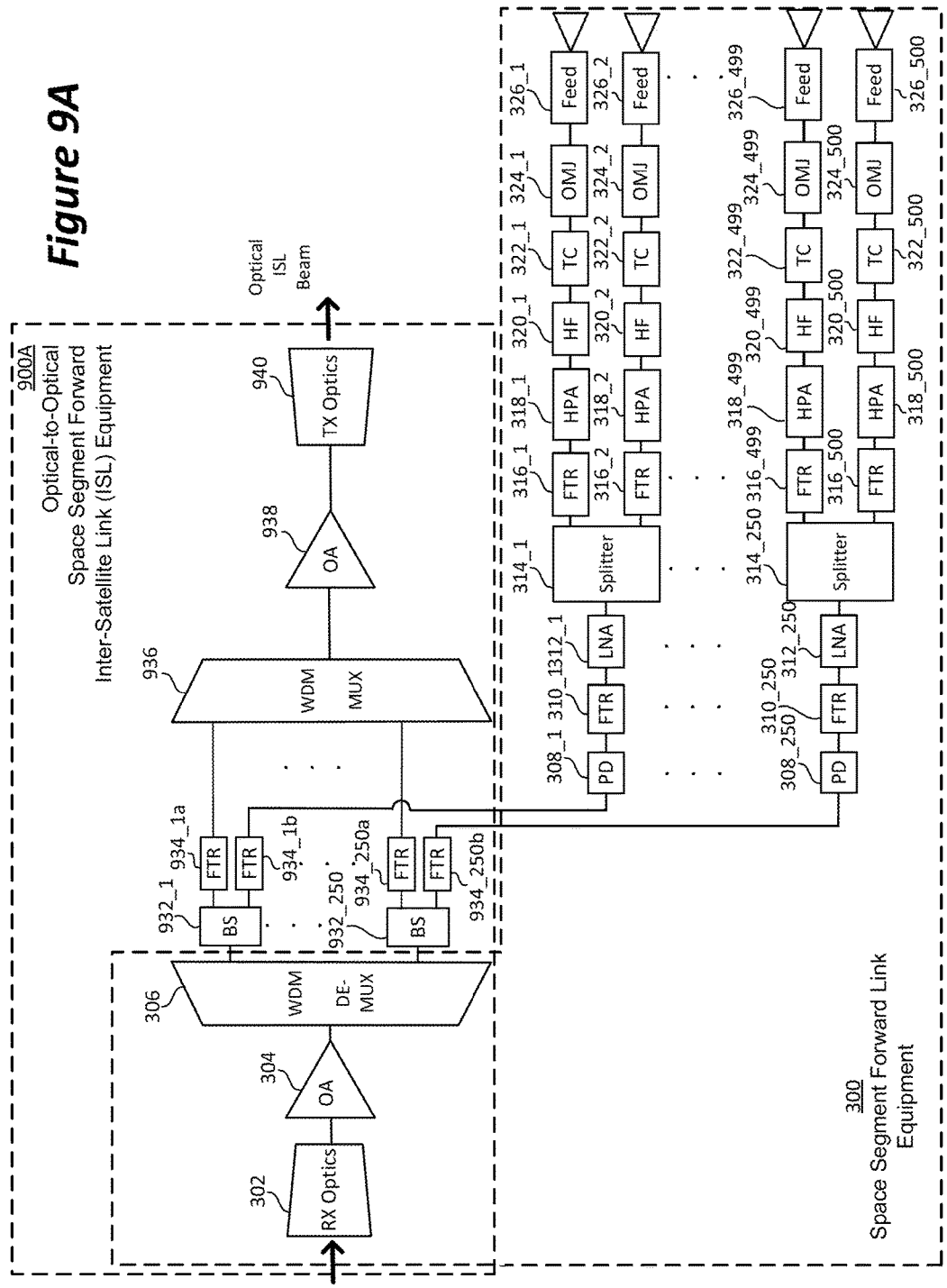
FIG. 9A depicts space segment inter-satellite link (ISL) equipment and space segment forward link equipment, according to an embodiment of the present technology.

FIG. 9A will now be used to describe a portion of space segment forward inter-satellite link (ISL) equipment 900A, according to an embodiment of the present technology. Such space segment forward ISL equipment 900A, which can also be referred to as a satellite forward ISL subsystem 900A, or more generally, as an optical communication subsystem, can be configured to receive an optical feeder uplink beam that is transmitted from the ground based optical gateway subsystem 200A or 200D (in FIG. 2A or 2D) to the satellite (e.g., 100) that is carrying the space segment forward ISL equipment 900. Alternatively, or additionally, the space segment forward ISL equipment 900A can be configured to receive an optical ISL beam that is transmitted from another satellite (e.g., 150). The space segment forward ISL equipment 900A can also configured to act as an optical repeater to pass on an optical beam (or a portion thereof) that it receives (from the ground based optical gateway subsystem 200A or 200D, or from another satellite) to a further satellite (e.g., 160) as an optical ISL beam. Both the space segment forward link equipment 300, described above with reference to FIG. 3, and the space segment forward ISL equipment 900A, which will be described below with reference to FIG. 9A, can be included on a same satellite (e.g., 100). This can enable the satellite (e.g., 100) to send some data that it receives (e.g., from the gateway 105) to some service terminals STs that are within a region (e.g., 108) that is illuminated by a service downlink beam (e.g., 106d) of the satellite, and send other data that it receives (from the same gateway 105) to another satellite (e.g., 150) so that the other satellite can send the other data to other service terminal STs that are within another region that is illuminated by a service downlink beam of the other satellite. In such an embodiment, the space segment forward ISL equipment 900A can share certain elements with the space segment forward link equipment 300, as will be appreciated from the description of FIG. 9A. The elements that are shared are labeled the same as they were in FIG. 3.

Referring to FIG. 9A, the space segment forward ISL equipment 900A is shown as including receiver optics 302, an optical amplifier (OA) 304, a wavelength-division multiplexing (WDM) demultiplexer (DEMUX) 306, two hundred and fifty beam splitters (BS) 932_1 to 932_250, a wavelength-division multiplexing (WDM) multiplexer (MUX) 936, an optical amplifier (OA) 938 and transmitter optics 940.

The receiver optics 302 (which can include optical elements such as mirrors, reflectors, filters and/or the like) can receive an optical feeder uplink beam (e.g., 102u) that is transmitted through free-space to the satellite by the ground based optical gateway forward link subsystem 200A or 200D, and provides the received optical feeder uplink beam (e.g., via an optical fiber) to the OA 304. A gimbal, and/or the like, can be used to control the steering of the receiver optics 302. When the optical feeder uplink beam reaches the satellite, the power of the optical feeder uplink beam is significantly attenuated compared to when it was transmitted by the ground based optical gateway subsystem (e.g., 200A or 200D). Accordingly, the OA 304 is used to amplify the received optical feeder uplink beam before it is provided to the WDM DEMUX 306. The OA 304 can be, e.g., an erbium-doped fiber amplifier (EDFA), but is not limited thereto. The output of the OA 304 can be referred to as an optically amplified received optical feeder uplink signal.

The same receiver optics 302, or another instance of the receiver optics, can receive an optical ISL beam that is transmitted by another satellite (e.g., 150) through free-space to the satellite (e.g., 100), and provides the received optical ISL beam (e.g., via an optical fiber) to the OA 304, or another instance of the OA. When an optical ISL beam that originated from another satellite reaches the satellite, the power of the optical ISL beam is significantly attenuated compared to when it was transmitted by the other satellite. Accordingly, the OA 304 can be used to amplify the received optical ISL beam before it is provided to the WDM DEMUX 306. In this case, the output of the OA 304 can be referred to as an optically amplified received optical ISL signal.

The WDM DEMUX 306 demultiplexes (i.e., separates) the received optical feeder uplink beam (or the received optical ISL beam), after it has been optically amplified, into two hundred and fifty separate optical data signals, each of which has a different peak optical wavelength, and each of which is provided to a separate beam splitter (BS) 932. Each BS 932 splits the optical data signal it receives into two optical data signals, which include the same data, but may have different power, depending upon how the BS is implemented. Unless stated otherwise, it will be assumed that each BS 932 splits the optical data signal it receives from the WDM MUX 306 into two optical data signals having the same content and power (i.e., two substantially identical optical data signals). The two optical data signals that are output by each BS 932 can be provided to an optional pair of optical filters (FTR) 934. For example, one of the optical signals output by the BS 932_1 can be provided to a filter 934_1a, and the other optical signal output by the BS 932_1 can be provided to the filter 934_1b. The two filters that filter the two optical data signals output by the same BS 932 can filter the two optical data signals in the same manner, or in different manners, depending upon implementation. It is also possible that one or both of the optical data signals that are output by a BS 932 is/are not filtered before being passed onto the next element in its optical signal path. For example, it is possible that one of the optical data signals output by the BS 932_1 is provided directly to the WDM MUX 936, and/or that the other one of the optical data signals output by the BS 932_1 is provided directly to the PD 308_1. It is also possible that additional elements not specifically shown can be included in the optical signal paths.

The two hundred and fifty optical data signals that are provided by the two hundred and fifty beam splitters 932_1 to 932_250 to the WDM MUX 936 (which signals, as noted above, may or may not first be filtered by a respective one of the filters 934) are multiplexed (i.e., combined) by the WDM MUX 936 onto a single optical fiber, with each of the two hundred and fifty optical data signals being carried at the same time on its own separate optical wavelength within a specified contiguous wavelength range (e.g., from 1510 nm to 1560 nm) or a specified non-contiguous wavelength range (e.g., from 1510 nm to 1534.8 nm and from 1540.2 nm to 1564.8 nm). However, wider or narrow wavelength ranges, within the infrared or other parts of the optical spectrum, may alternatively be used. For example, it would also be possible to utilize a contiguous or non-contiguous wavelength range within the 400 nm-700 nm visible spectrum.

The OA 938 amplifies the wavelength division multiplexed optical signal so that the wavelength division multiplexed optical signal has sufficient power to enable transmission thereof from the satellite (e.g., 100) in free-space to another satellite (e.g., 150). The OA 938 can be an erbium-doped fiber amplifier (EDFA), but is not limited thereto. The output of the OA 938 can be referred to as an optically amplified wavelength division multiplexed optical ISL signal.

The optically amplified wavelength division multiplexed optical ISL signal, which is output by the OA 938, is provided (e.g., via an optical fiber) to the transmitter optics 940. The transmitter optics 940, which can also be referred to as a telescope, can includes optical elements such as lenses, mirrors, reflectors, filters and/or the like. The transmitter optics 940 outputs a collimated optical ISL beam that is aimed at another satellite. A gimbal, and/or the like, can be used to control the steering of the transmitter optics 940. In accordance with an embodiment, the collimated optical ISL beam has an aperture of about 40 cm, and a half beam divergence of about 0.0000012 radians, wherein the term "about" as used herein means +/−10 percent of a specified value. The use of other apertures and half beam divergence values are also within the scope of the embodiments described herein. The collimated optical ISL beam, which is output by the transmitter optics 940, is transmitted in free-space to receiver optics of another satellite.

Still referring to FIG. 9A, the two hundred and fifty beam splitters 932_1 to 932_250 also provide two hundred and fifty optical data signals to two hundred and fifty photodetectors (PDs) 308_1 to 308_250, which are part of the space segment forward link equipment 300. These two hundred and fifty optical data signals may be filtered by the optional optical filters 934_1b to 934_250b before being provided to the PDs 308_1 to 308_250. In a similar manner, as was discussed above with reference to FIG. 3, each PD 308 converts the optical signal it receives to a respective RF electrical signal. The RF electrical signal produced by each PD 308 is provided to a respective filter (FTR) 310 (e.g., a bandpass filter) to remove unwanted frequency components and/or enhance desired frequency components. For an example, each filter 310 can pass frequencies within the range of 17.7-20.2 GHz, or within the range of 17.3-20.2 GHz, but are not limited thereto. The filtered RF electrical signal, which is output by each filter 310, is provided to a respective low noise amplifier (LNA) 312. Each LNA 312 amplifies the relatively low-power RF signal it receives from a respective filter 310 without significantly degrading the signals signal-to-noise ratio. The amplified RF signal that is output by each LNA 312 is provided to a respective splitter 314.

Each splitter 314 splits the amplified RF signal it receives into two copies, each of which has half the power of the amplified RF signal that is provided to the input of the splitter 314. Each splitter 314 can be implemented by a hybrid, but is not limited thereto. In accordance with certain embodiments of the present technology, one of the RF signals that is output by a splitter 314 is used to produce one service beam, and the other RF signal that is output by the same splitter 314 is used to produce another service beam. Each of the copies of the RF signal that is output by the splitter 314 is provided to a respective filter 316. For example, the splitter 314_1 provides one copy of the RF signal it receives to the filter 316_1, and provides another copy of the RF signal it receives to the filter 316_2. In accordance with certain embodiments, the pair of filters 316 that receive RF signals from the same splitter 314 have pass bands that differ from one another. For example, the filter 316_1 may have a passband of 17.7-18.95 GHz and the filter 316_2 may have a passband of 18.95-20.2 GHz. For another example, the filter 316_1 may have a passband of 17.3-18.75 GHz and the filter 316_2 may have a passband of 18.75-20.2 GHz. This enables each splitter 314 and pair of filters 316, which are fed by the splitter 314, to separate a signal received by the splitter into two separate RF signals corresponding to two separate user beams. The use of other passbands are possible and within the scope of embodiments of the present technology.

Each HPA 318 amplifies the RF signal it receives so that the RF signal has sufficient power to enable transmission thereof from the satellite 100 in space to a service terminal ST, which may be on the ground. Each HPA 318 can be, e.g., a liner traveling wave tube high power amplifier, but is not limited thereto. The signal that is output by each of the HPAs 318 can be referred to as an amplified RF signal. Each HF 320 is used to reduce and preferably remove any distortion in the amplified RF signal that was caused by a respective HPA 318. Each HF 320 can be, e.g., a waveguide cavity filter, but is not limited thereto. Each TC 322 can be used for power monitoring, payload testing and/or performing calibrations based on signals passing therethrough. Each OMJ 324 adds either right hand circular polarization (RHCP) or left hand circular polarization (LHCP) to the RF signal that is passed through the OMJ. This allows for color reuse frequency band allocation, wherein each color represents a unique combination of a frequency band and an antenna polarization. This way a pair of feeder beams that illuminate adjacent regions can utilize a same RF frequency band, so long as they have orthogonal polarizations. Each feed horn 326 converts the RF signal it receives, from a respective OMJ 324, to radio waves and feeds them to the rest of the antenna system (not shown) to focus the signal into a service downlink beam. A feed horn 326 and the rest of an antenna can be collectively referred to as the antenna. In other words, an antenna, as the term is used herein, can include a feed horn. All or some of the feed horns 326 can share a common reflector. Such reflector(s) is/are not shown in the Figures, to simply the Figures.

Figure 9B:
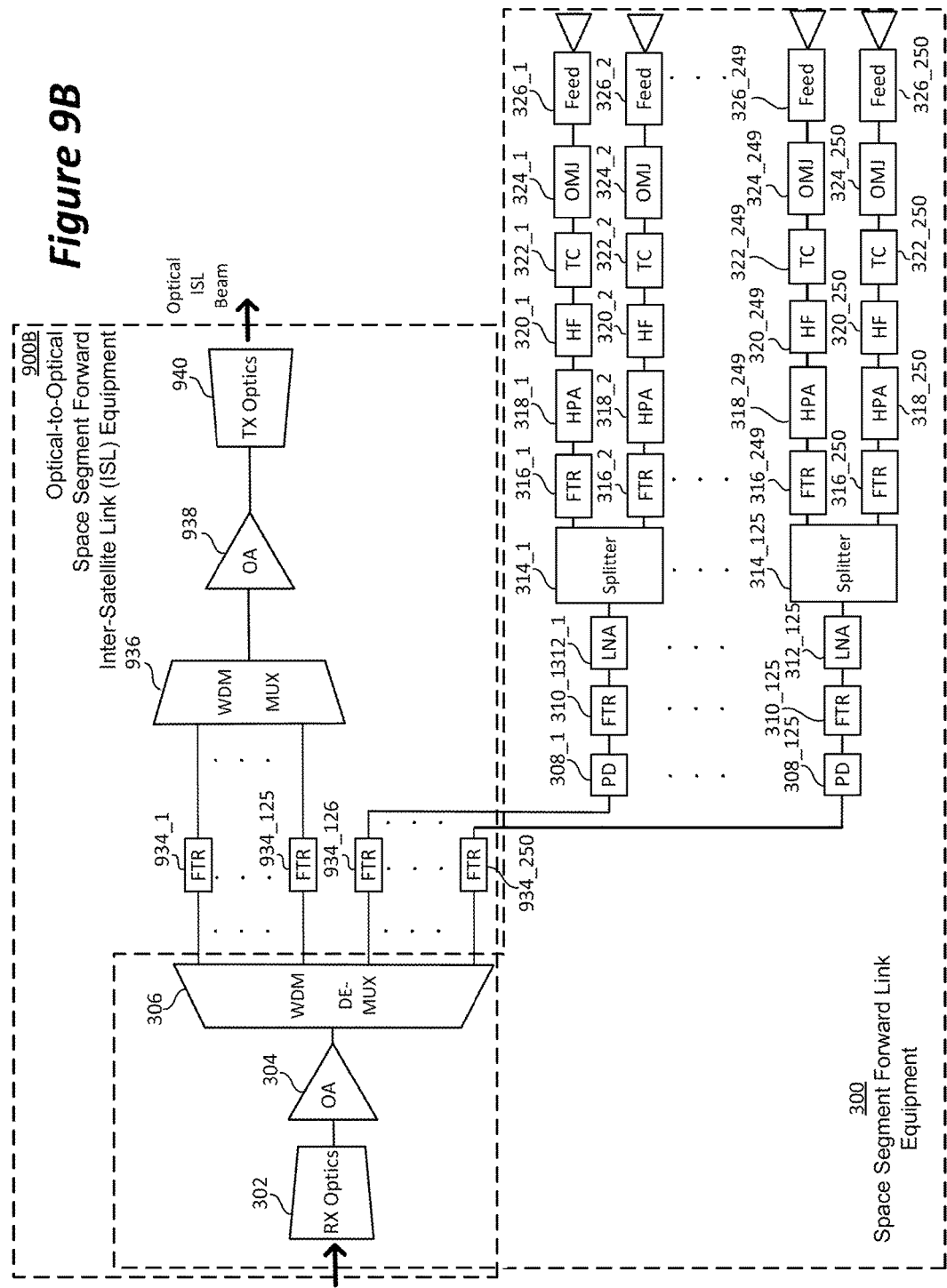
FIG. 9B depicts space segment inter-satellite link (ISL) equipment and space segment forward link equipment, according to another embodiment of the present technology.

FIG. 9B shows a portion of space segment forward inter-satellite link (ISL) equipment 900B, according to an alternative embodiment of the present technology. Such space segment forward ISL equipment 900B, which can also be referred to as a satellite forward ISL subsystem 900B, or more generally, as an optical communication subsystem, can be configured to receive an optical feeder uplink beam that is transmitted from the ground based optical gateway subsystem 200A or 200D (in FIG. 2A or 2D) to the satellite (e.g., 100) that is carrying the space segment forward ISL equipment 900. Alternatively, or additionally, the space segment forward ISL equipment 900B can be configured to receive an optical ISL beam that is transmitted from another satellite (e.g., 150). The space segment forward ISL equipment 900B can also configured to act as an optical repeater to pass on an optical beam (or a portion thereof) that it receives (from the ground based optical gateway subsystem 200A or 200D, or from another satellite) to a further satellite (e.g., 160) as an optical ISL beam. Both the space segment forward link equipment 300, described above with reference to FIG. 3, and the space segment forward ISL equipment 900B, which will be described below with reference to FIG. 9B, can be included on a same satellite (e.g., 100). This can enable the satellite (e.g., 100) to send some data that it receives (e.g., from the gateway 105) to some service terminals STs that are within a region (e.g., 108) that is illuminated by a service downlink beam (e.g., 106*d*) of the satellite, and send other data that it receives (from the same gateway 105) to another satellite (e.g., 150) so that the other satellite can send the other data to other service terminal STs that are within another region that is illuminated by a service downlink beam of the other satellite. In such an embodiment, the space segment forward ISL equipment 900B can share certain elements with the space segment forward link equipment 300, as will be appreciated from the description of FIG. 9B. The elements that are shared are labeled the same as they were in FIG. 3. The elements that are the same in FIG. 9B as they are in FIG. 9A are labeled the same, and need not be described again.

In the embodiment of FIG. 9A, beam slitters 932 were used to split the two hundred and fifty separate optical data signals that are output by the WDM demultiplexer 306 (with each of the optical data signals having a different peak optical wavelength) into two optical data signals, which include the same data (and share the same peak optical wavelength). This way, the same data can be included in RF downlink service beams (produced by the space segment forward link equipment 300 of the satellite) as well as be included in an optical ISL beam (produced by optical-to-optical space segment ISL equipment 900A) and transmitted to another satellite (which may use the optical ISL beam to produce its own RF downlink service beams). In the embodiment of FIG. 9B, the beam slitters 932 are not included. Rather, a first subset of the two hundred and fifty separate optical data signals that are output by the WDM demultiplexer 306 are used to produce an optical ISL beam that is transmitted to another satellite (which may use the optical ISL beam to produce its own RF downlink service beams), and a second subset of the two hundred and fifty separate optical data signals that are output by the WDM demultiplexer 306 are used by the satellite to produce its own RF downlink service beams. In FIG. 9B, the first subset includes one hundred and twenty five optical data signals that are output by the WDM demultiplexer 306, and the second subset includes the other one hundred and twenty five optical data signals that are output by the WDM demultiplexer 306. It is also possible that the two hundred and fifty separate optical data signals that are output by the WDM demultiplexer 306 are not equally divided among the first and second subsets. In other words, one of the first and second subsets can include a greater number of optical data signals than the other. It is also possible that the WDM MUX 936 can be eliminated (or at least removed from the optical path) if only one of the optical data signals that are output by the WDM demultiplexer 306 is to be included in an optical ISL beam that is to be transmitted to another satellite. In other words, it is possible that an optical signal that is output by the WDM demultiplexer 306 is filtered and amplified (but not multiplexed) before it is provided to the transmitter optics 940 and thereby included in an optical ISL that is transmitted to another satellite.

In the embodiments of FIGS. 9A and 9B, each optical ISL beams is an analog-over free-space optical signal, which leads to an elegant architecture for a satellite repeater, whereby all frequency down-conversion in the forward link is eliminated. An advantage of this approach, especially for HTS satellites, is that it eliminates the need for very high speed Analog-to-Digital Converters (ADCs) and Digital to Analog Converters (DACs) on the satellites. Further, this approach allows the aggregation of multiple user links but does not require extra hardware associated with an onboard demodulator and remodulator, and thus reduces the mass, power and cost of the satellite, perhaps making the difference between being able to launch or not being able to launch the satellite.

Figure 9C:
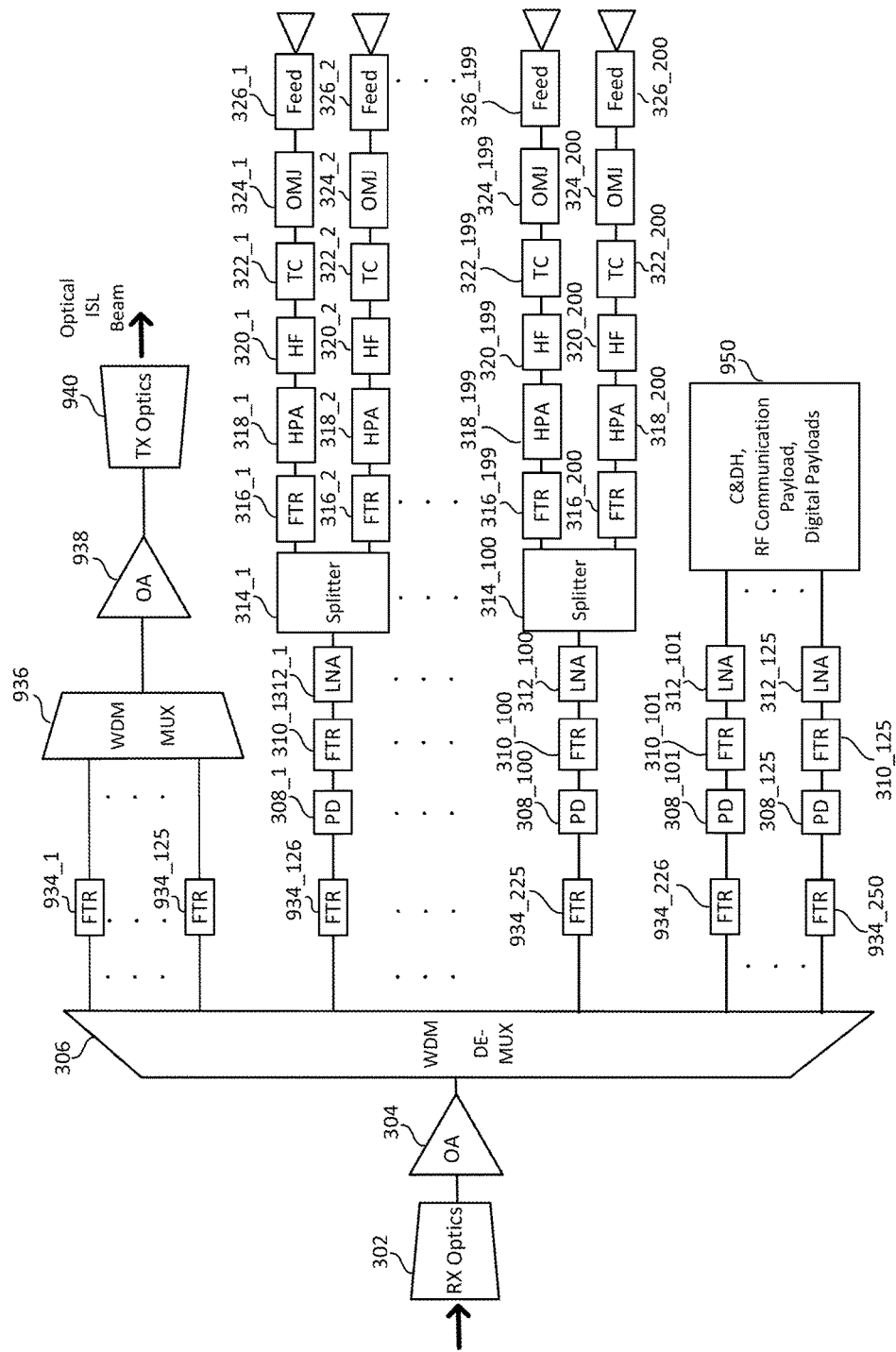
FIG. 9C depicts space segment inter-satellite link (ISL) equipment, space segment forward link equipment, and space segment equipment that can consume one or more of the optical signals, according to an embodiment of the present technology.

More generally, in accordance with specific embodiments, the uplink and ISL communication signals are modulated at transmit (forward) RF frequencies that are eventually used to transmit service downlink beams to service terminals STs, and thus, no frequency conversion in the forward link is required on the satellite, thereby further simplifying the payload design. By contrast, previously envisioned free-space optical spacecraft architectures proposed demodulation of the optical signal, followed by routing to user link pathways and remodulation of the signal on user link (also known as service link) RF frequencies. FIG. 9C shows that one or more of the optical signals that is/are output by the WDM DEMUX 306 on a satellite can be provided to and consumed by equipment that is located on the satellite, which equipment is generically represented by block 950. Examples of such equipment include a command and data handling (C&DH) system, an RF communication payload, and one or more digital payloads. If the equipment 950 is designed to accept optical signals, one or more optical signals output by the WDM DEMUX 306 can be provided directly to the equipment 950. Alternatively, optical signals can be converted to electrical signals using PDs 308. The optical signals can be filtered prior to being provided to the PDs 308, and the electrical signals can be filtered and/or amplified downstream of the PDs 308, as shown in FIG. 9C. Exemplary types of digital payloads include imaging and/or weather payloads, but are not limited thereto. A command and data handling system, which can also be referred to as command and data handling equipment, can be used to carry out commands that are sent from a ground based gateway to the satellite. Such commands can be used to control the propulsion system of the satellite, steer antennas on the satellite, steer transmitter and/or receiver optics on the satellite, but are not limited thereto. Where the satellite includes an imaging payload, commands that are sent from a ground based gateway to the satellite can instruct imaging equipment to obtain images, steer imaging equipment, downlink image data, and/or the like.

Figure 9D:
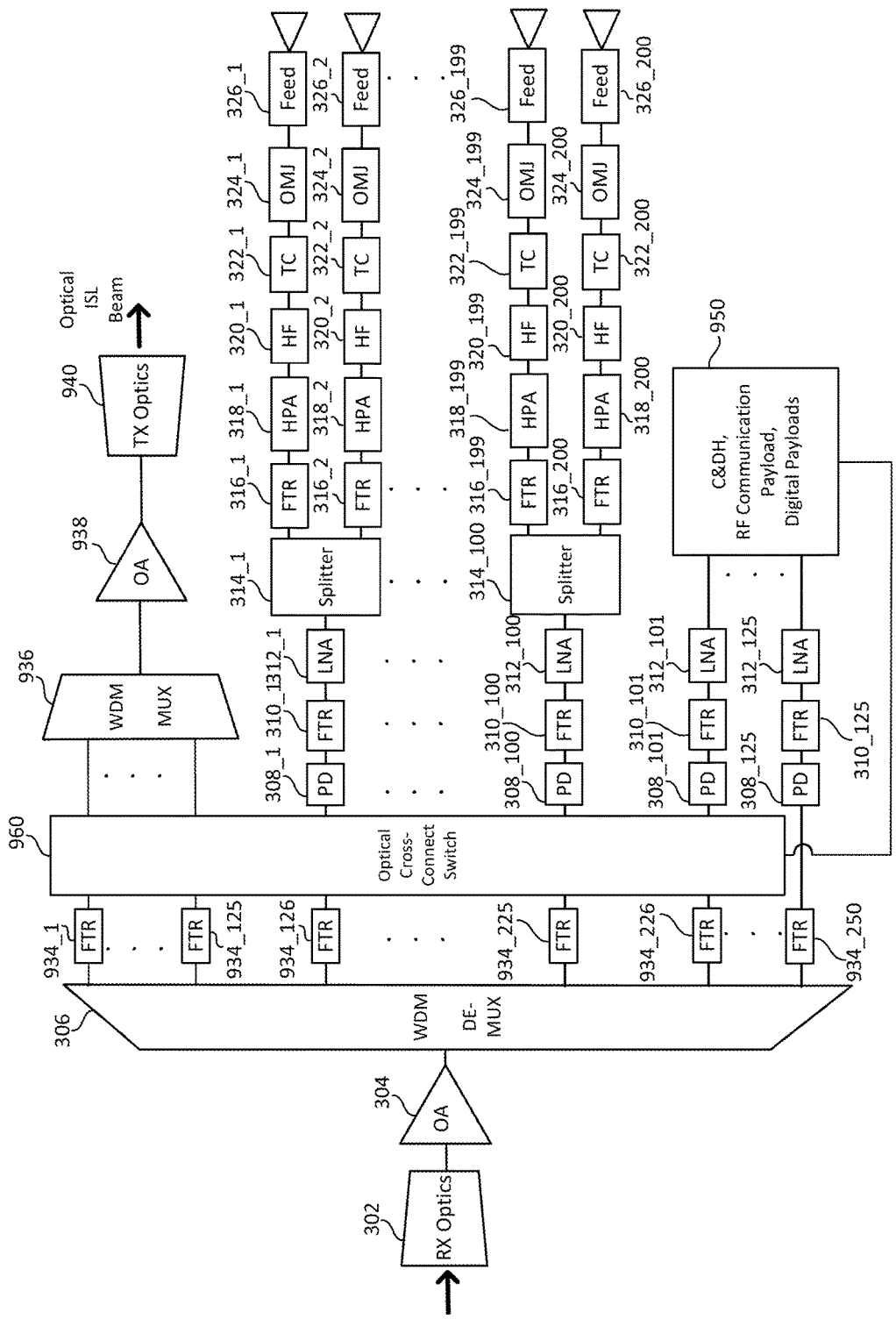
FIG. 9D depicts space segment inter-satellite link (ISL) equipment, space segment forward link equipment, and space segment equipment that can consume one or more of the optical signals, according to another embodiment of the present technology.

In the embodiment shown in FIG. 9C, the optical signals output by the WDM DEMUX 306 are shows as being provided to specific predetermined signal paths. For example, certain optical signals are shown as being provided to the WDM MUX 936 and being included in an optical ISL beam, other optical signals are shown as being converted to electrical signals that are used to produce service downlink beams that are transmitted to service terminals STs, and still other optical signals are shown as being converted to electrical signals that are provided to block 950, which can include, e.g., a command and data handling system, an RF communication payload, and/or one or more digital payloads. In alternative embodiments, such as the one shown in FIG. 9D, flexibility is increased by including an optical cross-connect switch 960 downstream of the WDM DEMUX 306. The optical cross-connect switch 960 can be used to selectively switch the optical signals output by the WDM DEMUX 306 among the various signal paths, as desired, e.g., in accordance with commands provided by the ground based gateway. In FIG. 9D the optical cross-connect switch 960 is shown as being downstream from some of the filters 934, but can alternatively be located upstream of some of the filters, e.g., between the WDM DEMUX 306 and the filters 934. Alternatively, or additionally, a digital cross-connect switch can be located downstream of the PDs 308 and used to selectively switch electrical signals (produced by the PDs 308 based on the optical signals output by the WDM DEMUX 306) amount the various signal paths, as desired, e.g., in accordance with commands provided by the ground based gateway. In accordance with an embodiment, all of the optical signals output by the WDM DEMUX 306 (before or after being filtered by a respective filter 934) are provided to the optical cross-connect switch 960. Alternatively, less than all (e.g., only a subset of) the optical signals output by the WDM DEMUX 306 (before or after being filtered by a respective filter 934) are provided to the optical cross-connect switch 960. Other variations are possible and within the scope of the embodiments described herein. Various modifications can be made the subsystem described herein while still being within the scope of embodiments of the present technology. For example, some or all of the splitters 314 shown in FIGS. 9A, 9B, 9C and 9D can be eliminated. Additionally, or alternatively, in FIG. 9A some or all of the beam splitters 932 can be eliminated. Such modifications may simplify the subsystems, but can reduce the capacity and/or flexibility of the subsystems. Other modifications can increase the complexity of the subsystem and increase the capacity and/or flexibility of the subsystems, e.g., by adding further switches.

Figure 10A:
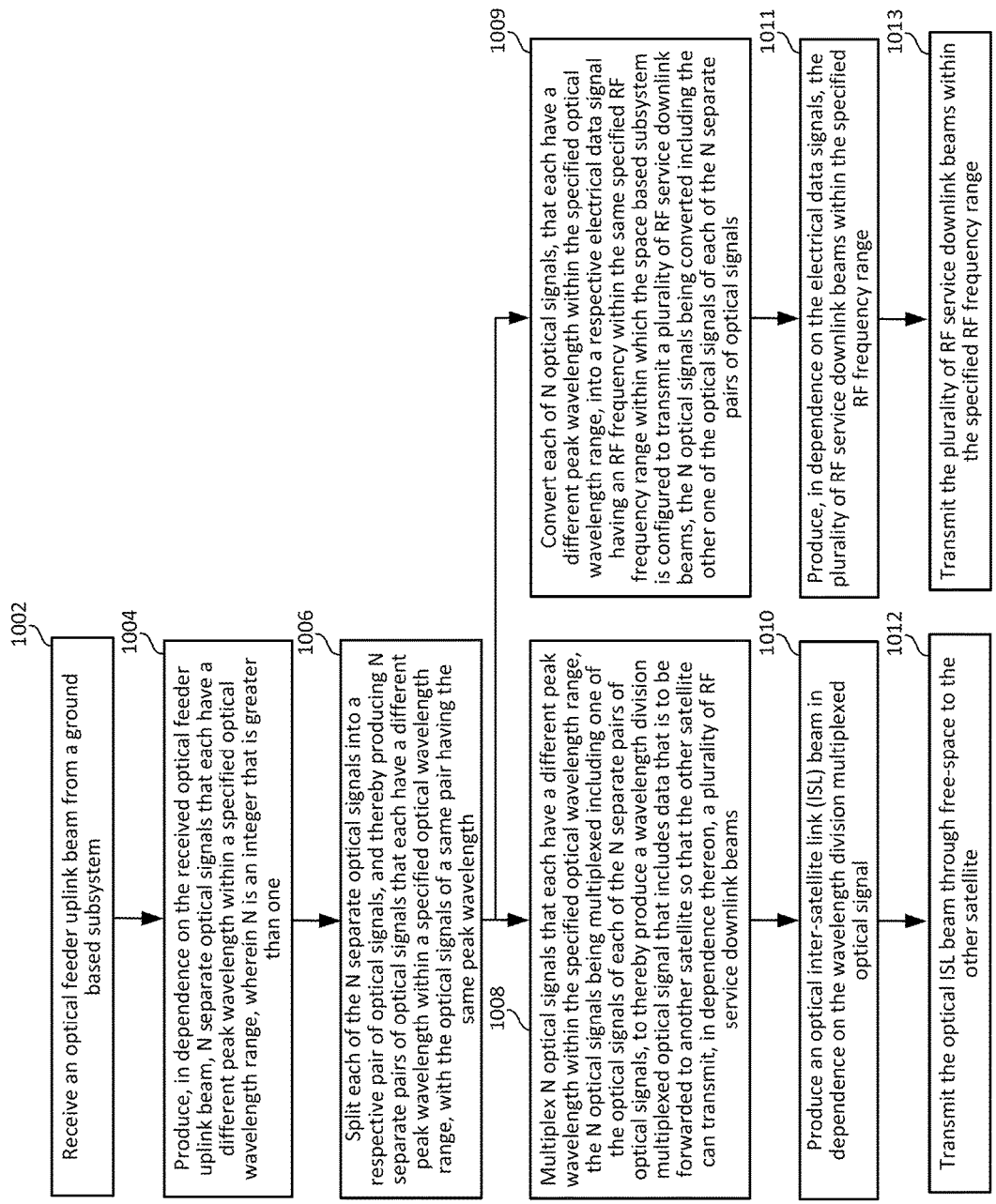
FIG. 10A is a high level flow diagram that is used to summarize methods for enabling a space based subsystem to produce to an optical inter-satellite link (ISL) beam and RF service downlink beams, based on an optical feeder uplink beam received from an optical gateway, according to an embodiment of the present technology.

Methods for Producing ISL Beams and RF Service Downlink Beams Based on an Optical Feeder Uplink Beam FIG. 10A is a high level flow diagram that is used to summarize methods for enabling a space based subsystem of a satellite (e.g., 100) to produce to an optical inter-satellite link (ISL) beam (e.g., 152) and RF service downlink beams (e.g., 106*d*, 110*d*, 114*d*), based on an optical feeder uplink beam (e.g., 102*u*) received from an optical gateway (e.g., 105), according to an embodiment of the present technology. The steps of FIG. 10A can be performed, e.g., using the components shown in FIG. 9A discussed above.

Referring to FIG. 10A, step 1002 involves receiving an optical feeder uplink beam (e.g., 102*u*) from a ground based subsystem (e.g., the gateway forward link equipment 200A or 200D in FIG. 2A or 2D). Step 1002 can be performed by the receiver optics 302 described above with reference to FIG. 9A.

Step 1004 involves producing, in dependence on the received optical feeder uplink beam, N separate optical signals that each have a different peak wavelength, where N is an integer that is greater than one (e.g., N=250). Step 1004 can be performed by the WDM demultiplexer 306 described above with reference to FIG. 9A.

Step 1006 involves splitting each of the N separate optical signals (e.g., 250 optical signals) into a respective pair of optical signals, and thereby producing N separate pairs (e.g., 250 separate pairs) of optical signals that each have a different peak wavelength within the specified optical wavelength range, with the optical signals of a same pair having the same peak wavelength. Step 1006 can be performed by the beam splitters (BSs) 932 described above with reference to FIG. 9A.

Step 1008 involves multiplexing N optical signals that each have a different peak wavelength within the specified optical wavelength range, wherein the N optical signals being multiplexed include one of the optical signals of each of the N separate pairs (e.g., 250 separate pairs) of optical signals, to thereby produce a wavelength division multiplexed optical signal that includes data that is to be forwarded to another satellite so that the other satellite can transmit, in dependence thereon, a plurality of RF service downlink beams. Step 1008 can be performed by the WDM multiplexer 936 described above with reference to FIG. 9A. As can be appreciated from FIG. 9A, the N optical signals may be filtered (e.g., using the filters 934_1*a* to 934_250*a*) before they are multiplexed at step 1008.

Step 1010 involves producing an optical inter-satellite link (ISL) beam in dependence on the wavelength division multiplexed optical signal, and step 1012 involves transmitting the optical ISL beam through free-space to the other satellite. Steps 1010 and 1012 can be performed by the transmitter optics 940 described above with reference to FIG. 9A. As can be appreciated from FIG. 9A, the wavelength division multiplexed optical signal may be amplified (e.g., by the optical amplifier 938) before the transmitter optics 940 are used to perform steps 1010 and 1012. In accordance with certain embodiments, RF frequencies of the wavelength division multiplexed optical signal are within the same specified RF frequency range within which the other satellite (e.g., 150) is configured to transmit the plurality of RF service downlink beams, thereby eliminating of any need for the other satellite (e.g., 150) to perform any frequency conversions when producing a plurality of RF service downlink beams in dependence on the optical ISL beam. In accordance with certain embodiments, the specified RF frequency range within which the other satellite (e.g., 150) is configured to produce and transmit a plurality of RF service downlink beams is a downlink portion of the Ka band. The downlink portion of the Ka band can be from 17.7 GHz to 20.2 GHz, and thus, have a bandwidth of 2.5 GHz. Alternatively, the downlink portion of the Ka band can be from 17.3 GHz to 20.2 GHz, and thus, have a bandwidth of 2.9 GHz. These are just a few examples, which are not intended to be all encompassing.

Still referring to FIG. 10A, step 1009 involves converting each of N optical signals, that each have a different peak wavelength within the specified optical wavelength range, into a respective electrical data signal having an RF frequency within the same specified RF frequency range within which the space based subsystem is configured to transmit a plurality of RF service downlink beams. These N optical signals being converted include the other one of the optical signals of each of the N separate pairs of optical signals produced by the splitting at step 1006. Step 1009, which is similar to step 706 discussed above with reference to FIG. 7, can be performed by the PDs 308 discussed above with reference to FIG. 9A.

Step 1011 involves producing, in dependence on the electrical data signals, the plurality of RF service downlink beams within the specified RF frequency range. Step 1011, which is similar to step 708 discussed above with reference to FIG. 7, can be performed, e.g., by the filters 310, LNAs 312, splitters 314, HPAs 318, HFs 320, OMJs 324, and feed horns 326 discussed above with reference to FIG. 9A.

Step 1013 involves transmitting the plurality of RF service downlink beams within the specified RF frequency range. Step 1013, which is similar to step 710 discussed above with reference to FIG. 7, can be performed by the feed horns 326 and reflector(s) discussed above with reference to FIG. 9A, and more generally, antenna systems. In accordance with certain embodiments, because the RF frequencies of the electrical data signals resulting from the converting (at step 1009) are within the same specified RF frequency range within which the space based subsystem is configured to transmit the plurality of RF service downlink beams (at step 1013), there is an elimination of any need for any space based subsystem (e.g., 300 and 900A) to perform any frequency conversions when producing the plurality of RF service downlink beams in dependence on the optical feeder uplink beam. In accordance with certain embodiments, the specified RF frequency range within which the satellite (e.g., 100) is configured to produce and transmit a plurality of RF service downlink beams is a downlink portion of the Ka band. The downlink portion of the Ka band can be from 17.7 GHz to 20.2 GHz, and thus, have a bandwidth of 2.5 GHz. Alternatively, the downlink portion of the Ka band can be from 17.3 GHz to 20.2 GHz, and thus, have a bandwidth of 2.9 GHz. These are just a few examples, which are not intended to be all encompassing.

Figure 10B:
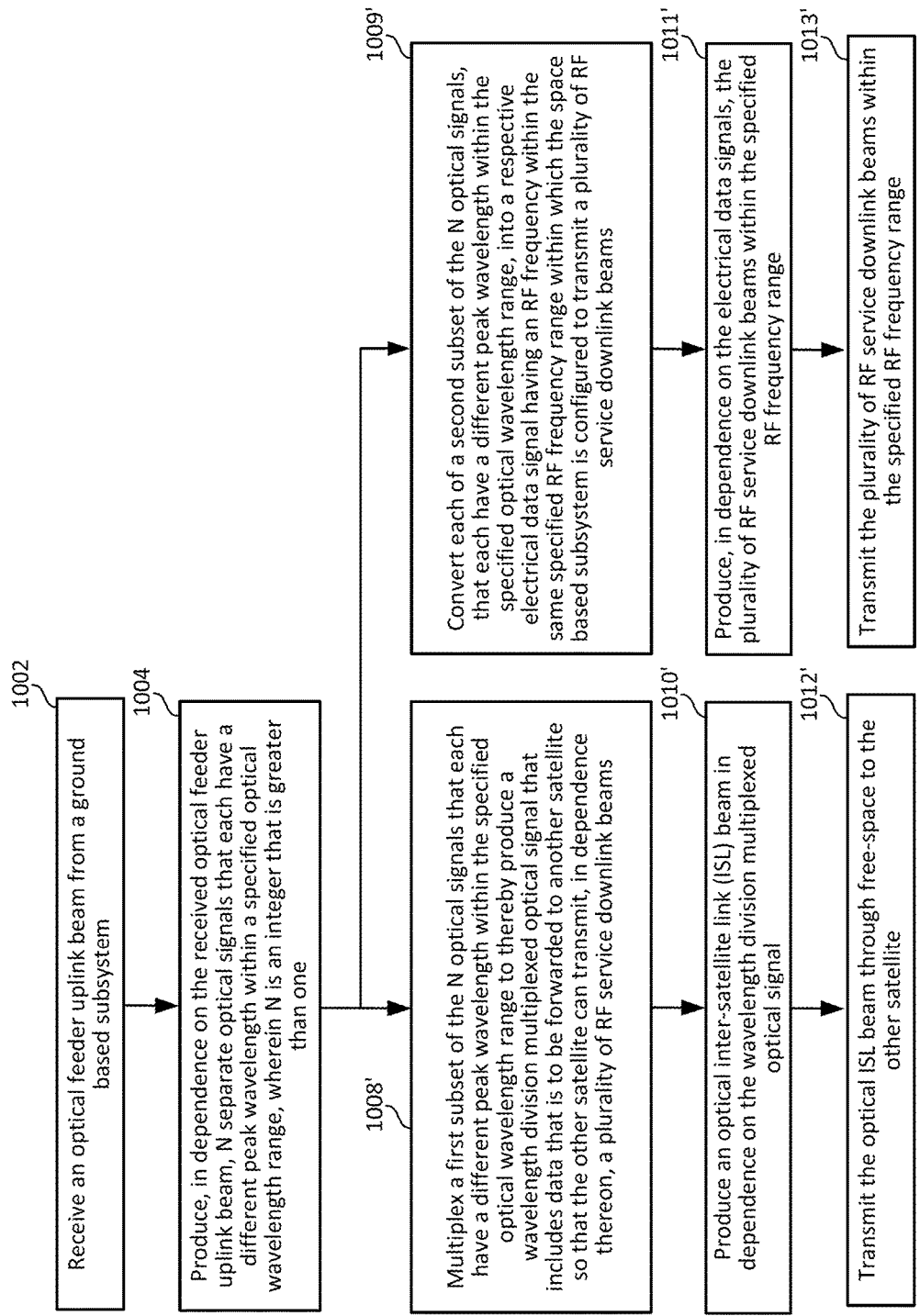
FIG. 10B is a high level flow diagram that is used to summarize methods for enabling a space based subsystem to produce to an optical inter-satellite link (ISL) beam and RF service downlink beams, based on an optical feeder uplink beam received from an optical gateway, according to another embodiment of the present technology.

In certain embodiments, step 1006 can be eliminated, in which case steps 1009, 1011 and 1013 can also be eliminated. In other words, as noted above, some or all of the beam splitters 932 shown in FIG. 9A can be eliminated. In other embodiments, step 1006 can involve only splitting a subset of the optical signals produced at step 1004. In other words, if only some of the beam splitters 932 are eliminated, then step 1006 can involve splitting only a subset of the N separate optical signals into a respective pair of optical signals, and the downstream steps shown in FIG. 10A would be adjusted accordingly. Further, as explained above with reference to FIGS. 9C and 9D, one or more of the optical signals that result from step 1004 can be converted to electrical signals using one or more photodetectors and such electrical signal(s) can be provided to and consumed by equipment that is located on the satellite, such as a command and data handling (C&DH) system, an RF communication payload, and one or more digital payloads, but not limited thereto. Also, as explained above with reference to FIG. 9D, switching of optical signals can be performed, e.g., using the optical cross-connect switch, to control which signals are included in an optical ISL beam, which signals are converted to RF service downlink beams, and/or which signals are converted to electrical signals that are provided to and consumed by (e.g., used to control or otherwise used by) equipment located on the satellite. FIG. 10B is a high level flow diagram that is used to summarize methods for enabling a space based subsystem of a satellite (e.g., 100) to produce to an optical inter-satellite link (ISL) beam (e.g., 152) and RF service downlink beams (e.g., 106d, 110d, 114d), based on an optical feeder uplink beam (e.g., 102u) received from an optical gateway (e.g., 105), according to another embodiment of the present technology. The steps of FIG. 10B can be performed, e.g., using the components shown in FIG. 9B discussed above.

Steps 1002 and 1004 in FIG. 10B are the same as steps 1002 and 1004 in FIG. 10A, and thus, details of these steps need not be repeated. A difference between the methods described with reference to FIG. 10A and the methods described with reference to FIG. 10B is the splitting of the N optical signals that took place in step 1006 of FIG. 10A do not take place in FIG. 10B. Rather, in the embodiment of FIG. 10B, a first subset of the N optical signals (produced at step 1004) are multiplexed at step 1008', and a second subset of the N optical signals (produced at step 1004) are converted to electrical data signals at step 1009'.

More specifically, step 1008' involves multiplexing a first subset of the N optical signals that each have a different peak wavelength within a specified optical wavelength range to thereby produce a wavelength division multiplexed optical signal that includes data that is to be forwarded to another satellite so that the other satellite can transmit, in dependence thereon, a plurality of RF service downlink beams. Step 1008' can be performed by the WDM multiplexer 936 described above with reference to FIG. 9B. As can be appreciated from FIG. 9B, the first subset of N optical signals may be filtered (e.g., using the filters 934_1 to 934_125) before they are multiplexed at step 1008'.

Steps 1010' and 1012' in FIG. 10B are similar to steps 1010 and 1012 described above with reference to FIG. 10A, except that the optical ISL beam produced at step 1010' (and transmitted at step 1012') is only produced based on the first subset of the N optical signals that are multiplexed at step 1008'. Steps 1011' and 1013' in FIG. 10B are similar to steps 1010 and 1012 described above with reference to FIG. 10A, and thus details thereof need not be described again. Additional details of steps 1010', 1012', 1011' and 1013' can be appreciated from the above discussion of FIG. 10A. More generally, additional details of the methods of FIGS. 10A and 10B can be appreciated from the above discussion of the space segment equipment described with reference to FIGS. 9A and 9B, as well as other Figures described above.

Further, as explained above with reference to FIGS. 9C and 9D, a third subset of the optical signals that result from step 1004 can be converted to electrical signals using one or more photodetectors and such electrical signal(s) can be provided to and consumed by equipment that is located on the satellite, such as a command and data handling (C&DH) system, an RF communication payload, and one or more digital payloads, but not limited thereto. Also, as explained above with reference to FIG. 9D, switching of optical signals can be performed, e.g., using the optical cross-connect switch, to control which signals are included in an optical ISL beam, which signals are converted to RF service downlink beams, and/or which signals are converted to electrical signals that are provided to and consumed by (e.g., used to control or otherwise used by) equipment located on the satellite. In other words, which optical signals make up the first subset, the second subset and the third subset can be changed over time using optical switching.

Methods for Producing ISL Beams and RF Service Downlink Beams Based on an Optical Feeder Uplink Beam FIG. 11A is a high level flow diagram that is used to summarize methods for enabling a space based subsystem of a satellite (e.g., 100) to produce to an optical inter-satellite link (ISL) beam (e.g., 162) and RF service downlink beams (e.g., 106d, 110d, 114d), based on an optical ISL beam (e.g., 152) received from another satellite (e.g., 150), according to an embodiment of the present technology. The steps of FIG. 11A can be performed, e.g., using the components shown in FIG. 9A discussed above.

Referring to FIG. 11A, step 1102 involves receiving an optical ISL beam (e.g., 152) from another satellite (e.g., 150). Step 1102 can be performed by the receiver optics 302 described above with reference to FIG. 9A.

Step 1104 involves producing, in dependence on the received optical ISL beam, N separate optical signals that each have a different peak wavelength, where N is an integer that is greater than one (e.g., N=250). Step 1104 can be performed by the WDM demultiplexer 306 described above with reference to FIG. 9A.

Step 1106 involves splitting each of the N separate optical signals (e.g., 250 optical signals) into a respective pair of optical signals, and thereby producing N separate pairs (e.g., 250 separate pairs) of optical signals that each have a different peak wavelength within the specified optical wavelength range, with the optical signals of a same pair having the same peak wavelength. Step 1106 can be performed by the beam splitters (BSs) 932 described above with reference to FIG. 9A.

Step 1108 involves multiplexing N optical signals that each have a different peak wavelength within the specified optical wavelength range, wherein the N optical signals being multiplexed include one of the optical signals of each of the N separate pairs (e.g., 250 separate pairs) of optical signals, to thereby produce a wavelength division multiplexed optical signal that includes data that is to be forwarded to another satellite so that the other satellite can transmit, in dependence thereon, a plurality of RF service downlink beams. Step 1108 can be performed by the WDM multiplexer 936 described above with reference to FIG. 9A. As can be appreciated from FIG. 9A, the N optical signals may be filtered (e.g., using the filters 934_1a to 934_250a) before they are multiplexed at step 1108.

Step 1110 involves producing an optical inter-satellite link (ISL) beam in dependence on the wavelength division multiplexed optical signal, and step 1112 involves transmitting the optical ISL beam through free-space to a further satellite (e.g., 160). Steps 1110 and 1112 can be performed by the transmitter optics 940 described above with reference to FIG. 9A. As can be appreciated from FIG. 9A, the wavelength division multiplexed optical signal may be amplified (e.g., by the optical amplifier 938) before the transmitter optics 940 are used to perform steps 1110 and 1112. In accordance with certain embodiments, RF frequencies of the wavelength division multiplexed optical signal are within the same specified RF frequency range within which the further satellite (e.g., 160) is configured to transmit the plurality of RF service downlink beams, thereby eliminating of any need for the further satellite (e.g., 160) to perform any frequency conversions when producing a plurality of RF service downlink beams in dependence on the optical ISL beam. In accordance with certain embodiments, the specified RF frequency range within which the further satellite (e.g., 160) is configured to produce and transmit a plurality of RF service downlink beams is a downlink portion of the Ka band. The downlink portion of the Ka band can be from 17.7 GHz to 20.2 GHz, and thus, have a bandwidth of 2.5 GHz. Alternatively, the downlink portion of the Ka band can be from 17.3 GHz to 20.2 GHz, and thus, have a bandwidth of 2.9 GHz. These are just a few examples, which are not intended to be all encompassing.

Still referring to FIG. 11A, step 1109 involves converting each of N optical signals, that each have a different peak wavelength within the specified optical wavelength range, into a respective electrical data signal having an RF frequency within the same specified RF frequency range within which the space based subsystem is configured to transmit a plurality of RF service downlink beams. These N optical signals being converted include the other one of the optical signals of each of the N separate pairs of optical signals produced by the splitting at step 1106. Step 1109, which is similar to step 706 discussed above with reference to FIG. 7, can be performed by the PDs 308 discussed above with reference to FIG. 9A.

Step 1111 involves producing, in dependence on the electrical data signals, the plurality of RF service downlink beams within the specified RF frequency range. Step 1111, which is similar to step 708 discussed above with reference to FIG. 7, can be performed, e.g., by the filters 310, LNAs 312, splitters 314, HPAs 318, HFs 320, OMJs 324, and feed horns 326 discussed above with reference to FIG. 9A.

Step 1113 involves transmitting the plurality of RF service downlink beams within the specified RF frequency range. Step 1113, which is similar to step 710 discussed above with reference to FIG. 7, can be performed by the feed horns 326 and reflector(s) discussed above with reference to FIG. 9A, and more generally, antenna systems. In accordance with certain embodiments, because the RF frequencies of the electrical data signals resulting from the converting (at step 1109) are within the same specified RF frequency range within which the space based subsystem is configured to transmit the plurality of RF service downlink beams (at step 1113), there is an elimination of any need for any space based subsystem (e.g., 300 and 900A) to perform any frequency conversions when producing the plurality of RF service downlink beams in dependence on the optical feeder uplink beam. In accordance with certain embodiments, the specified RF frequency range within which the satellite (e.g., 100) is configured to produce and transmit a plurality of RF service downlink beams is a downlink portion of the Ka band. The downlink portion of the Ka band can be from 17.7 GHz to 20.2 GHz, and thus, have a bandwidth of 2.5 GHz. Alternatively, the downlink portion of the Ka band can be from 17.3 GHz to 20.2 GHz, and thus, have a bandwidth of 2.9 GHz. These are just a few examples, which are not intended to be all encompassing.

In certain embodiments, step 1106 can be eliminated, in which case steps 1109, 1111 and 1113 can also be eliminated. In other words, as noted above, some or all of the beam splitters 932 shown in FIG. 9A can be eliminated. In other embodiments, step 1106 can involve only splitting a subset of the optical signals produced at step 1104. In other words, if only some of the splitters 932 are eliminated, then step 1106 can involve splitting only a subset of the N separate optical signals into a respective pair of optical signals, and the downstream steps shown in FIG. 11A would be adjusted accordingly. Further, as explained above with reference to FIGS. 9C and 9D, one or more of the optical signals that result from step 1104 can be converted to electrical signals using one or more photodetectors and such electrical signal(s) can be provided to and consumed by equipment that is located on the satellite, such as a command and data handling (C&DH) system, an RF communication payload, and one or more digital payloads, but not limited thereto. Also, as explained above with reference to FIG. 9D, switching of optical signals can be performed, e.g., using the optical cross-connect switch, to control which signals are included in an optical ISL beam, which signals are converted to RF service downlink beams, and/or which signals are converted to electrical signals that are provided to and consumed by (e.g., used to control or otherwise used by) equipment located on the satellite.

Figure 11B:
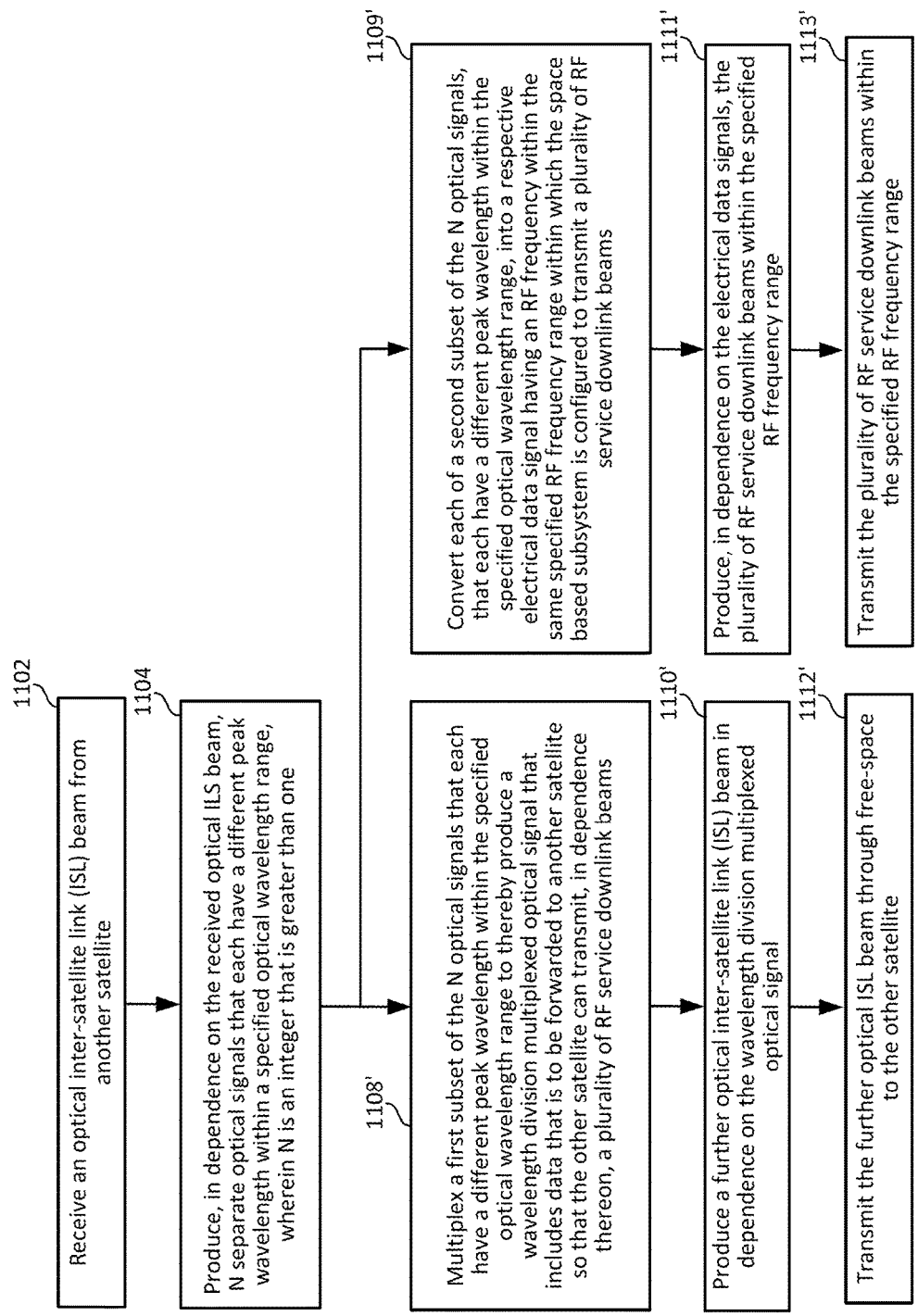
FIG. 11B is a high level flow diagram that is used to summarize methods for enabling a space based subsystem to produce to an optical inter-satellite link (ISL) beam and RF service downlink beams, based on an optical ISL beam received from another satellite, according to another embodiment of the present technology.

FIG. 11B is a high level flow diagram that is used to summarize methods for enabling a space based subsystem of a satellite (e.g., 100) to produce to an optical inter-satellite link (ISL) beam (e.g., 162) and RF service downlink beams (e.g., 106d, 110d, 114d), based on an optical ISL beam (e.g., 152) received from another satellite (e.g., 150), according to another embodiment of the present technology. The steps of FIG. 11B can be performed, e.g., using the components shown in FIG. 9B discussed above.

Steps 1102 and 1104 in FIG. 11B are the same as steps 1102 and 1104 in FIG. 11A, and thus, details of these steps need not be repeated. A difference between the methods described with reference to FIG. 11A and the methods described with reference to FIG. 11B is the splitting of the N optical signals that took place in step 1106 of FIG. 11A do not take place in FIG. 11B. Rather, in the embodiment of FIG. 11B, a first subset of the N optical signals (produced at step 1104) are multiplexed at step 1108', and a second subset of the N optical signals (produced at step 1104) are converted to electrical data signals at step 1109'.

More specifically, step 1108' involves multiplexing a first subset of the N optical signals that each have a different peak wavelength within a specified optical wavelength range to thereby produce a wavelength division multiplexed optical signal that includes data that is to be forwarded to a further satellite so that the further satellite can transmit, in dependence thereon, a plurality of RF service downlink beams. Step 1108' can be performed by the WDM multiplexer 936 described above with reference to FIG. 9B. As can be appreciated from FIG. 9B, the first subset of N optical signals may be filtered (e.g., using the filters 934_1 to 934_125) before they are multiplexed at step 1108'.

Steps 1110' and 1112' in FIG. 11B are similar to steps 1110 and 1112 described above with reference to FIG. 11A, except that the optical ISL beam produced at step 1110' (and transmitted at step 1112') is only produced based on the first subset of the N optical signals that are multiplexed at step 1108'. Steps 1111' and 1113' in FIG. 11B are similar to steps 1111 and 1113 described above with reference to FIG. 11A, and thus details thereof need not be described again. Additional details of steps 1110', 1112', 1111' and 1113' can be appreciated from the above discussion of FIG. 9B. More generally, additional details of the methods of FIGS. 11A and 11B can be appreciated from the above discussion of the space segment equipment described with reference to FIGS. 9A and 9B, as well as other Figures described above.

Further, as explained above with reference to FIGS. 9C and 9D, a third subset of the optical signals that result from step 1104 can be converted to electrical signals using one or more photodetectors and such electrical signal(s) can be provided to and consumed by equipment that is located on the satellite, such as a command and data handling (C&DH) system, an RF communication payload, and one or more digital payloads, but not limited thereto. Also, as explained above with reference to FIG. 9D, switching of optical signals can be performed, e.g., using the optical crossconnect switch, to control which signals are included in an optical ISL beam, which signals are converted to RF service downlink beams, and/or which signals are converted to electrical signals that are provided to and consumed by (e.g., used to control or otherwise used by) equipment located on the satellite. In other words, which optical signals make up the first subset, the second subset and the third subset can be changed over time using optical switching.

RF-to-Optical Space Segment Forward ISL Equipment

Figure 12A:
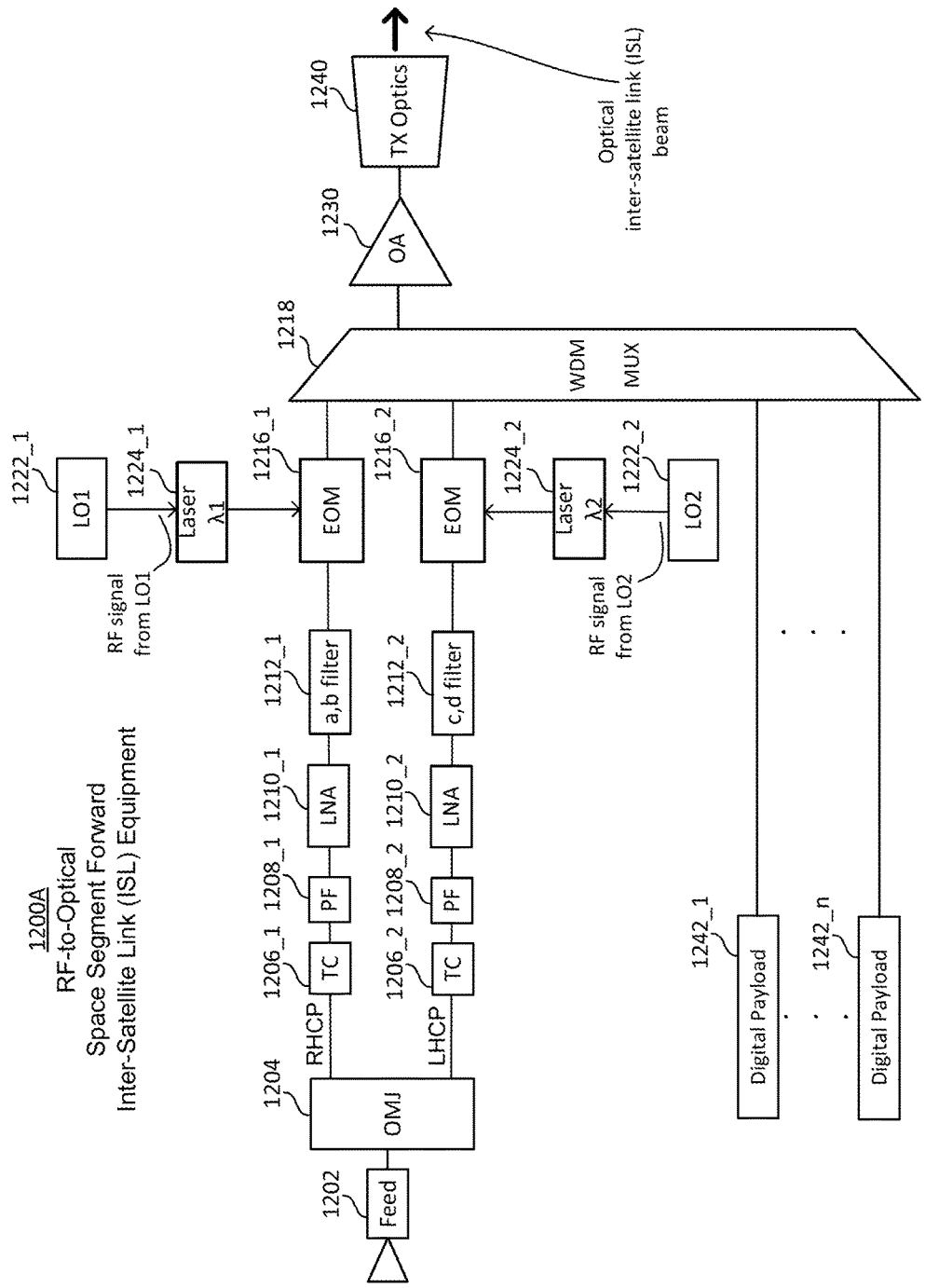
FIG. 12A depicts RF-to-optical space segment inter-satellite link (ISL) equipment, according to an embodiment of the present technology.

FIG. 12A will now be used to describe a portion of space segment forward ISL equipment 1200A, according to an embodiment of the present technology. Such space segment forward ISL equipment 1200A, which can also be referred to as a satellite ISL link subsystem 1200A, or more generally, as a communication subsystem, is configured to receive an RF feeder uplink beam that is transmitted from a ground based gateway (e.g., 105) to the satellite (e.g., 100) that is carrying the space segment forward ISL equipment 1200A, and produce and transmit an optical ISL beam to another satellite (e.g., 150). The other satellite (e.g., 150), to which the optical ISL beam is transmitted, can be carrying the space segment forward link equipment 300 (described above with reference to FIG. 3), the space segment ISL equipment 900A (described above with reference to FIG. 9A), or the space segment ISL equipment 900B (described above with reference to FIG. 9B), but is not limited thereto.

Referring to FIG. 12A, the space segment forward ISL equipment 1200A is shown as including a feed horn 1202, an OMJ 1204, TCs 1206_1 and 1206_2, PFs 1208_1 and 1208_2, filters 1212_1 and 1212_2, OEMs 1216_1 and 1216_2, WDM multiplexer 1218, OA 1230 and transmitter optics 1240. The space segment forward ISL equipment 1200A is also shown as including local oscillators 1222_1 (LO1) and 1222_2 (LO2), which output respective RF signals. Additionally, the space segment forward ISL equipment 1200A is shown as including lasers 1224_1 and 1224_2, each of which is operable to emit light having a respective different peak optical wavelength.

The feed horn 1202, along with a reflector (now shown in the Figure), gathers and focuses radio waves of an RF feeder uplink beam (e.g., 106*u*) and converts it to an RF signal that is provided to the OMJ 1204. The feed horn 1202 and the rest of the antenna can be collectively referred to as the antenna or antenna system. In other words, an antenna, as the term is used herein, can include a feed horn. It is also possible that the antenna is a phased array or a lens antenna. The OMJ 1204 separates the RF signal into a right hand circular polarization (RHCP) RF signal and a left hand circular polarization (LHCP) RF signal. The OMJ 1204 can alternatively separate the RF signal it receives into a horizontal linear polarization RF signal and vertical linear polarization RF signal. Each of the TCs 1206_1 and 1206_2 can be used for power monitoring, payload testing and/or performing calibrations based on signals passing therethrough. Each of the PFs 1208_1 and 1208_2 (e.g., bandpass filters) can be used to remove unwanted frequency components and/or enhance desired frequency components. For an example, each of the PFs 1208_1 and 1208_2 can pass frequencies within the range of 29.5-30.0 GHz, but are not limited thereto. Each of the LNAs 1210_1 and 1210_2 amplifies the relatively low-power RF signal it receives from a respective one of the PFs 1208_1 and 1208_2 without significantly degrading the signals signal-to-noise ratio. The amplified RF signal that is output by each of the LNAs 1210_1 and 1210_2 is provided to a respective filter 1212_1 and 1212_2.

Each of the filters 1212_1 and 1212_2 allows frequencies to pass within two of the colors a, b, c and d. For example, the filter 1212_1 passes frequencies within the colors a and b, and the filter 412_2 passes the frequencies within the colors c and d. In accordance with an embodiment: color 'a' represents a first sub-band (e.g., 29.50-29.75 GHz) of an allocated uplink frequency band (e.g., 29.50-30.00 GHz) with a right-hand circular polarization (RHCP); color 'b' represents a second sub-band (29.75-30.00 GHz) of the allocated uplink frequency band with RHCP; color 'c' represents the first sub-band (e.g., 29.50-29.75 GHz) of the allocated uplink frequency band with a left-hand circular polarization (LHCP); and color 'd' represents the second sub-band (29.75-30.00 GHz) of the allocated uplink frequency band with LHCP. In other embodiments, the colors may include other allocations of the frequency band and polarization. For example, the polarizations can be horizontal and vertical linear polarizations, rather than RHCP and LHCP. The RF signals that are output from the filters 1212_1 and 1212_2, which can be referred to as data modulated RF signals, are provided to EOMs 1216_1 and 1216_2, as shown in FIG. 12A.

Still referring to FIG. 12A, the local oscillators (LOs) 1222_1 and 1222_2 each produce a different RF carrier signal within the portion of the Ka band that is available for transmitting service downlink beams (also referred to as downlink user beams). For example, the LO 1222_1 may produce an RF carrier within the RF frequency range from 17.7-18.95 GHz (e.g., at 18.325 GHz, but not limited thereto), and the LO 1222_2 may produce an RF carrier within the RF frequency range from 18.95-20.2 GHz (e.g., at 19.575, but not limited thereto). For another example, the LO 1222_1 may produce an RF carrier within the RF frequency range from 17.3-18.75 GHz (e.g., at 18.025 GHz, but not limited thereto), and the LO 1222_2 may produce an RF carrier within the RF frequency range from 18.75-20.2 GHz (e.g., at 19.475, but not limited thereto). The RF carrier signal produced by the LO 1222_1 is used to drive the laser 1224_1, and the RF carrier signal produced by the LO 1222_2 is used to drive the laser 1224_2. Each of the lasers 1224_1 and 1224_2 is operable to emit light of a different peak wavelength than the other in response to being driven by the RF carrier signal output by a respective one of the LOs 1222_1 and 1222_2. Infrared (IR), visible or other optical wavelengths can be produced by the lasers 1224_1 and 1224_2 and used for producing the optical ISL beams.

Still referring to FIG. 12A, the light emitted by each of the lasers 1224_1 and 1224_2, which can be referred to as an optical carrier signal, is provided (e.g., via a respective optical fiber) to a respective one of the EOMs 1216_1 and 1216_2. Each of the EOMs 1216_1 and 1216_2 is an optical device in which a signal-controlled element exhibiting an electro-optic effect is used to modulate a respective beam of light. The EOM 1216_1 also receives the RF signal output by the filter 1212_1, and the EOM 1216_2 also receives the RF signal output by the filter 1212_2. The modulation performed by the EOMs 1216_1 and 1216_2 may be imposed on the phase, frequency, amplitude, or polarization of a beam of light, or any combination thereof. In accordance with a specific embodiment, each of the EOMs 1216_1 and 1216_2 is a phase modulating EOM that is used as an amplitude modulator by using a Mach-Zehnder interferometer. In other words, each of the EOMs 1216_1 and 1216_2 can be implemented as a Mach-Zehnder modulator (MZM), which can be a Lithium Niobate Mach-Zehnder modulator, but is not limited thereto. In accordance with specific embodiments, each of the EOMs 1216_1 and 1216_2 is implemented as an MZM that produces an amplitude modulated (AM) optical waveform with a modulation index between 10% and 80% in order to maintain fidelity of an RF waveform (modulated therein) without too much distortion. The optical signal that is output by each of the EOMs 1216_1 and 1216_2 can be referred to as an optical data signal. The modulation scheme that is implemented by the EOMs 204 can result in double- or vestigial-sidebands, including both an upper sideband (USB) and a lower sideband (LSB). Alternatively single-sideband modulation (SSB) can be utilized to increase bandwidth and transmission power efficiency.

Explained another way, each of the EOMs 1216_1 and 1216_2 is configured to receive an LO modulated optical carrier signal from a respective one of the lasers 1224_1 and 1224_2 and receive a different data modulated RF signal including data (e.g., corresponding to at least one of a plurality of RF service downlink beams). Additionally, each of the EOMs 1216_1 and 1216_2 is configured to output an optical data signal carrying data and including the LO frequency signal required to generate a frequency converted RF signal (e.g., corresponding to at least one of a plurality of RF service downlink beams) and having an RF frequency within the same specified RF frequency range within which another satellite (e.g., 150), to which an optical ISL beam (that will be output by the transmitter optics 1240) is being transmitted, is configured to transmit a plurality of RF service downlink beams.

The two optical data signals that are output by the EOMs 1216_1 and 1216_2 are provided to the WDM MUX 1218, which can also be referred to as a dense wavelength division multiplexing (DWDM) MUX. The WMD MUX 1218 multiplexes (i.e., combines) the two optical data signals, received from the two EOMs 1216_1 and 1216_2, onto a single optical fiber, with each of the two optical data signals being carried at the same time on its own separate optical wavelength within an optical frequency range (e.g., from 1510 nm to 1560 nm, but not limited thereto).

The signal that is output by the WMD MUX 1218, which can be referred to as a wavelength division multiplexed optical ISL signal, is provided to the optical amplifier (OA) 1230. The OA 1230 amplifies the wavelength division multiplexed optical ISL signal so that the wavelength division multiplexed optical ISL signal has sufficient power to enable transmission thereof from the satellite (e.g., 100) in space to another satellite (e.g., 150) in space. The OA 1230 can be an erbium-doped fiber amplifier (EDFA), but is not limited thereto. The output of the OA 1230 can be referred to as an optically amplified wavelength division multiplexed optical ISL signal.

The optically amplified wavelength division multiplexed optical ISL signal, which is output by the OA 1230, is provided (e.g., via an optical fiber) to the transmitter optics 1240. The transmitter optics 1240, which can also be referred to as a telescope, can includes optical elements such as lenses, mirrors, reflectors, filters and/or the like. The transmitter optics 1240 outputs a collimated optical ISL beam that is aimed at another satellite. A gimbal, and/or the like, can be used to control the steering of the transmitter optics 1240. The diameter of the transmitter optics 1240 can depend on the distance between satellites and whether the optical ISL beam terminates in the adjacent satellite or if it continues on to another satellite. The diameter of the transmitter optics 1240 can nominally range from about 5 to 15 cm. If the optical ISL beam continues on to adjacent satellites the diameter may need to be bigger in order to account for compiling SNR from traversing multiple links.

FIG. 12A also shows that one or more digital payloads 1242 (labeled 1242_1 . . . 1242_n) can provide optical data signals to the WDM MUX 1218 so that information obtained by or otherwise provided by the digital payload(s) 1242 can be included in the optical ISL beam that is transmitted to another satellite, which can eventually (that that other satellite, or a further satellite) be included in an optical feeder downlink that is transmitted to a ground based optical gateway. Exemplary types of digital payloads include imaging and/or weather payloads, but are not limited thereto.

Figure 12B:
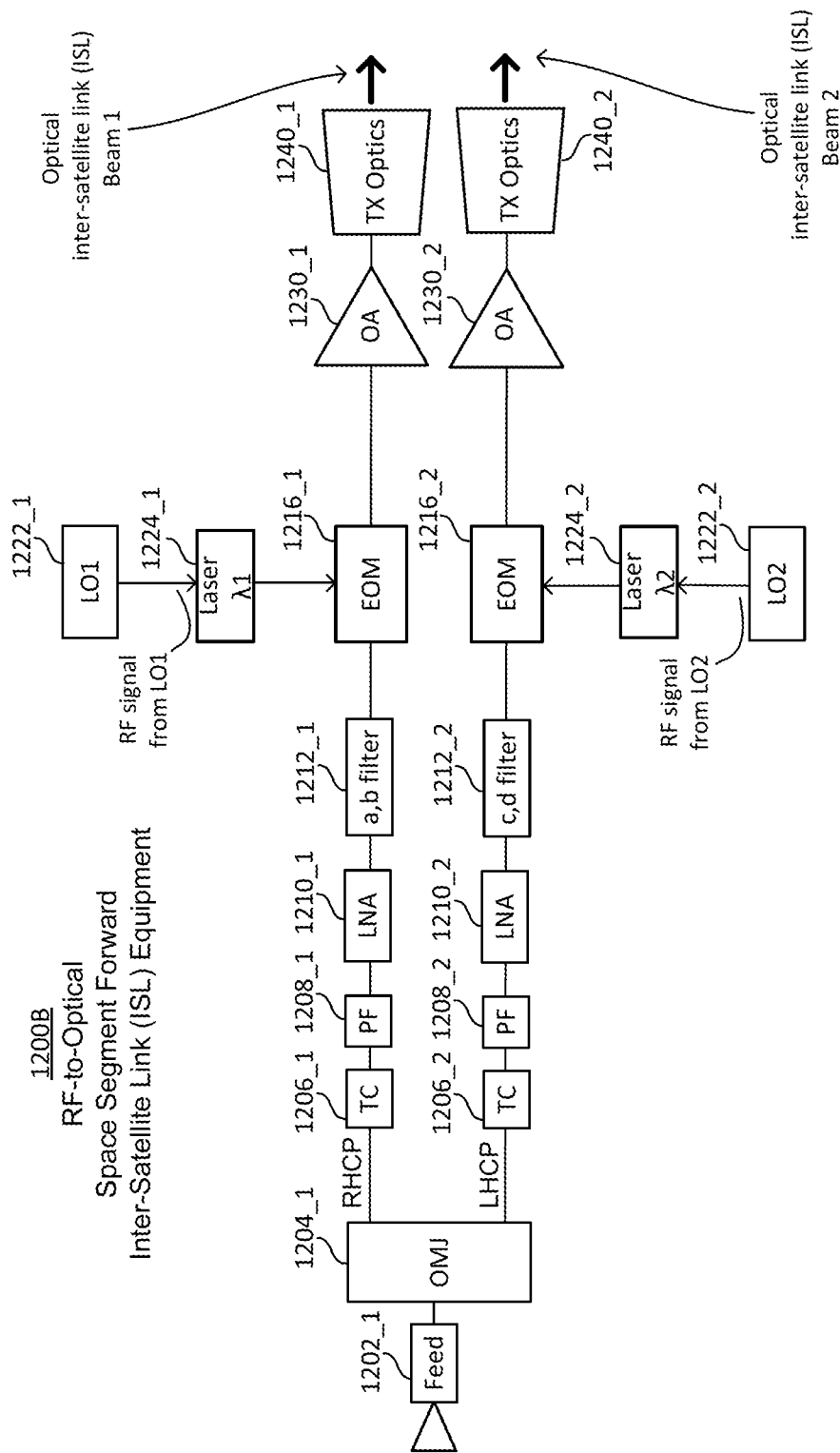
FIG. 12B depicts RF-to-optical space segment inter-satellite link (ISL) equipment, according to another embodiment of the present technology.

FIG. 12B depicts RF-to-optical space segment inter-satellite link (ISL) equipment, according to another embodiment of the present technology. All the elements that are shown in FIG. 12B to the left of and including the EOMs 1216_1 and 1216_2 are the same as in FIG. 12A, and thus need not be described again. In FIG. 12B, rather than the combining the two optical data signals that are output by the EOMs 1216_1 and 1216_2 (using a WDM MUX 1218), each of the optical data signals is provided to a respective OA 1230_1 and 1230_2, and the output of the OA 1230_1 is provided (e.g., via an optical fiber) to the transmitter optics 1240_1, and the output of the OA 1230_2 is provided (e.g., via an optical fiber) to the transmitter optics 1240_2. Each of the transmitter optics 1240_1 outputs a collimated optical ISL beam that is aimed at another satellite (e.g., 150), and the transmitter optics 1240_2 outputs a further collimated optical ISL beam that is aimed at a further satellite (e.g., 160). In other words, in the embodiment of FIG. 12B, two different optical ISL beams that are aimed at different satellites (e.g., 150 and 160) can be generated from one RF feeder uplink beam received by a satellite (e.g., 100).

Figure 12C:
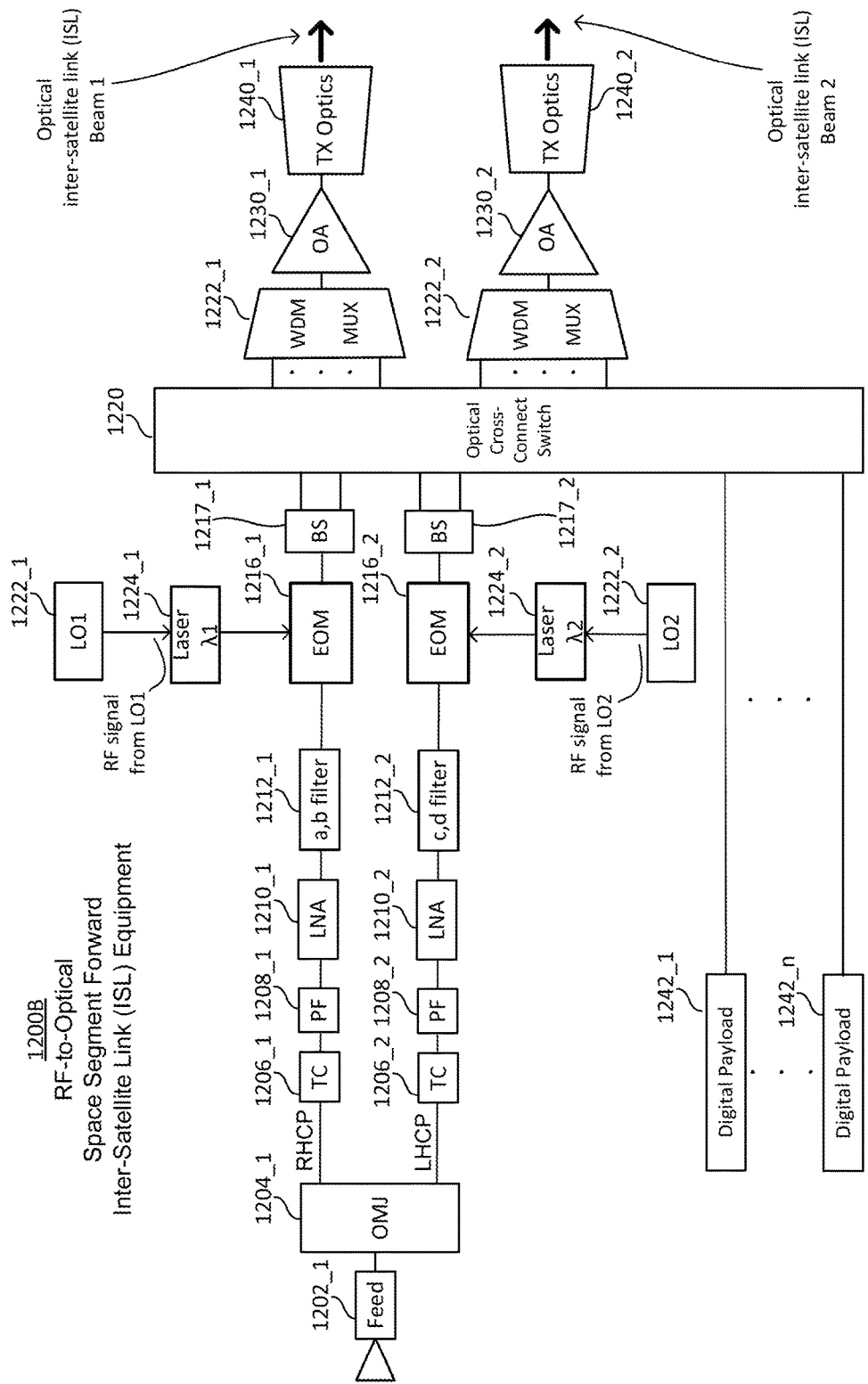
FIG. 12C depicts RF-to-optical space segment inter-satellite link (ISL) equipment, according to a further embodiment of the present technology.

FIG. 12C depicts RF-to-optical space segment inter-satellite link (ISL) equipment, according to a further embodiment of the present technology. Elements that are shown in FIG. 12B to the left of and including the EOMs 1216_1 and 1216_2 are the same as in FIGS. 12A and 12B, and thus need not be described again. In FIG. 12C, beam splitter (BS) 1217_1 is connected to the output of the EOM 1216_1, and BS 1217_2 is connected to the output of the EOM 1216_2. Each BS 1217 splits the optical data signal it receives into two optical data signals, which include the same data, but may have different power, depending upon how the BS is implemented. Unless stated otherwise, it will be assumed that each BS 1217 splits the optical data signal it receives into two optical data signals having the same content and power (i.e., two substantially identical optical data signals). The two optical data signals that are output by each BS 1217 is shown as being provided to the optical cross-connect switch 1220.

FIG. 12C also shows that one or more digital payloads 1242 (labeled 1242_1 . . . 1242_n) can provide optical data signals to the optical cross-connect switch 1220. Exemplary types of digital payloads include imaging and/or weather payloads, but are not limited thereto. A first subset of the outputs of the optical cross-connect switch 1220 is connected to a WDM MUX 1222_1, and a second subset of the outputs of the optical cross-connect switch 1220 is connected to a WDM MUX 1222_2. The signal that is output by the WMD MUX 1222_1, which can be referred to as a first wavelength division multiplexed optical ISL signal, is provided to the optical amplifier (OA) 1230_1. The OA 1230_1 amplifies the first wavelength division multiplexed optical ISL signal so that the wavelength division multiplexed optical ISL signal has sufficient power to enable transmission thereof from the satellite (e.g., 100) in space to another satellite (e.g., 150) in space. The signal that is output by the WMD MUX 1222_2, which can be referred to as a second wavelength division multiplexed optical ISL signal, is provided to the optical amplifier (OA) 1230_2. The OA 1230_2 amplifies the wavelength division multiplexed optical ISL signal so that the wavelength division multiplexed optical ISL signal has sufficient power to enable transmission thereof from the satellite (e.g., 100) in space to another satellite (e.g., 160) in space.

The optically amplified wavelength division multiplexed optical ISL signals, which are output by the OAs 1230_1 and 1230_2, are provided (e.g., via an optical fiber) respectively to the transmitter optics 1240_1 and 1240_2. The transmitter optics 1240_1 outputs a collimated optical ISL beam that is aimed at another satellite (e.g., 150), and the transmitter optics 1240_2 outputs a collimated optical ISL beam that is aimed at a further satellite (e.g., 160).

The BSs 1217 enable the same optical data signals to be included in more than one of the ISL beams, e.g., to provide for redundancy and/or broadcast capabilities. If such capabilities are not wanted or needed, the BSs 1217 can be eliminated.

The optical cross-connect switch 1220 enables the sources of the optical data included in the different ISL beams to be changed over time, as desired. If such capabilities are not wanted or needed, the optical cross-connect switch 1220 can be eliminated.

Methods for Producing ISL Beam(s) Based on an RF Feeder Uplink Beam

FIG. 13A is a high level flow diagram that is used to summarize methods for enabling a space based subsystem of a satellite (e.g., 100) to produce to an optical inter-satellite link (ISL) beam (e.g., 152), based on an RF feeder uplink beam (e.g., 102u) received from a ground based gateway (e.g., 105), according to certain embodiments of the present technology. The steps of FIG. 13A can be performed, e.g., using the components shown in FIG. 12A discussed above. The optical ISL beam can be transmitted from the satellite (e.g., 100) to another satellite (e.g., 150).

Referring to FIG. 13A, step 1302 involves receiving an RF feeder uplink beam (e.g., 102u) from a ground based subsystem, which can be a ground based gateway, and in dependence thereon producing an RF signal. Step 1302 can be performed by an antenna that includes the feed horn 1202 shown in FIG. 12A.

Step 1304 involves separating the RF signal into a first RF data signal having a first polarization and a second RF data signal having a second polarization that is different than the first polarization. The first polarization can be one of right hand circular polarization (RHCP) or left hand circular polarization (LHCP), and the second polarization the other one of RHCP or LHCP. Alternatively, the first polarization can be one of vertical or horizontal linear polarization, and the second polarization the other one of vertical or horizontal linear polarization. Step 1304 can be performed using the OMJ 1204 in FIG. 12A.

Step 1306 involves producing first and second RF carrier signals having respective first and second RF frequencies. Step 1306 can be performed by the local oscillators 1222_1 and 1222_2 in FIG. 12A.

Step 1308 involves driving first and second lasers with the first and second RF carrier signals to thereby emit respective first and second optical carrier signals having different peak wavelengths within a specified optical wavelength range, wherein the first optical carrier signal has the first RF frequency, and the second optical carrier signal has the second RF frequency. Step 1308 can be performed using the lasers 1224_1 and 1224_2 in FIG. 12A.

Step 1310 involves electro-optically modulating the first RF data signal with the first optical carrier signal to thereby produce a first optical data signal, and electro-optically modulating the second RF data signal with the second optical carrier signal to thereby produce a second optical data signal. Step 1310 can be performed by the EOMs 1216_1 and 1216_2 in FIG. 12A. Further, it is noted that the first and second RF data signals can be amplified and filtered before step 1310 is performed. Such amplification and filtering can be performed by the preselect filters 1208_1 and 1208_2, the LNAs 1210_1 and 1210_2, and the filters 1212_1 and 1212_2 in FIG. 12B.

Step 1312 involves multiplexing the first and second optical data signals to thereby produce a wavelength division multiplexed optical signal. Step 1312 can be performed by the WDM multiplexer 1218 in FIG. 12A.

Step 1314 involves producing an optical ISL beam in dependence on the wavelength division multiplexed optical signal, and step 1316 involves transmitting the optical ISL beam to another satellite. Steps 1314 and 1316 can be performed by the transmitter optics 1240 in FIG. 12A.

In accordance with certain embodiments, the RF frequencies of the first and second optical data signals produced by the electro-optically modulating are within the same specified RF frequency range within which the other satellite is configured to transmit a plurality of RF service downlink beams, thereby eliminating any need for the other satellite to perform any frequency conversions when producing the plurality of RF service downlink beams in dependence on the optical ISL beam. In accordance with certain embodiments, the specified RF frequency range within which the other satellite (e.g., 150) is configured to produce and transmit RF service downlink beams is a downlink portion of the Ka band. The downlink portion of the Ka band can be from 17.7 GHz to 20.2 GHz, and thus, have a bandwidth of 2.5 GHz. Alternatively, the downlink portion of the Ka band can be from 17.3 GHz to 20.2 GHz, and thus, have a bandwidth of 2.9 GHz. These are just a few examples, which are not intended to be all encompassing.

In accordance with certain embodiments, additionally optical data signals, e.g., received from one or more digital payloads (e.g., those labeled 1242_1 . . . 1242_n in FIG. 12A) can also be multiplexed and thereby included in the wavelength division multiplexed optical signal produced at step 1312.

FIG. 13B is a high level flow diagram that is used to summarize methods for enabling a space based subsystem of a satellite (e.g., 100) to produce to two optical ISL beams (e.g., 152 and 162), based on an RF feeder uplink beam (e.g., 102u) received from a ground based gateway (e.g., 105), according to certain embodiments of the present technology. The steps of FIG. 13B can be performed, e.g., using the components shown in FIG. 12B discussed above. The two optical ISL beams can be transmitted from the satellite (e.g., 100) to two other satellites (e.g., 150 and 160).

Steps 1302, 1304, 1306, 1308 and 1310 in FIG. 13B are the same as steps 1302, 1304, 1306, 1308 and 1310 in FIG. 13A, and thus, details of these steps need not be repeated. A difference between the methods described with reference to FIG. 13A and the methods described with reference to FIG. 13B is the multiplexing that took place at step 1312 in FIG. 13A does not take place in FIG. 13B. Rather, in the embodiment of FIG. 13B, the first and second optical data signals produced at step 1310 are each used to produce a separate optical ISL beam. More specifically, referring to FIG. 13B, step 1314' involves producing a first optical ISL beam in dependence on the first optical data signal, and producing a second optical ISL beam in dependence on the second optical data signal, and step 1316' involves transmitting the first optical ISL beam to a first other satellite and transmitting the second optical ISL beam to a second other satellite. Steps 1314' and 1316' can be performed using the transmitter optics 1240_1 and 1240_2 in FIG. 12B, as can be appreciated from the above discussion thereof.

In accordance with certain embodiments, two copies of each of optical data signals that are produced at step 1310 can be formed by splitting each optical data signal into two, e.g., using the beam splitters 1217 discussed above with reference to FIG. 12C. Further, optical switching and WDM multiplexing can take place prior to step 1316', so that the contents of each of the first and second optical ISL beams transmitted at step 1316' can be changed as desired, as was also described above with reference to FIG. 12C. Further, as was also described above with reference to FIG. 12C, optical data signals from one or more data payloads produced by or otherwise provided by one or more digital payloads can also be included in one or more of the optical ISLs, if desired. Further variations to the methods summarized with reference to FIGS. 13A and 13B can be appreciated from the above discussion of FIGS. 12A and 12B.

Note that the discussion above introduces many different features and many embodiments. It is to be understood that the above-described embodiments are not all mutually exclusive. That is, the features described above (even when described separately) can be combined in one or multiple embodiments.

Certain embodiments of the present technology are directed to a ground based subsystem for inclusion in an optical gateway and for use in transmitting an optical feeder uplink beam to a satellite that is configured to receive the optical feeder uplink beam. In accordance with an embodiment, the ground based subsystem includes a wavelength-division multiplexing (WDM) multiplexer, and optical amplifier and transmitter optics. The WDM multiplexer is configured to receive one or more optical data signals from one or more optical networks that are external to the ground based optical gateway, and combine the one or more optical data signals into a wavelength division multiplexed optical signal. The optical amplifier is configured to amplify the wavelength division multiplexed optical signal to thereby produce an optically amplified wavelength division multiplexed optical signal. The transmitter optics is/are configured to receive the optically amplified wavelength division multiplexed optical signal and transmit an optical feeder uplink beam to the satellite in dependence thereon. In accordance with certain embodiments, the ground based optical gateway does not perform any modulation of, and does not perform any demodulation of, the one or more optical data signals that are received from the one or more optical networks that are external to the ground based optical gateway before they are provided to the WDM multiplexer.

In accordance with certain embodiments, the ground based subsystem further includes one or more wavelength converters each of which is configured to convert a peak optical wavelength of one of the one or more optical data signals, received from the one or more optical networks that are external to the ground based optical gateway, to a different peak optical wavelength so that no two optical signals received at different inputs of the WDM multiplexer have a same peak optical wavelength. In accordance with certain embodiments, the ground based subsystem additionally, or alternatively, includes one or more frequency converters each of which is configured to one or up-convert or down-convert a frequency of a different one of the optical signals being provided to the WDM multiplexer from one of the one or more optical networks that are external to the ground based optical gateway, to thereby eliminate any need for frequency conversion to be performed on the satellite to which the optical feeder uplink beam is being transmitted.

In accordance with certain embodiments, the ground based subsystem further includes a plurality of lasers and a plurality of electro-optical modulators (EOMs). Each of the plurality of lasers is operable to emit an optical signal having a different peak wavelength within a specified optical wavelength range. Each of the EOMs is configured to receive an optical signal from a respective one of the plurality of lasers, receive a different data modulated RF carrier signal that has been modulated to carry data for at least one of a plurality of RF service downlink beams. In such embodiments, the WDM multiplexer can also be configured to receive the optical data signals output by the plurality of EOMs, and combine the plurality of optical data signals received from the plurality of EOMs with one another and with the one or more optical data signals that are received from the one or more optical networks that are external to the ground based optical gateway into the wavelength division multiplexed optical signal, that after being amplified by the optical amplifier, is transmitted by the transmitter optics to a satellite in the optical feeder uplink beam. The ground based subsystem can also include a plurality of RF modulators configured to produce the data modulated RF carrier signals that are received by the plurality of EOMs, wherein each of the RF modulators receives an RF carrier signal having an RF frequency within the same specified RF frequency range within which the satellite is configured to transmit the plurality of RF service downlink beams. The ground based subsystem of claim 5, can also include one or more oscillators configured to produce the RF carrier signals that are provided to the RF modulators, each of the RF carriers signals having an RF frequency within the same specified RF frequency range within which the satellite is configured to transmit the plurality of RF service downlink beams.

Certain embodiments of the present technology are directed a method for enabling a ground based optical gateway to produce and transmit an optical feeder uplink beam to a satellite that is configured to receive the optical feeder uplink beam. In accordance with an embodiment, the method, which is for use by the ground based optical gateway, includes: receiving one or more optical data signals from one or more optical networks that are external to the ground based optical gateway; multiplexing the one or more optical data signals, received from the one or more optical networks that are external to the ground based optical gateway, to thereby produce a wavelength division multiplexed optical signal; producing an optical feeder uplink beam, in dependence on the wavelength division multiplexed optical signal; and transmitting the optical feeder uplink beam through free-space to the satellite. In accordance with certain embodiments, the ground based optical gateway does not perform any modulation of, and does not perform any demodulation of, the one or more optical data signals that are received from the one or more optical networks that are external to the ground based optical gateway before they are multiplexed to produce the wavelength division multiplexed optical signal.

The method can also include: emitting a plurality of optical signals each having a different peak wavelength that is within a specified optical wavelength range; and electro-optically modulating each of the optical signals with one of a plurality of different data modulated RF carrier signals, each of which has been modulated to carry data for at least one of the plurality of RF service downlink beams, to thereby produce a plurality of optical data signals. In accordance with certain embodiments, the multiplexing includes multiplexing the plurality of optical data signals, produced as a result of the electro-optically modulating, with the optical data signals received from the one or more optical networks that are external to the ground based optical gateway to thereby produce into the wavelength division multiplexed optical signal.

The method can also include converting a peak optical wavelength of at least one of the one or more optical data signals, received from the one or more optical networks that are external to the ground based optical gateway, to a different peak optical wavelength so that no two optical signals that are multiplexed to produced wavelength division multiplexed optical signal have a same peak optical wavelength.

The method can also include up-converting or down-converting a frequency of at least one of the one or more optical data signals, received from the one or more optical networks that are external to the ground based optical gateway, to thereby eliminate any need for frequency conversion to be performed on the satellite to which the optical feeder uplink beam is being transmitted.

Certain embodiments of the present technology are directed to a ground based subsystem for inclusion in an optical gateway and for use in receiving an optical feeder downlink beam from a satellite. In accordance with an embodiment, the ground based subsystem includes receiver optics, an optical amplifier and a WDM multiplexer. The receiver optics is/are configured to receive a wavelength division multiplexed optical feeder downlink beam from a satellite. The optical amplifier is configured to amplify the wavelength division multiplexed optical signal received by the amplifier from the receiver optics. The WDM demultiplexer is configured to receive an amplified wavelength division multiplexed optical signal from the amplifier and separate the amplified wavelength division multiplexed optical signal into a plurality of separate optical signals, each of which has a different peak wavelength. In accordance with certain embodiments, one or more of the optical data signals that are output by the WDM demultiplexer are provided to one or more optical networks that are external to the ground based optical gateway without the optical gateway performing any demodulation of, and without the optical gateway performing any modulation of, the one or more optical data signals that are provided to the one or more optical networks that are external to the ground based optical gateway.

The ground based subsystem can also include one or more wavelength converters each of which is configured to convert a peak optical wavelength of one of the one or more optical data signals, that is being provided to one of the one or more optical networks that are external to the ground based optical gateway, to a different peak optical wavelength before the one of the one or more optical data signals is provided to the one of the one or more optical networks that are external to the ground based optical gateway. Additionally, or alternatively, the ground based subsystem can also include one or more frequency converters each of which is configured to one of up-convert or down-convert a frequency of at least one of the one or more optical data signals, that is being provided to one of the one or more optical networks that are external to the ground based optical gateway, before the one of the one or more optical data signals is provided to the one of the one or more optical networks that are external to the ground based optical gateway.

In accordance with certain embodiments, the ground based subsystem further includes a plurality of photodetectors, each of which converts a different one of a subset of the optical signals that are output from the WDM demultiplexer, to a respective electrical data signal. In certain such embodiments, the subset of the optical signals that are converted to electrical data signals by the plurality of photodetectors do not include the one or more of the optical data signals that, after being output by the WDM demultiplexer, are provided to one or more optical networks that are external to the ground based optical gateway.

Certain embodiments of the present technology are directed a method for use by a ground based optical gateway. In accordance with an embodiment, the method includes: receiving a wavelength division multiplexed optical feeder downlink beam from a satellite; amplifying the wavelength division multiplexed optical signal; demultiplexing the amplified wavelength division multiplexed optical signal to thereby separate the amplified wavelength division multiplexed optical signal into a plurality of optical signals, each of which has a different peak wavelength; and providing one or more of the optical data signals that are output by the WDM demultiplexer to one or more optical networks that are external to the ground based optical gateway without the optical gateway performing any modulation of, and without the optical gateway performing any demodulation of, the one or more optical data signals that are provided to the one or more optical networks that are external to the ground based optical gateway.

The method can also include converting a peak optical wavelength of at least one of the one or more optical data signals, that is being provided to one of the one or more optical networks that are external to the ground based optical gateway, to a different peak optical wavelength before the at least one of the one or more optical data signals is provided to the one of the one or more optical networks that are external to the ground based optical gateway. Additionally, or alternatively, the method can include up-converting or down-converting a frequency of at least one of the one or more optical data signals, that is being provided to one of the one or more optical networks that are external to the ground based optical gateway, before the at least one of the one or more optical data signals is provided to the one of the one or more optical networks that are external to the ground based optical gateway.

In accordance with certain embodiments, the method further includes converting at subset of the optical signals that result from the demultiplexing to respective electrical data signals. In some such embodiments, the subset of the optical signals that are converted to electrical data signals do not include the one or more of the optical data signals that are provided to one or more optical networks that are external to the ground based optical gateway without the optical gateway performing any modulation and without the optical gateway performing any demodulation thereof.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A ground based subsystem for inclusion in an optical gateway of a satellite communication system and for use in receiving an optical feeder downlink beam from a satellite of the satellite communication system, the ground based subsystem comprising:

receiver optics configured to receive a wavelength division multiplexed optical feeder downlink beam from a satellite of the satellite communication system;

an optical amplifier configured to amplify the wavelength division multiplexed optical signal received by the amplifier from the receiver optics;

a wavelength-division multiplexing (WDM) demultiplexer configured to receive an amplified wavelength division multiplexed optical signal from the amplifier and separate the amplified wavelength division multiplexed optical signal into a plurality of separate optical signals, each of which has a different peak wavelength;

wherein the ground based subsystem is configured to cause one or more of the optical signals that are output by the WDM demultiplexer to be provided to one or more optical networks that are external to the ground based optical gateway, within which the ground based subsystem is included, without the optical gateway performing any demodulation of, and without the optical gateway performing any modulation of, the one or more optical signals that are provided to the one or more optical networks that are external to the ground based optical gateway; and further comprising one or more wavelength converters each of which is configured to convert a peak optical wavelength of one of the one or more optical signals, that is being provided to one of the one or more optical networks that are external to the ground based optical gateway, to a different peak optical wavelength before the one of the one or more optical signals is provided to the one of the one or more optical networks that are external to the ground based optical gateway, without the one or more wavelength converters performing any demodulation of, and without the one or more wavelength converters performing any modulation of, the one or more optical signals that are provided to the one or more optical networks that are external to the ground based optical gateway.

2. The ground based subsystem of claim 1, further comprising:

a plurality of photodetectors, each of which converts a different one of a subset of the optical signals that are output from the WDM demultiplexer, to a respective electrical signal.

3. A ground based subsystem for inclusion in an optical gateway of a satellite communication system and for use in receiving an optical feeder downlink beam from a satellite of the satellite communication system, the ground based subsystem comprising:

receiver optics configured to receive a wavelength division multiplexed optical feeder downlink beam from a satellite of the satellite communication system;

an optical amplifier configured to amplify the wavelength division multiplexed optical signal received by the amplifier from the receiver optics;

a wavelength-division multiplexing (WDM) demultiplexer configured to receive an amplified wavelength division multiplexed optical signal from the amplifier and separate the amplified wavelength division multiplexed optical signal into a plurality of separate optical signals, each of which has a different peak wavelength;

wherein the ground based subsystem is configured to cause one or more of the optical signals that are output by the WDM demultiplexer to be provided to one or more optical networks that are external to the ground based optical gateway, within which the ground based subsystem is included, without the optical gateway performing any demodulation of, and without the optical gateway performing any modulation of, the one or more optical signals that are provided to the one or more optical networks that are external to the ground based optical gateway; and further comprising one or more frequency converters each of which is configured to one of up-convert or down-convert a frequency of at least one of the one or more optical signals, that is being provided to one of the one or more optical networks that are external to the ground based optical gateway, before the one of the one or more optical signals is provided to the one of the one or more optical networks that are external to the ground based optical gateway, without the one or more frequency converters performing any demodulation of, and without the one or more frequency converters performing any modulation of, the one or more optical signals that are provided to the one or more optical networks that are external to the ground based optical gateway.

4. The ground based subsystem of claim 3, further comprising:
a plurality of photodetectors, each of which converts a different one of a subset of the optical signals that are output from the WDM demultiplexer, to a respective electrical signal.

5. A ground based subsystem for inclusion in an optical gateway of a satellite communication system and for use in receiving an optical feeder downlink beam from a satellite of the satellite communication system, the ground based subsystem comprising:
receiver optics configured to receive a wavelength division multiplexed optical feeder downlink beam from a satellite of the satellite communication system;
an optical amplifier configured to amplify the wavelength division multiplexed optical signal received by the amplifier from the receiver optics;
a wavelength-division multiplexing (WDM) demultiplexer configured to receive an amplified wavelength division multiplexed optical signal from the amplifier and separate the amplified wavelength division multiplexed optical signal into a plurality of separate optical signals, each of which has a different peak wavelength;
a plurality of photodetectors, each of which converts a different one of a subset of the optical signals that are output from the WDM demultiplexer, to a respective electrical signal;
wherein the ground based subsystem is configured to cause one or more of the optical data signals that are output by the WDM demultiplexer to be provided to one or more optical networks that are external to the ground based optical gateway, within which the ground based subsystem is included, without the optical gateway performing any demodulation of, and without the optical gateway performing any modulation of, the one or more optical signals that are provided to the one or more optical networks that are external to the ground based optical gateway; and
wherein the subset of the optical signals that are converted to electrical signals by the plurality of photodetectors do not include the one or more of the optical signals that, after being output by the WDM demultiplexer, are provided to one or more optical networks that are external to the ground based optical gateway.

6. The ground based subsystem of claim 5, further comprising:
one or more wavelength converters each of which is configured to convert a peak optical wavelength of one of the one or more optical signals, that is being provided to one of the one or more optical networks that are external to the ground based optical gateway, to a different peak optical wavelength before the one of the one or more optical signals is provided to the one of the one or more optical networks that are external to the ground based optical gateway, without the one or more wavelength converters performing any demodulation of, and without the one or more wavelength converters performing any modulation of, the one or more optical signals that are provided to the one or more optical networks that are external to the ground based optical gateway.

7. The ground based subsystem of claim 5, further comprising:
one or more frequency converters each of which is configured to one of up-convert or down-convert a frequency of at least one of the one or more optical signals, that is being provided to one of the one or more optical networks that are external to the ground based optical gateway, before the one of the one or more optical signals is provided to the one of the one or more optical networks that are external to the ground based optical gateway, without the one or more frequency converters performing any demodulation of, and without the one or more frequency converters performing any modulation of, the one or more optical signals that are provided to the one or more optical networks that are external to the ground based optical gateway.

8. A method for use by a ground based optical gateway of a satellite communication system, the method comprising:
receiving a wavelength division multiplexed optical feeder downlink beam from a satellite of the satellite communication system;
amplifying the wavelength division multiplexed optical signal;
demultiplexing the amplified wavelength division multiplexed optical signal, using a WDM demultiplexer within the ground based optical gateway of the satellite communication system, to thereby separate the amplified wavelength division multiplexed optical signal into a plurality of optical signals, each of which has a different peak wavelength;
providing one or more of the optical data signals that are output by the WDM demultiplexer, within the ground based optical gateway of the satellite communication system, to one or more optical networks that are external to the ground based optical gateway without the optical gateway performing any modulation of, and without the optical gateway performing any demodulation of, the one or more optical data signals that are provided to the one or more optical networks that are external to the ground based optical gateway; and
converting a peak optical wavelength of at least one of the one or more optical signals, that is being provided to one of the one or more optical networks that are external to the ground based optical gateway, to a different peak optical wavelength before the at least one of the one or more optical signals is provided to the one of the one or more optical networks that are external to the ground based optical gateway;
wherein the converting the peak optical wavelength of the at least one of the one or more optical data signals is performed without performing any demodulation of, and without performing any modulation of, the one or more optical signals that are provided to the one or more optical networks that are external to the ground based optical gateway.

9. The method of claim 8, further comprising:
converting at least a subset of the optical signals that result from the demultiplexing to respective electrical signals.

10. A method for use by a ground based optical gateway of a satellite communication system, the method comprising:
receiving a wavelength division multiplexed optical feeder downlink beam from a satellite of the satellite communication system;
amplifying the wavelength division multiplexed optical signal;
demultiplexing the amplified wavelength division multiplexed optical signal, using a WDM demultiplexer within the ground based optical gateway of the satellite communication system, to thereby separate the amplified wavelength division multiplexed optical signal into a plurality of optical signals, each of which has a different peak wavelength;
providing one or more of the optical data signals that are output by the WDM demultiplexer, within the ground based optical gateway of the satellite communication system, to one or more optical networks that are external to the ground based optical gateway without the optical gateway performing any modulation of, and without the optical gateway performing any demodulation of, the one or more optical data signals that are provided to the one or more optical networks that are external to the ground based optical gateway; and
up-converting or down-converting a frequency of at least one of the one or more optical signals, that is being provided to one of the one or more optical networks that are external to the ground based optical gateway, before the at least one of the one or more optical signals is provided to the one of the one or more optical networks that are external to the ground based optical gateway;
wherein the up-converting or down-converting is performed without performing any demodulation of, and without performing any modulation of, the one or more optical signals that are provided to the one or more optical networks that are external to the ground based optical gateway.

11. The method of claim 10, further comprising:
converting at least a subset of the optical signals that result from the demultiplexing to respective electrical signals.

12. A method for use by a ground based optical gateway of a satellite communication system, the method comprising:
receiving a wavelength division multiplexed optical feeder downlink beam from a satellite of the satellite communication system;
amplifying the wavelength division multiplexed optical signal;
demultiplexing the amplified wavelength division multiplexed optical signal, using a WDM demultiplexer within the ground based optical gateway of the satellite communication system, to thereby separate the amplified wavelength division multiplexed optical signal into a plurality of optical signals, each of which has a different peak wavelength;
providing one or more of the optical signals that are output by the WDM demultiplexer, within the ground based optical gateway of the satellite communication system, to one or more optical networks that are external to the ground based optical gateway without the optical gateway performing any modulation of, and without the optical gateway performing any demodulation of, the one or more optical signals that are provided to the one or more optical networks that are external to the ground based optical gateway; and
converting a subset of the optical signals that result from the demultiplexing to respective electrical signals within the ground based optical gateway;
wherein the subset of the optical signals that are converted to electrical signals within the ground based optical gateway do not include the one or more of the optical signals that are provided to one or more optical networks that are external to the ground based optical gateway without the optical gateway performing any modulation and without the optical gateway performing any demodulation thereof; and
converting a peak optical wavelength of at least one of the one or more optical signals, that is being provided to one of the one or more optical networks that are external to the ground based optical gateway, to a different peak optical wavelength before the at least one of the one or more optical signals is provided to the one of the one or more optical networks that are external to the ground based optical gateway;
wherein the converting the peak optical wavelength of the at least one of the one or more optical data signals is performed without performing any demodulation of, and without performing any modulation of, the one or more optical signals that are provided to the one or more optical networks that are external to the ground based optical gateway.

13. A method for use by a ground based optical gateway of a satellite communication system, the method comprising:
receiving a wavelength division multiplexed optical feeder downlink beam from a satellite of the satellite communication system;
amplifying the wavelength division multiplexed optical signal;
demultiplexing the amplified wavelength division multiplexed optical signal, using a WDM demultiplexer within the ground based optical gateway of the satellite communication system, to thereby separate the amplified wavelength division multiplexed optical signal into a plurality of optical signals, each of which has a different peak wavelength;
providing one or more of the optical signals that are output by the WDM demultiplexer, within the ground based optical gateway of the satellite communication system, to one or more optical networks that are external to the ground based optical gateway without the optical gateway performing any modulation of, and without the optical gateway performing any demodulation of, the one or more optical signals that are provided to the one or more optical networks that are external to the ground based optical gateway; and
converting a subset of the optical signals that result from the demultiplexing to respective electrical signals within the ground based optical gateway;
wherein the subset of the optical signals that are converted to electrical signals within the ground based optical gateway do not include the one or more of the optical signals that are provided to one or more optical networks that are external to the ground based optical gateway without the optical gateway performing any modulation and without the optical gateway performing any demodulation thereof; and up-converting or down-converting a frequency of at least one of the one or more optical signals, that is being provided to one of the one or more optical networks that are external to the ground based optical gateway, before the at least one of the one or more optical signals is provided to the one of the one or more optical networks that are external to the ground based optical gateway;

wherein the up-converting or down-converting is performed without performing any demodulation of, and without performing any modulation of, the one or more optical signals that are provided to the one or more optical networks that are external to the ground based optical gateway.

\* \* \* \* \*